United States Patent [19]

Fathauer et al.

[11] Patent Number: 4,467,140
[45] Date of Patent: Aug. 21, 1984

[54] MICROPROCESSOR-BASED CORDLESS TELEPHONE SYSTEM

[75] Inventors: George H. Fathauer; Warren L. Williamson, both of Mesa, Ariz.

[73] Assignee: Masco Corporation of Indiana, Cumberland, Ind.

[21] Appl. No.: 259,787

[22] Filed: May 1, 1981

[51] Int. Cl.³ .............................................. H04Q 7/04
[52] U.S. Cl. .................................. 179/2 EA; 179/2 E
[58] Field of Search .................. 179/2 E, 2 EA, 2 EB, 179/2 EC, 18 DA, 90 D, 90 B, 90 BD, 81 R; 455/68–70, 86, 87, 76, 89

[56] References Cited

U.S. PATENT DOCUMENTS 4,053,717 10/1977 Snider ............................. 179/2 EA
4,332,981 6/1982 Palombi et al. .................. 179/2 EA Primary Examiner—Gene Z. Rubinson
Assistant Examiner—W. J. Brady
Attorney, Agent, or Firm—Leon E. Redman

[57] ABSTRACT

A cordless telephone system is provided which includes a base unit operatively coupled to a user's telephone lines and a relatively compact portable cordless handset. Both the base unit and the cordless handset include a radio transmitter and a receiver which form a full duplex two-way FM radio link wherein the transmitter of the base unit and the receiver of the cordless handset operate on a first non-CB frequency and the transmitter of the cordless handset and the receiver of the base unit operate on a second different and distinct non-CB frequency. Both the cordless handset and the base unit include signal-injecting circuitry whereby a portion of the transmitter signal is injected into the input of the receiver to provide the local oscillator function for that receiver without undesirable cross-talk between the transmitted and received signals. The cordless handset also includes a keyboard for entering dialing information, security code identification switches for entering a user's identification code, a logic network responsive to the entered dialing information and security code information for generating data words indicative thereof, and an FSK-encoder including circuitry for generating a subcarrier frequency tone and circuitry responsive to the subcarrier tone for generating FSK-encoded equivalents of the data words. The FSK-encoded data words and the subcarrier frequency tone are superimposed on an FM modulated carrier for transmission to the receiver of the base unit. The base unit includes a microprocessor-based control system for controlling substantially all operational functions including ringing signal generation, security identification, line seizure, dialing signal generation, memory storage and recall, muting during identification and dialing, selecting T/R or R/O operation, and the like.

74 Claims, 21 Drawing Figures

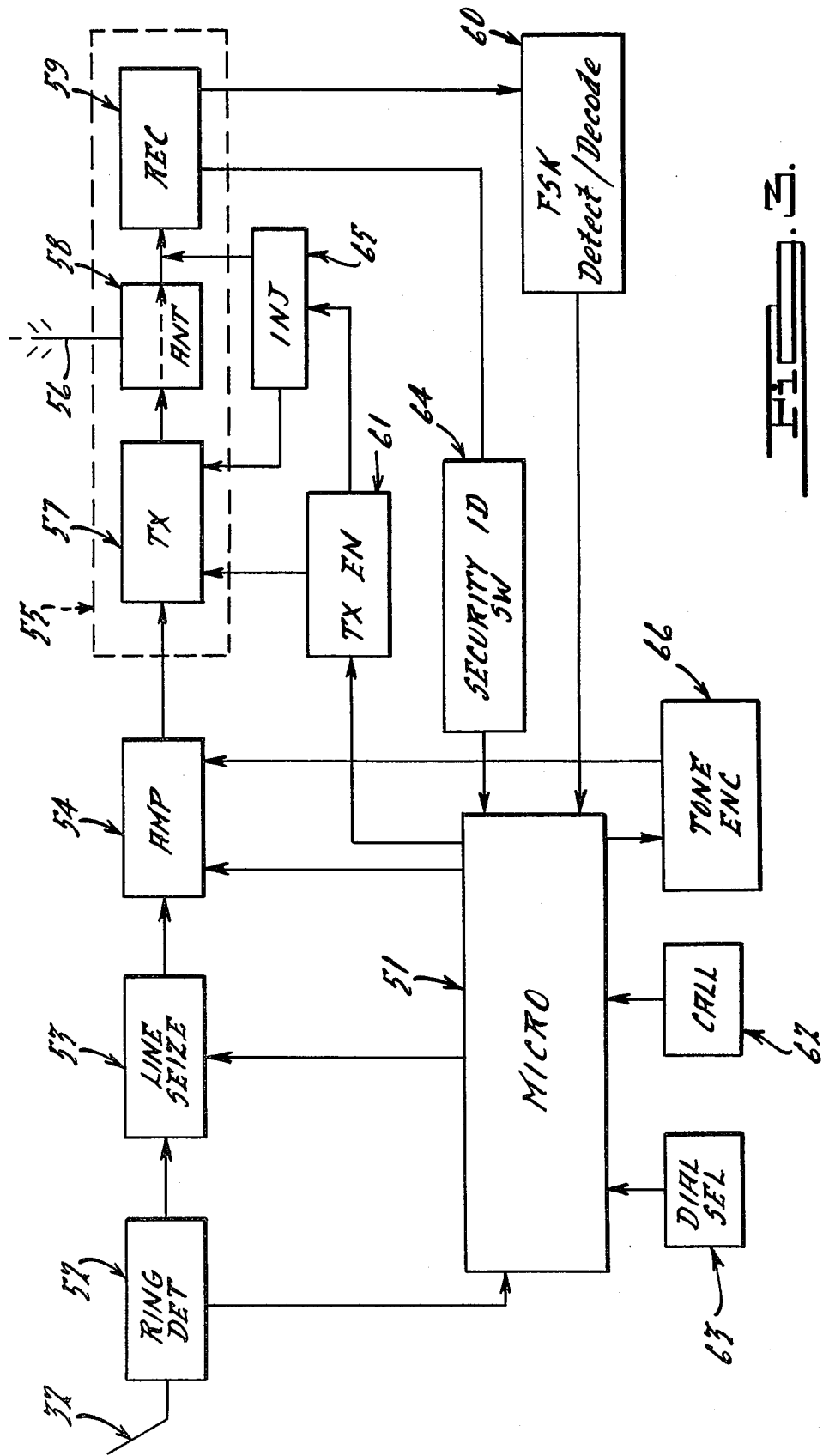

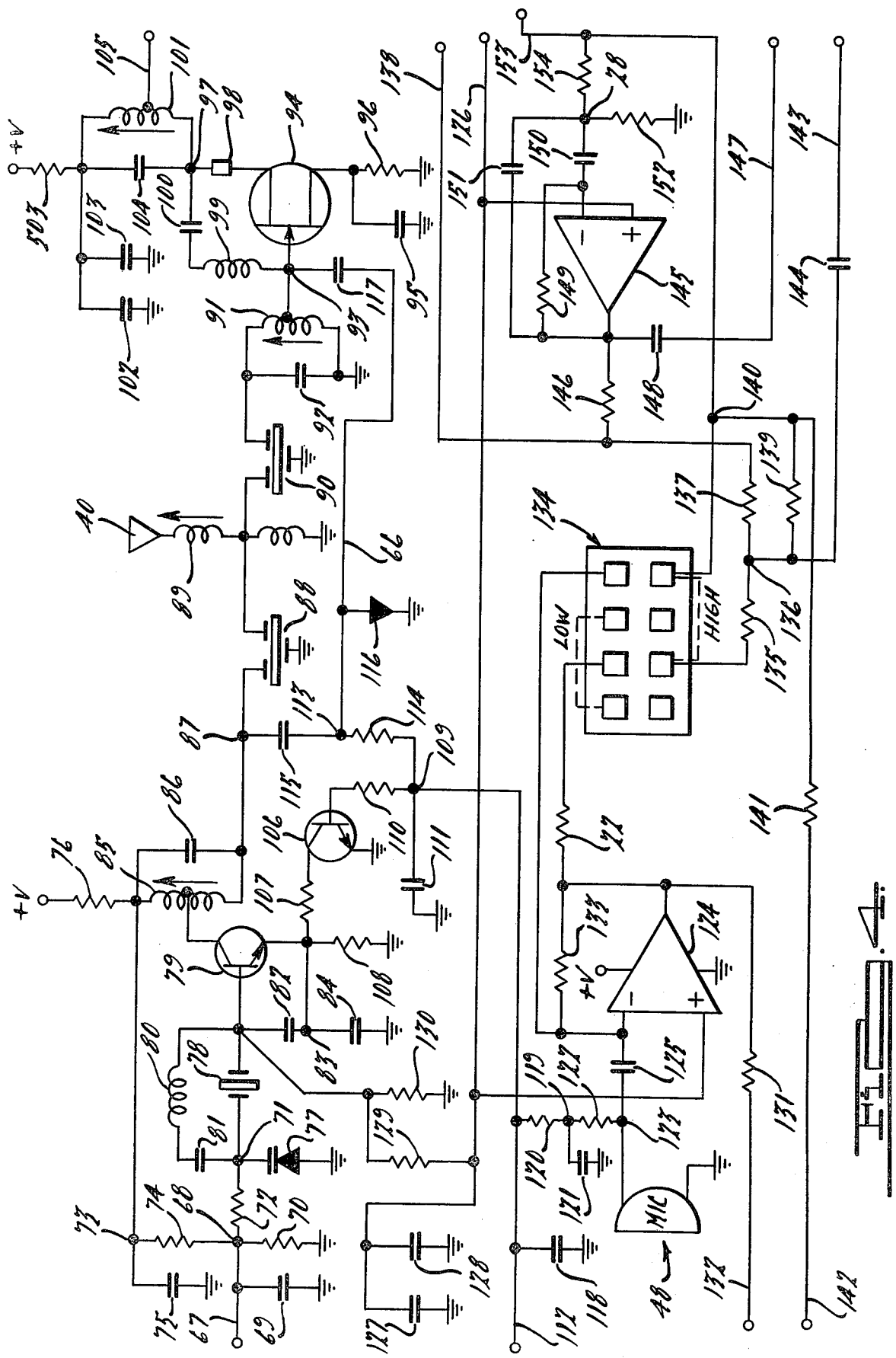

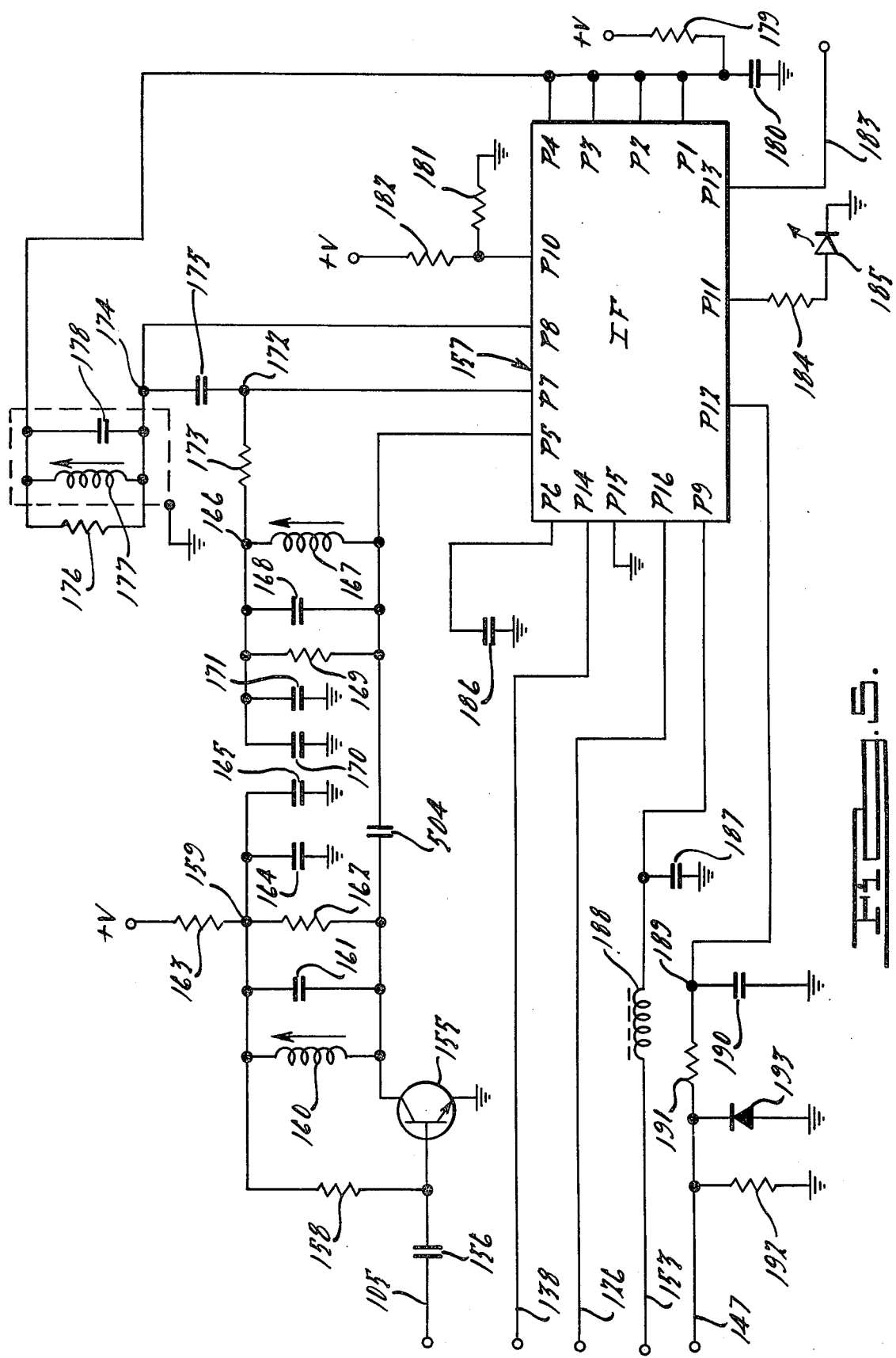

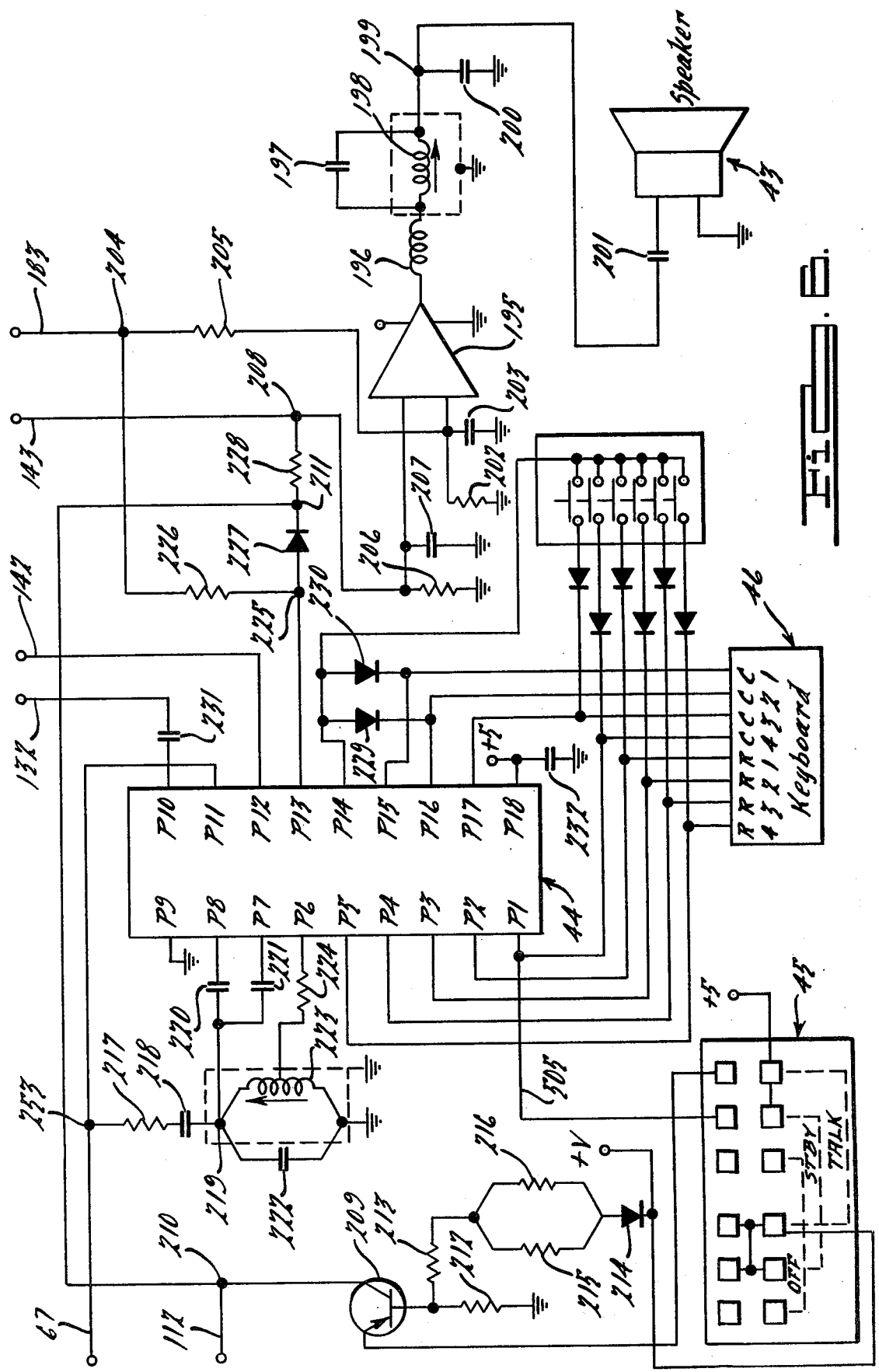

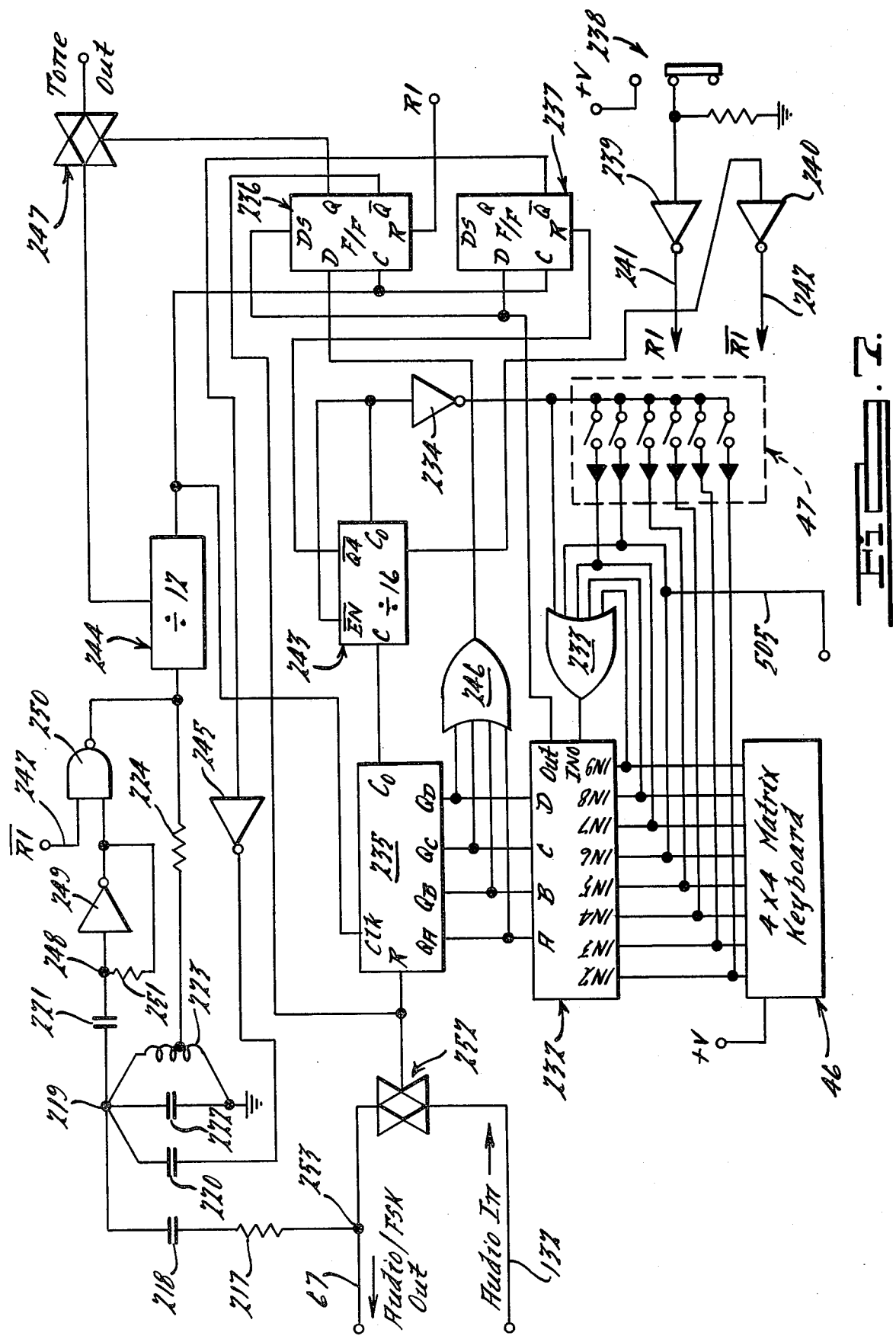

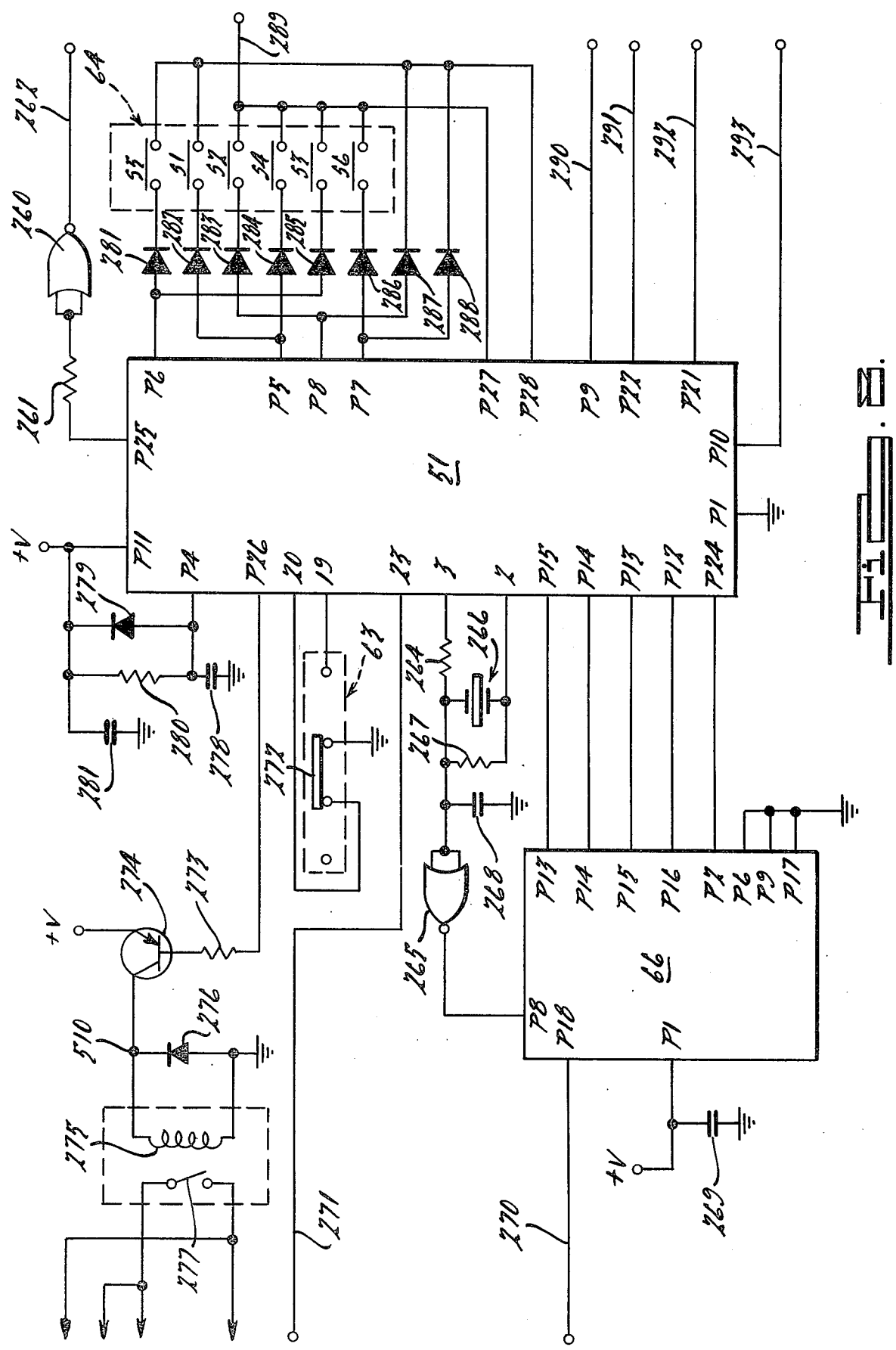

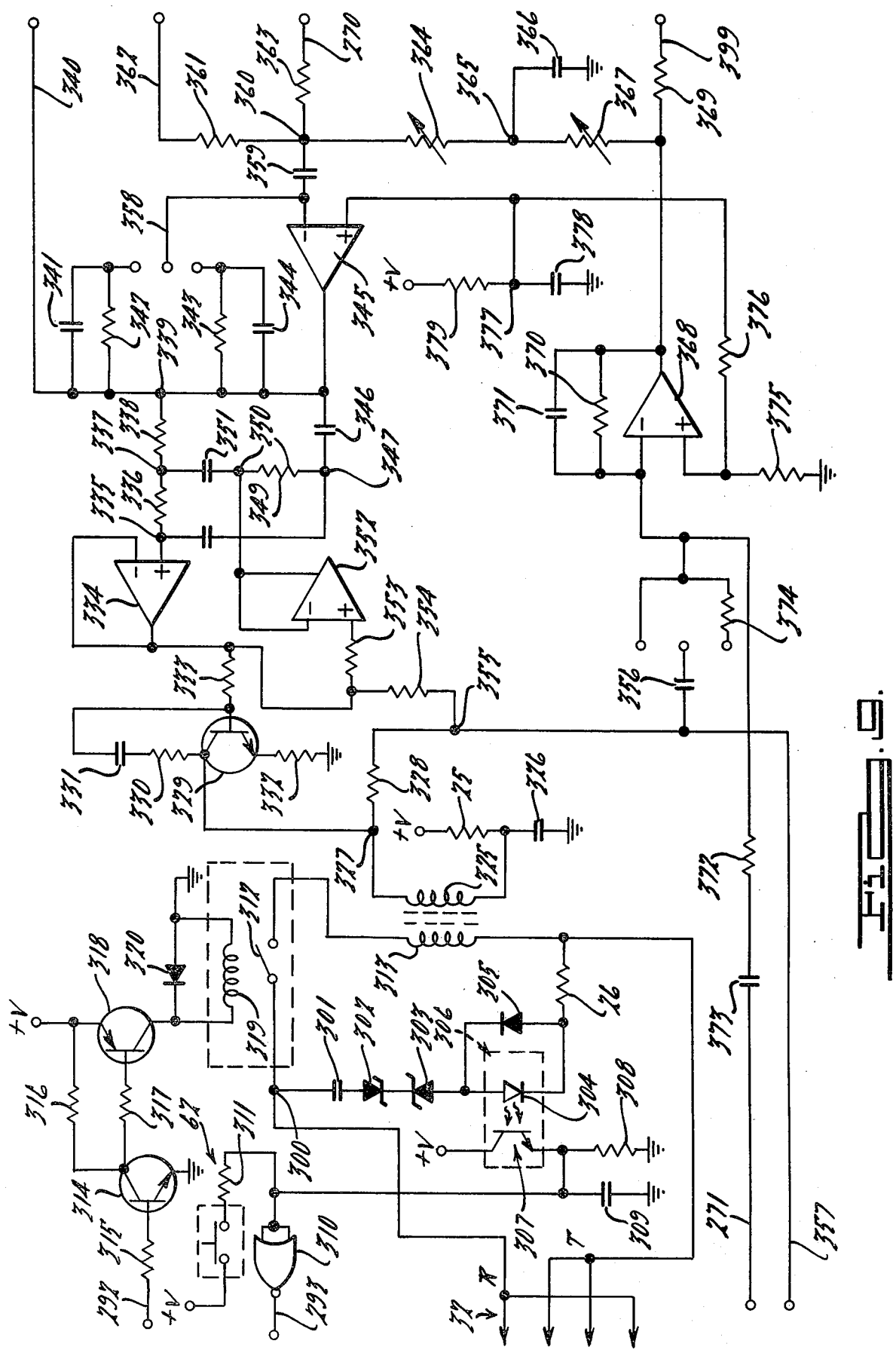

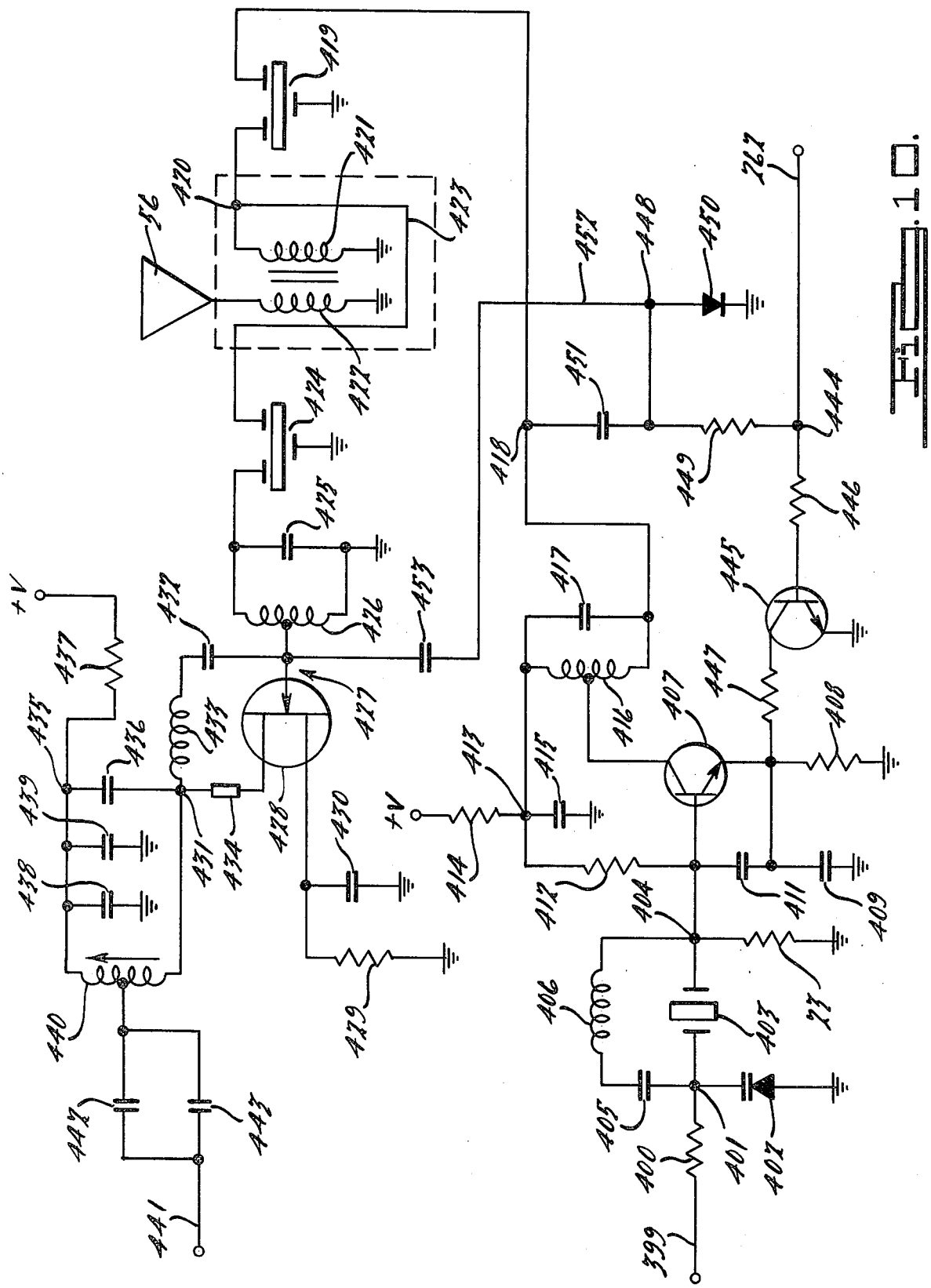

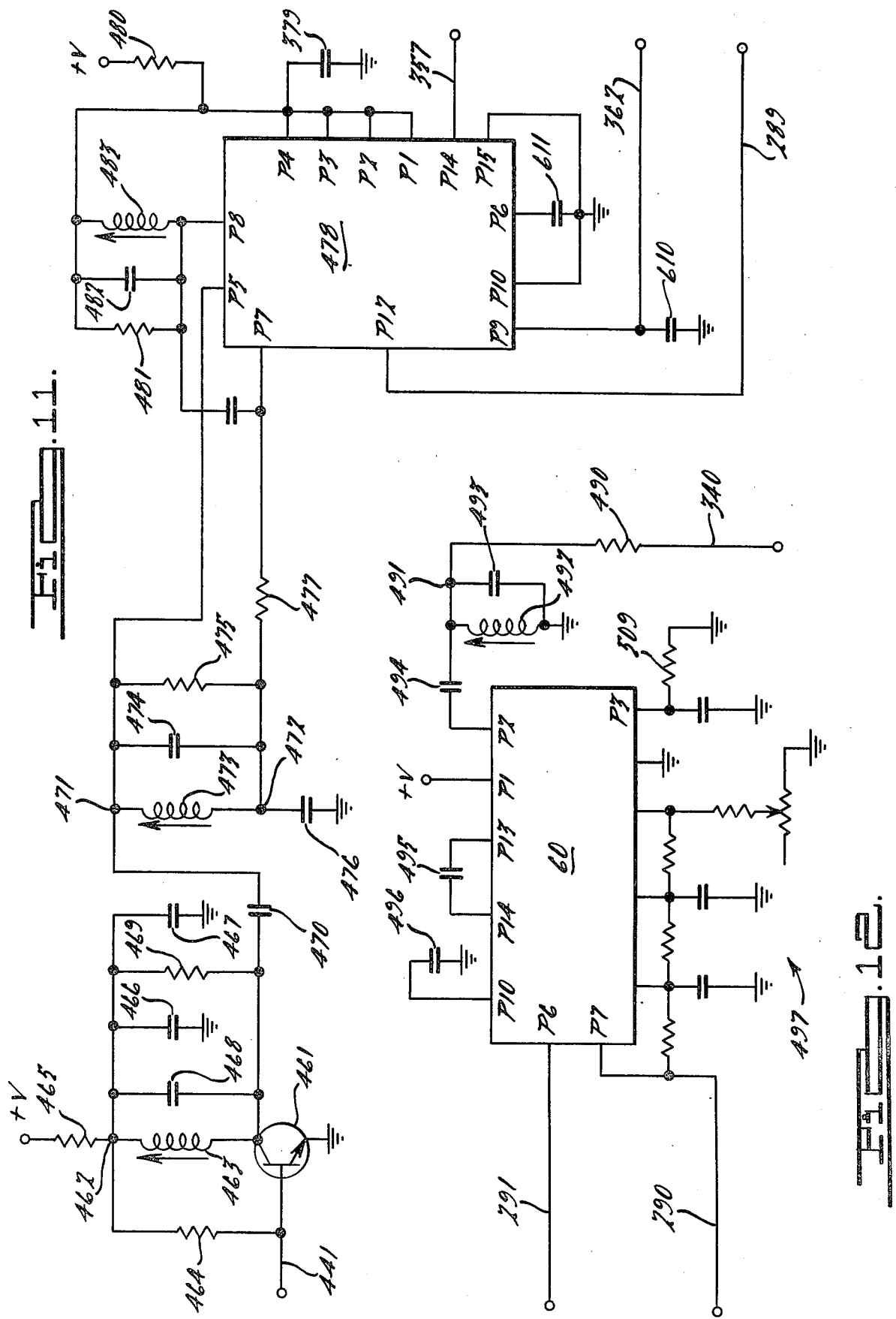

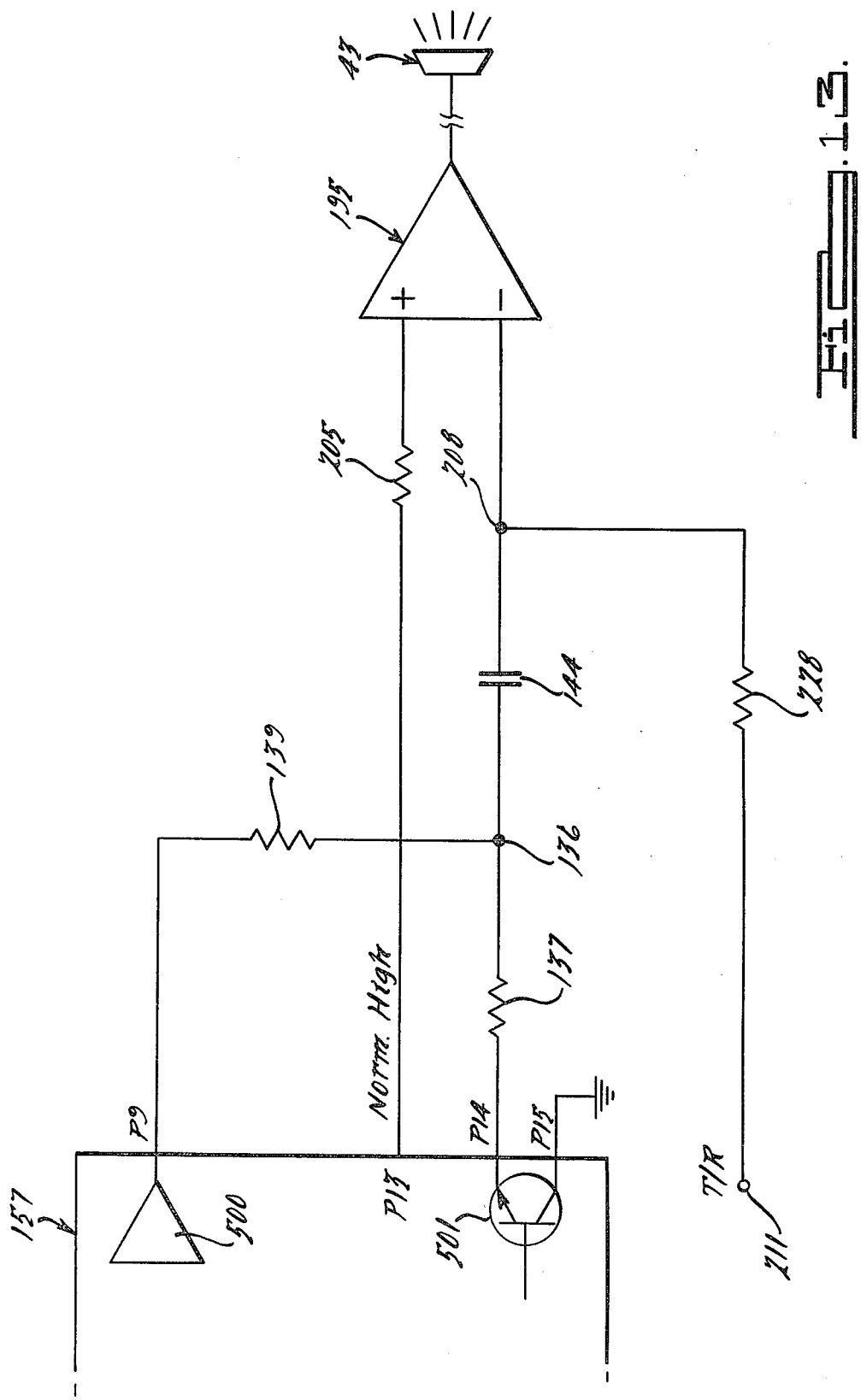

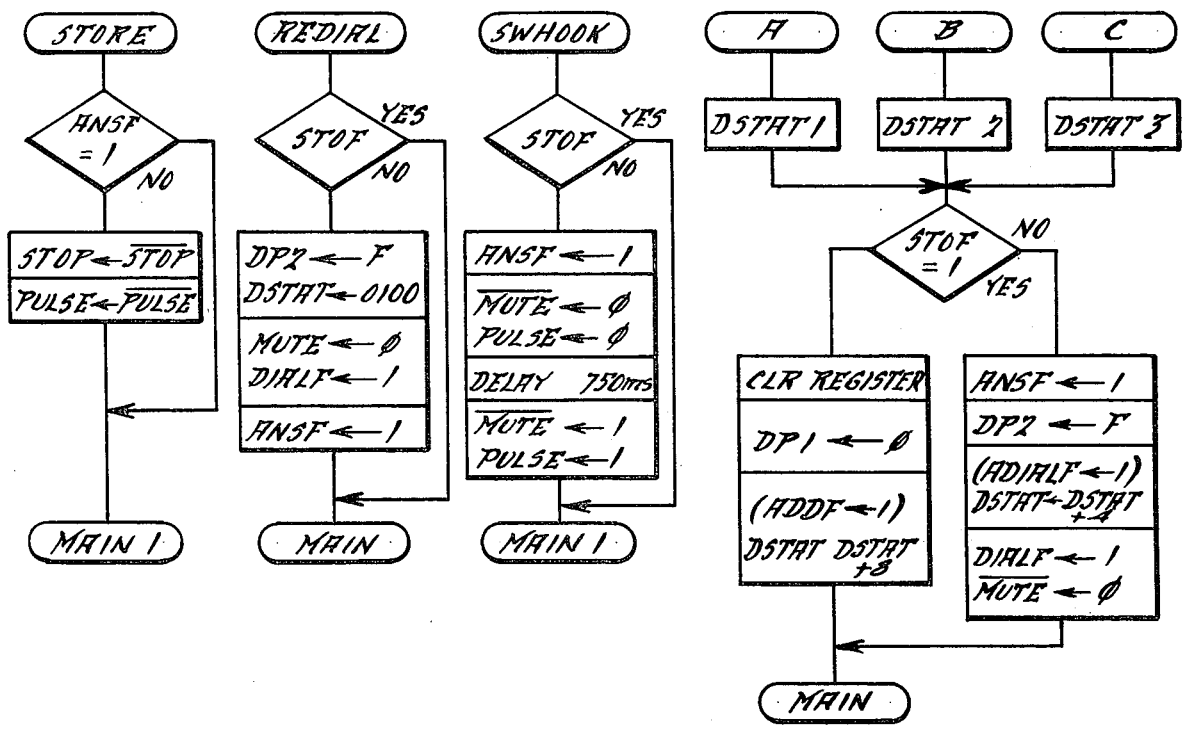
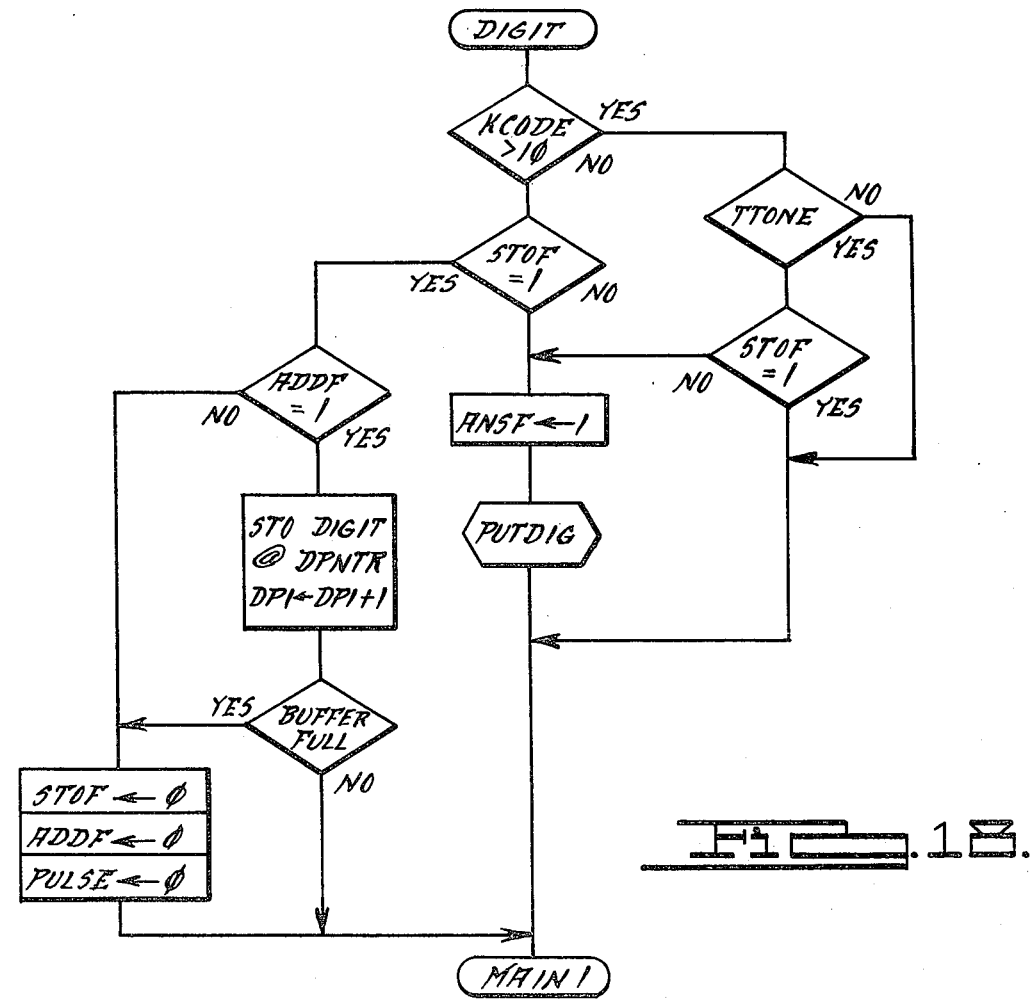
FIG. 18.

MICROPROCESSOR-BASED CORDLESS TELEPHONE SYSTEM

BACKGROUND OF THE INVENTION

1. Field of the Invention

The present invention relates generally to telephone communication systems, and more particularly to a cordless telephone system employing a full duplex FM radio frequency link between a base station which can be connected directly to a user's telephone lines and a remote cordless handset which is portable to permit an individual to carry the unit so that the telephone system may be used at points distant from the base unit.

2. Description of the Prior Art

Since the invention of the telephone personal communications between individuals has grown so that the majority of families in the United States now have telephone service. Rather than reaching a saturation point where each family is equipped with a single telephone, the trend has continued to the point where many families are now supplied with not one but several telephones for use in their homes.

The use of the second, third, etc. telephones as extension phones throughout the home has become increasingly popular. Previously, when only one telephone was installed in a home, a central location for this instrument was chosen. However, no single location can be perfect, and as a result, a person in the home is often forced to come some distance, particularly in a large home, to the location of the telephone either to make or to receive a telephone call.

Likewise, if the inhabitants of the home were to be in the yard, porch, basement, etc., the lack of proximity to a telephone instrument would result in extra steps and the possibility of missing a telephone call if the person were unable to respond by removing the handset from the telephone instrument within a reasonably short period of time after the ringing signal announced an incoming call.

Several solutions to these problems have been proposed. Among these are the use of many telephone extensions placed in convenient locations throughout the area. The other is the use of a multiplicity of telephone line jacks allowing a subscriber to move the telephone from one location to another to always be within easy access. Still another is the use of long extension cords to connect the telephone instrument to its terminal while allowing limited freedom in relocating the telephone.

All of these solutions lack any real flexibility since the location of the extension telephone or the extension jacks may be useful at times, but on many occasions, will be inadequate. In this so-called trend toward outdoor living today, various members of the family are frequently required to go from the garden or the patio to the nearest phone to answer it. In many cases this may be considerable distance and important telephone calls can be missed.

The most satisfactory solution to the extension telephone problem is the use of a telephone extension instrument that requires no wire connections between the instrument and the telephone line. Such an instrument commonly utilizes a radio link between terminal equipment connected to the telephone line and a remote instrument which allows the subscriber to take the instrument any place with a specified range of the telephone line terminal equipment located in his home or the like and permit him to both send and receive telephone calls from any given location. Such a wireless extension telephone could be taken to the garden, patio, basement, upstairs, downstairs, placed in any room of the house where convenient, as well as possibly even carried by the subscriber while visiting neighbors, etc., so that in-coming calls would not be missed and so that they might be rapidly answered without substantial movement on the part of the subscriber.

The advantages that such wireless telephones offer to subscribers are readily apparent. However, it should be pointed out that this same type of instrument will find considerable use in restaurants and other commercial establishments where the person to whom the in-coming call is directed can have the telephone brought to him for answering without the necessity for intervening extension cords or other cumbersome extensions. The number of possible uses for a wireless extension telephone in business, industry, etc., are limited only by the imagination of the user.

In order to overcome these problems, the prior art has evolved a number of types of cordless telephone systems. A typical cordless telephone system includes a cordless telephone handset and a base unit. The base unit is connected to the telephone lines and includes an antenna, a transmitter and a receiver for communicating an RF carrier signal that is modulated by telephone switching signals and audio signals to the cordless telephone. The cordless telephone handset includes a speaker and a microphone and also an antenna, transmitter and receiver for likewise communicating telephone switching signals and audio signals to the base unit via an RF carrier signal. The RF carrier signal transmitted by the cordless telephone usually has a different center frequency from the RF carrier signal transmitted by the base unit.

Switching signals representative of numeric characters may be generated in the cordless telephone by operating a typical telephone mechanical dialing mechanism to generate dialing pulse signals. Switching signals for initiating "off-the-hook" and "on-the-hook" switching functions may be generated by removing the telephone handset from its cradle and by replacing the same respectively. In a typical prior art cordless telephone the removal of the handset enables the transmitter and receiver in the cordless telephone for communication signals to the base unit.

Upon enablement of the transmitter, a control signal is generated in the cordless telephone and transmitted to the base unit. Upon receipt and detection of the control signal the base unit seizes the telephone lines so as to enable audio signals and switching signals from the cordless telephone that are received by the base unit within a given audio frequency band to pass onto the telephone lines.

Cordless telephone systems of the prior art are typically battery powered and include a switch for energizing or de-energizing the telephone so that the battery can be preserved while it is not desired to use the cordless telephone. When the cordless telephone is energized, it is enabled to receive and detect a "ring" signal from the base unit and to feed the ring signal to a speaker.

While the above-described cordless telephone is typical of the prior art, many different United States patents have been issued relating to cordless telephone systems and specific improvements therein. Examples of prior art United States patents relating to cordless telephones include U.S. Pat. No. Re. 26,459 which issued Sept. 17, 1968 to J. H. Lemelson; U.S. Pat. No. 3,193,623 which issued on July 6, 1965 to R. V. Burns et al; U.S. Pat. No. 3,254,159 which issued on May 13, 1966 to E. R. Condict; U.S. Pat. No. 3,286,184 which issued on Nov. 15, 1966 to F. H. Blitchington, Jr.; U.S. Pat. No. 3,366,744 which issued on Jan. 30, 1968 to M. Miller; U.S. Pat. No. 3,366,745 which issued on Jan. 30, 1968 to M. Miller; U.S. Pat. No. 3,366,880 which issued on Jan. 30, 1968 to J. P. Driver; U.S. Pat. No. 3,443,035 which issued on May 6, 1969 to T. E. McCay; U.S. Pat. No. 3,449,750 which issued on June 10, 1969 to G. H. Sweigert; U.S. Pat. No. 3,476,882 which issued on Nov. 4, 1969 to J. H. Vogelman et al; U.S. Pat. No. 3,535,689 which issued on Oct. 20, 1970 to H. S. Oden; U.S. Pat. No. 3,557,312 which issued on Jan. 19, 1971 to J. H. Bogelman et al; U.S. Pat. No. 3,586,787 which issued on June 22, 1971 to J. H. Vogelman, et al; U.S. Pat. No. 3,644,681 which issued on Feb. 22, 1972 to D. E. Rice; U.S. Pat. No. 3,840,811 which issued Oct. 8, 1974 to R. D. Blouch; U.S. Pat. No. 3,919,491 which issued on Nov. 11, 1975 to C. L. Luce; U.S. Pat. No. 4,032,723 which issued on June 28, 1977 to L. E. Mendoza; U.S. Pat. No. 4,039,760 which issued on Aug. 2, 1977 to L. D. Gregory et al; and U.S. Pat. No. 4,053,717 which issued on Oct. 11, 1977 to D. E. Snider. These patents are illustrative of the state of the art and represent many different approaches at solving the various problems relating to cordless telephone systems.

While the prior art attempted to solve the same general problems, many different approaches were taken and many new and different problems arose. Most of the systems require that the remote handset be operated within relatively short distances from the base unit and many experience interference from various energy sources in the area, cross-talk between transmitted and received signals, excessive noise, and the like while most systems claim to have great range, most have an effective range of about 200 feet. Similarly, line seizure was often inadvertently terminated in systems where maintaining line acquisition requires the continuous receipt of a generated tone. The range of the system, noise levels, interference, etc. are to a large part related to the particular frequencies used, and this is to some extent governed by FCC regulations.

Another continuing problem exists where an unauthorized user in possession of a cordless remote handset utilizes the handset to place unauthorized calls over a subscriber's telephone lines with the result that the subscriber is billed for the unauthorized calls.

Many of the prior art patents listed above attempted to solve one or more of these problems but none successfully solved even a small portion thereof. In other areas, such as radio telephones, conventional radio transmitters and receivers, and conventional telephone systems, inventors have begun developing sophisticated improvements to such systems employing microprocessor controls, dialing memories, security features and the like. Examples of such prior art patents include U.S. Pat. No. 3,590,166 which issued on June 29, 1971 to A. Anschutz; U.S. Pat. No. 3,931,565 which issued on Jan. 6, 1976 to S. Amoroso; U.S. Pat. No. 3,961,261 l which issued on June 1, 1976 to P. W. Pflasterer; U.S. Pat. No. 3,962,644 which issued on June 8, 1976 to W. Baker; U.S. Pat. No. 4,000,468 which issued on Dec. 28, 1976 to J. R. Brown; U.S. Pat. No. 4,008,380 which issued Feb. 15, 1977 to R. C. LaBorde; U.S. Pat. No. 4,059,728 which issued on Nov. 22, 1977 to C. P. Milkes; U.S. Pat. No. 4,087,638 which issued May 2, 1978 to J. C. Hayes et al; and U.S. Pat. No. 4,122,304 which issued Oct. 24, 1978 to T. O. Mallien.

In spite of all of these advances a low cost, reliable and compact cordless telephone system which is compatable with all existing telephone systems and which meets all state and federal regulations had still not been achieved.

Thus, a relatively simple, inexpensive, trouble-free cordless telephone system having substantially greater range, reliability and security was required. The present invention provides such a cordless telephone system and employs several unique features which increase the range and reliability of the system while reducing noise and undesirable cross-talk; which provides some measure of privacy while simultaneously making it difficult for an unauthorized user to place calls on a subscriber's system; which reduce the size while increasing the portability of the cordless handset thereby solving substantially all of the problems of prior art cordless telephone systems.

SUMMARY OF THE INVENTION

The cordless telephone system of the present invention includes a base unit operatively coupled to a user's telephone lines and a portable cordless handset capable of being used at a location remote from the base unit. The base unit and cordless handset each include a radio transceiver having a transmitter, a receiver and a single antenna which forms a full duplex radio link for two-way communications between the base unit and the cordless handset. The transmitter of the base unit and the receiver of the cordless handset operate on a first non-CB frequency and the transmitter of the cordless handset and the receiver of the base unit operate on a second different and distinct non-CB frequency. Each of the transceivers further includes a switching means for selecting one of a receive-only mode of operation and a transmit-receive mode of operation.

Means are included which are responsive to the switching means having selected a receive-only mode of operation for supplying a relatively small quantity of energy to the transmitter for generating only a relatively weak transmitter frequency signal and direct signal injection means are provided for coupling the relatively weak transmitter frequency signal from the transmitter to the receiver of a corresponding transceiver for directly injecting the relatively weak transmitter frequency signal into the receiver to serve as the local oscillator frequency thereof.

Means are further provided which are responsive to the switching means having selected the transmit-receive mode of operation for supplying a relatively large quantity of energy to the transmitter for generating a relatively strong transmitter frequency signal and for simultaneously disabling the direct signal injection means. Means for coupling the single antenna to the output of the transmitter and to the input of the receiver of the transceiver are provided such that a small portion of the relatively strong transmitter frequency signal is coupled into the input of the receiver to serve as the local oscillator frequency thereof whenever the transceiver is in the transmit-receive mode of operation.

In the preferred embodiment of the present invention, the full duplex radio link between the base unit and the cordless handset is an FM radio link and the first and second non-CB frequencies are in the range 49.82

MHz≦f≦49.90 MHz. Preferably, the first non-CB frequency is greater than the second non-CB frequency and the relatively small difference between the first and second frequencies is usually given by 15 nKhz where "n" is a whole number and 1≦n≦4.

One important feature of the invention is the coupling circuitry which enables a portion of the transmitter frequency signal to be used as the local oscillator frequency of the receiver in both the receive-only mode of operation and the transmit-receive mode of operation. A first crystal filter is coupled between the output of the transmitter and the antenna and a second crystal filter is connected between the antenna and the input of the receiver. During the transmit-receive mode of operation, the output of the transmitter is a relatively strong and a relatively small portion of this transmitter signal is passed by the second crystal filter due to a small overlap in the band pass characteristics of the filters. This small portion of the transmitter signal is sufficient to serve as the local oscillator frequency of the receiver during T/R operation.

A direct signal injection path is provided in lieu of the first and second crystal filters from the output of the transmitter to the input of the receiver so that the relatively weak output of the transmitter is normally supplied to the receiver input to serve as the local oscillator frequency thereof while the transceiver is in the receive-only mode of operation, but the direct signal injection path is disabled when the transmit-receive mode of operation is selected. Therefore, regardless of the mode of operation a portion of the transmitter frequency is used to provide the local oscillator frequency of the receiver without producing any substantial undesirable cross-talk between transmitted and received frequencies.

Another feature in this invention includes compensation means for balancing out the demodulation component of the received signal attributable to the modulated transmitter signal being used to provide the local oscillator function. Still another important aspect of the present invention is the inclusion of a unique means for providing the full strength of a local ringing signal to the speaker in the cordless handset to generate a loud audible ringing tone but for normally supplying a reduced amplitude audio signal for driving the speaker at a lesser level during normal speech conditions.

In the preferred embodiment of the present invention the cordless handset further includes keyboard means for entering dialing information or addressing instructions and security identification switching means for entering an authorized user's identification code. A hook switch is provided either on the keyboard or off or both for selecting either an "off-the-hook" or an "on-the-hook" state. Preferably, the cordless handset also includes logic circuitry responsive to keyboard-entered dialing information and the switch-entered security identification code for generating data words indicative thereof. Means are provided for generating a subcarrier frequency tone and an FSK signal which is used to encode the data words for radio transmission back to the base unit. The subcarrier frequency tone and FSK-encoded data words modulate the radio carrier frequency which is also frequency modulated with audio information from a microphone in the cordless handset.

The base unit of the preferred embodiment of the invention includes an FSK-decoder responsive to the transmitted FSK-encoded data words for detecting and decoding same and a microprocessor is provided for receiving the data words from the decoder and identifying dialing information, security code information, addressing instructions and the like. Whenever the cordless handset is activated to the "off-the-hook" state, the logic means automatically generates a security identification data word which is FSK-encoded and transmitted to the base unit. At the base unit, the security identification code data word is decoded and the microprocessor compares this word with a stored security identification code to identify an authorized user. When an authorized user is identified, the microprocessor generates a line seizure command and means responsive to the line seizure command seizes the subscriber's telephone lines to enable two-way communications between the remote handset and the party calling or being called on the telephone line and maintains the acquisition thereof so long as the subcarrier frequency tone continues to be received at the base unit indicating that the cordless handset is still "off-the-hook".

Yet another important feature of the invention is in the inclusion of a dialing signal mode switch positionable to first, second and third switch positions. In the first switch position, the microprocessor will generate digital dialing pulses at a rate of ten pulses per second for transmission over the telephone lines; in a second switch position the microprocessor will generate digital dialing pulses at a rate of twenty pulses per second for output over the telephone lines; and in the third switch position the microprocessor will generate a dialing command and the base unit includes a tone encoder means responsive to the dialing command for generating dual-tone multiple-frequency dialing signals for output over the telephone lines. This enables the system of the present invention to be used with any type of telephone system currently in use.

The microprocessor-based control system used in the base unit of the present invention provides a highly efficient means for performing a variety of functions including (1) recognizing incoming ringing signals; (2) generating a local ringing signal for transmission to the cordless handset in response to the detection of an incoming ringing signal; (3) generating a transmit enable signal in response to the detection of an in-coming ringing signal to apply full power to the transmitter thereby switching the base unit from a receive-only mode of operation in which power and energy are conserved to a transmit-receive mode of operation; (4) identifying decoded data words as containing security code identification information, dialing information, addressing instructions or the like; (5) comparing an identified security code information data word with a stored security information code for identifying an authorized user; (6) generating a line seizure command in response to the detection or verification of an authorized user and for maintaining line acquisition so long as the subcarrier frequency tone continues to be received at the base unit or a hang-up signal is received from the handset; (7) automatically storing the last-called telephone number and recalling same upon command for automatic dialing purposes; (8) internally storing predetermined telephone numbers for automatic dialing purposes; (9) controlling the generation of dialing signals for output on the telephone lines to accomplish the dialing functions in response to the recognition of a decoded dialing information data word; (10) muting the transmitter modulation during the identification and dialing operations, and the like. The use of the microprocessor to accomplish these functions greatly reduces the size and cost of the cordless telephone while increasing its range, accuracy, reliability, maintainability and the like.

Other advantages and meritoreous features of the present invention will be more fully understood from the following description of the preferred embodiment, the appended claims and the drawings which are briefly described hereinbelow.

BRIEF DESCRIPTION OF THE DRAWINGS

FIG. 3 is a block diagram of the base unit of the cordless telephone system of the present invention;

FIG. 4 is an electrical schematic diagram of the transmitter, transmitter modulator, microphone, antenna coupling circuit and the receiver input of the remote cordless handset of FIG. 2;

FIG. 5 is an electrical schematic diagram of the receiver of the cordless handset of FIG. 2;

FIG. 6 is a partial block diagram and electrical schematic diagram illustrating the keyboard I.D. switches, audio amplifier, speaker, and logic portions of the cordless handset of FIG. 2;

FIG. 7 is a detailed block diagram of the logic circuitry of block 44 of FIG. 6;

FIG. 8 is a detailed block diagram of the microprocessor, dialing mode switch, security I.D. switches, and the tone encoder portions of the base unit of FIG. 3;

FIG. 9 is an electrical schematic diagram of the ring detector circuitry, line seizure circuitry, and transmitter modulation amplifier of the base unit of FIG. 3;

FIG. 10 is an electrical schematic diagram of the transmitter circuitry, antenna coupling circuitry, and receiver input circuitry of the transceiver 55 of FIG. 3;

FIG. 11 is a schematic diagram of the remaining portion of the receiver circuitry of FIG. 3;

FIG. 12 is a block diagram with associated circuitry illustrating the FSK detector/decoder of block 60 of FIG. 3;

FIG. 13 is a schematic diagram illustrating the circuitry of the cordless handset used to control the audio amplifier operation;

FIGS. 14 through 21 are the flow diagrams for this invention.

DESCRIPTION OF THE PREFERRED EMBODIMENT

Figure 1:
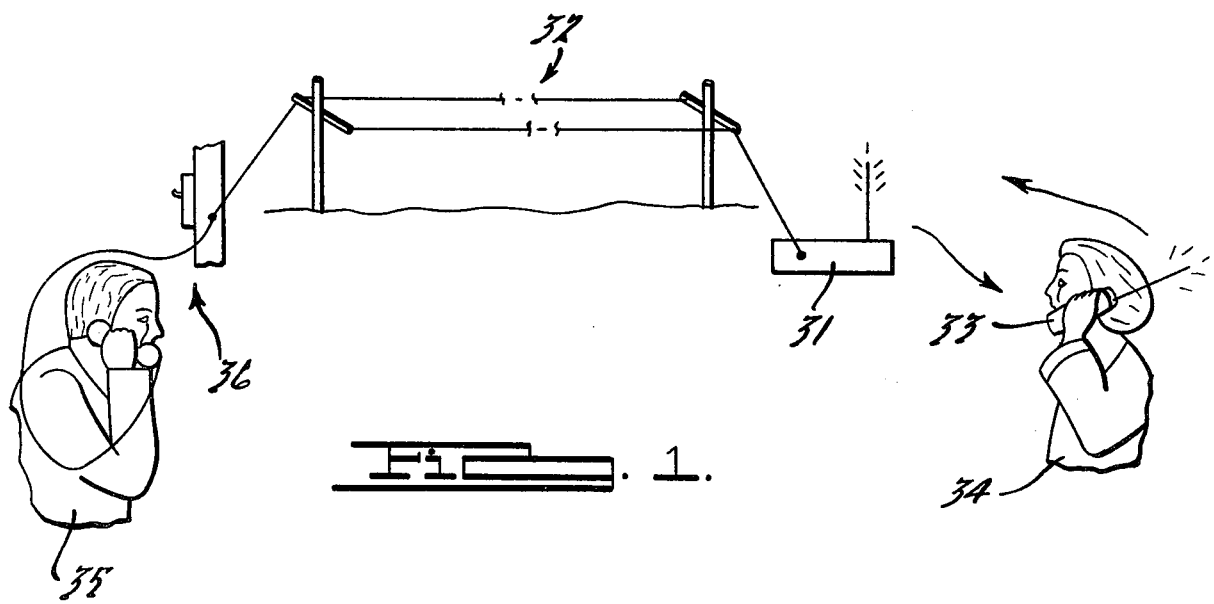
FIG. 1 broadly illustrates the cordless telephone system of the present invention.

FIG. 1 illustrates the cordless telephone system of the present invention. The cordless telephone system of FIG. 1 includes a base unit or base station 31 which is electrically coupled to a subscriber's telephone lines 32. The base unit 31 communicates via a radio link with a remote portable cordless telephone handset 33 which may be of any conventional design although it is preferably compact, portable and light-weight. A subscriber or authorized user 34 may use the cordless handset 33 to communicate with the base unit 31 for placing and receiving telephone calls. The party 35 calling or being called on a conventional telephone instrument 36 also communicates with the base unit 31 via the telephone network or telephone lines 32 thereby completing the communications link between the party 35 and the user 34.

The base unit 31 and the cordless handset 33 include a full duplex FM radio link which enables two-way communications between the base unit 31 and the cordless handset 33. If the party 35 places a call on a conventional telephone instrument 36 to the authorized user or subscriber 34, the conventional telephone ringing signal on the telephone lines 32 will be received by the base unit 31. When the base unit 31 receives the ringing signal, it generates a corresponding local ringing signal for radio transmission to the cordless handset 33. The handset, if placed in the standby mode, will produce a ringing signal. When the user 34 answers the telephone by placing a switch in the "off-the-hook" position, a signal is sent back to the base unit 31, and if the person 34 is identified as an authorized user, the base unit 31 will seize the telephone line 32 to enable two-way communication between the calling party 35 and the authorized user 34.

Similarly, the user 34 may initiate a telephone call at the remote cordless handset 33 by moving the hook switch to its "off-the-hook" position. This information and the user's security I.D. code is transmitted back to the base unit 31 and if the base unit identifies the user 34 as an authorized user, it will seize the telephone lines 32 and allow the user to control the generation of conventional dialing signals to be outputted over the telephone lines 32 thereby enabling the telephone instrument 36 to ring the called party 35.

Figure 2:
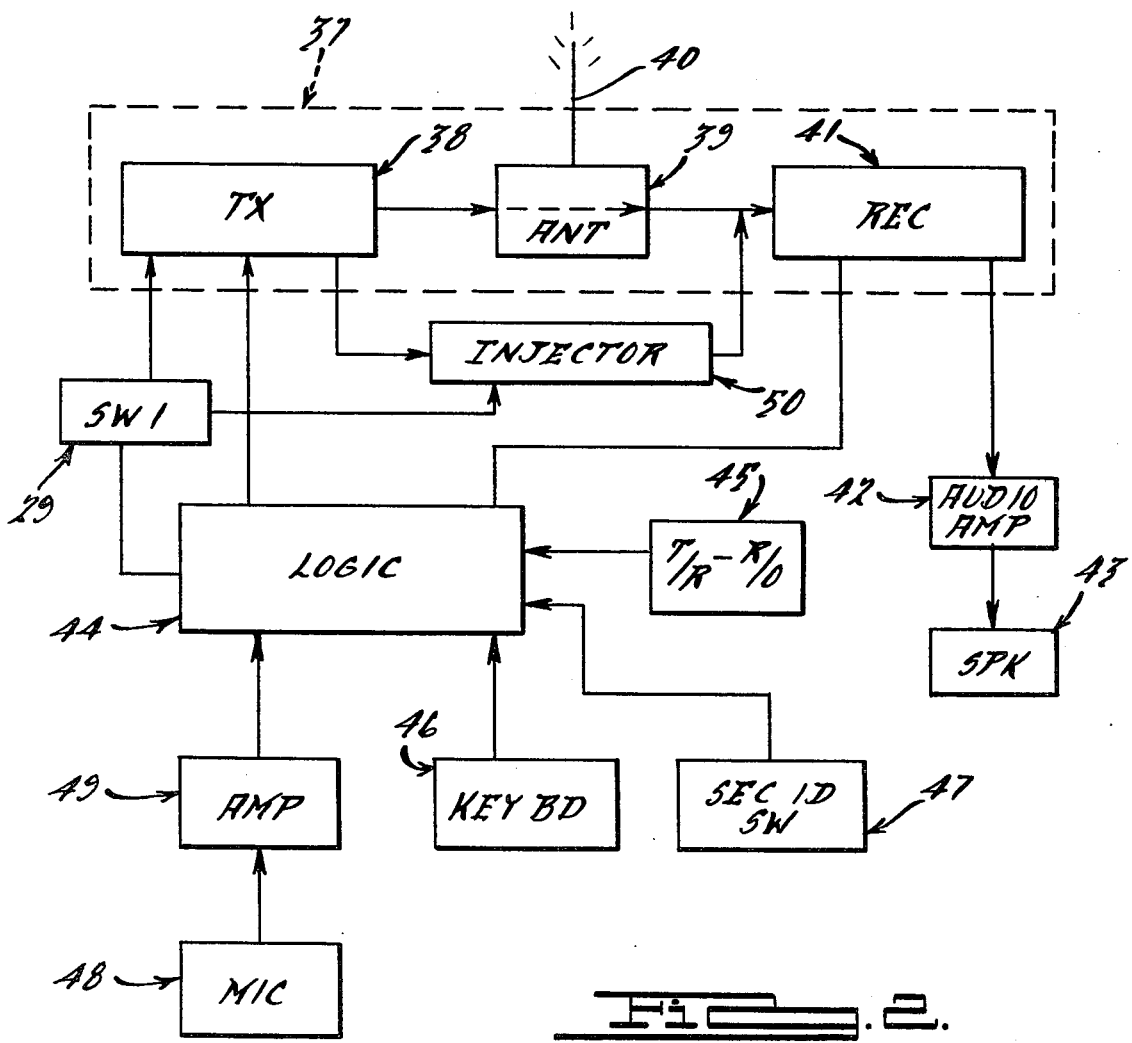
FIG. 2 is a block diagram of the remote cordless handset of the present invention.
Figure 14:
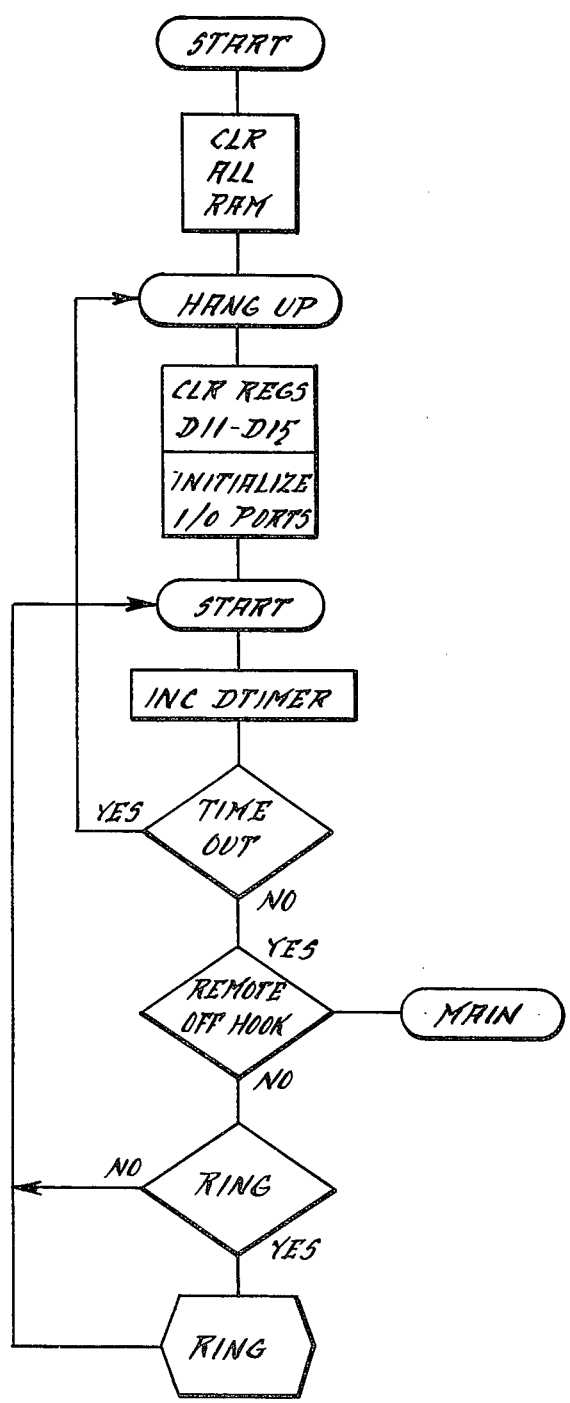
Figure 21:
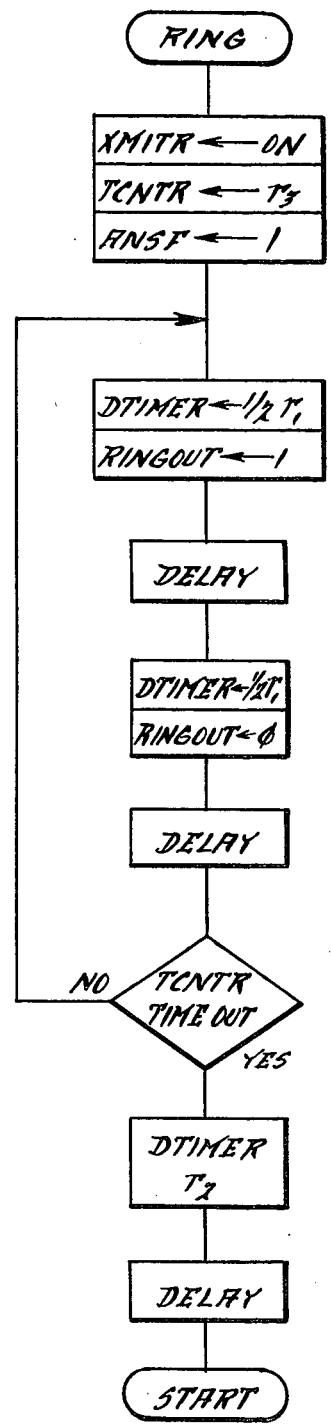
Figure 15:
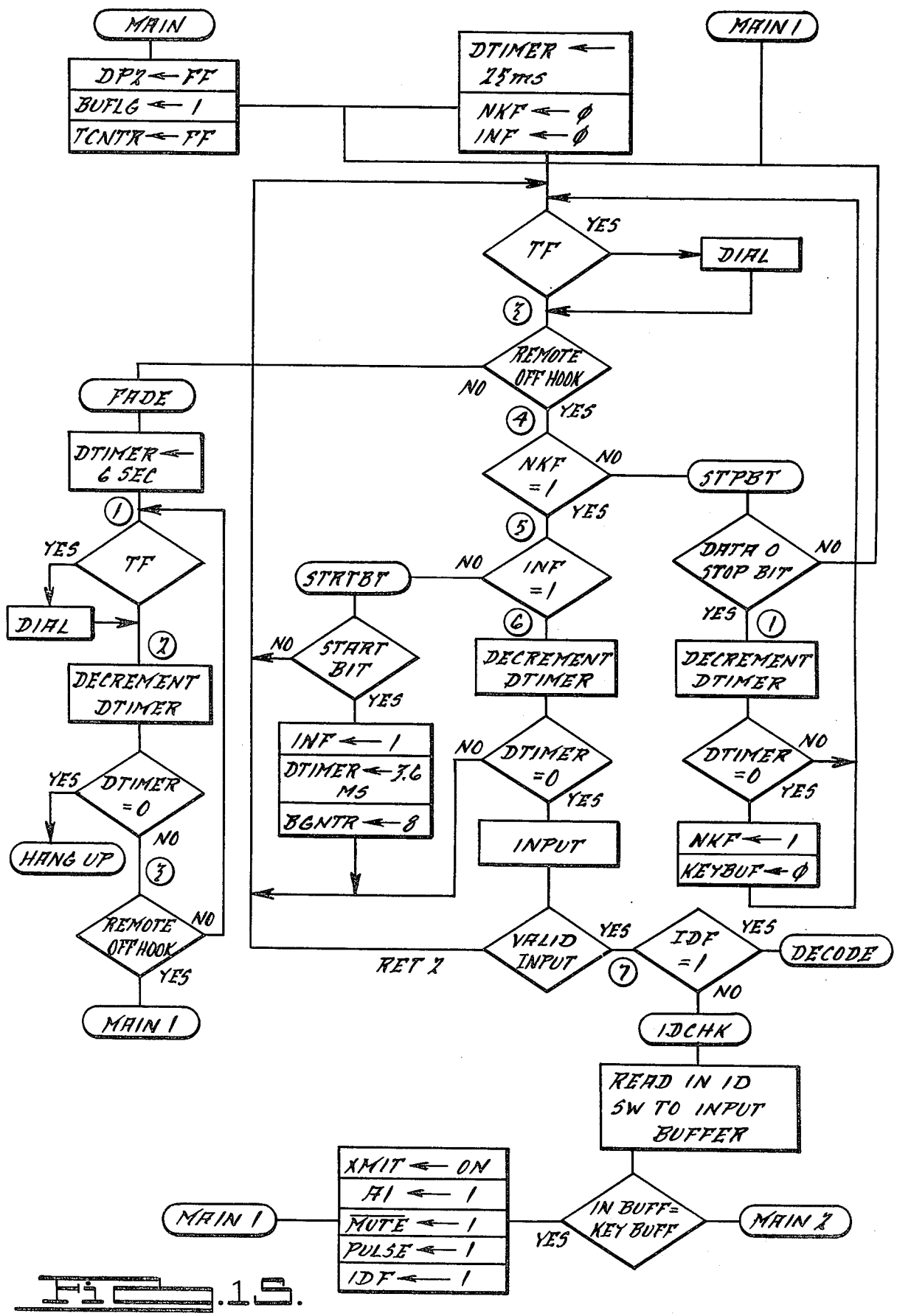
Figure 1B:
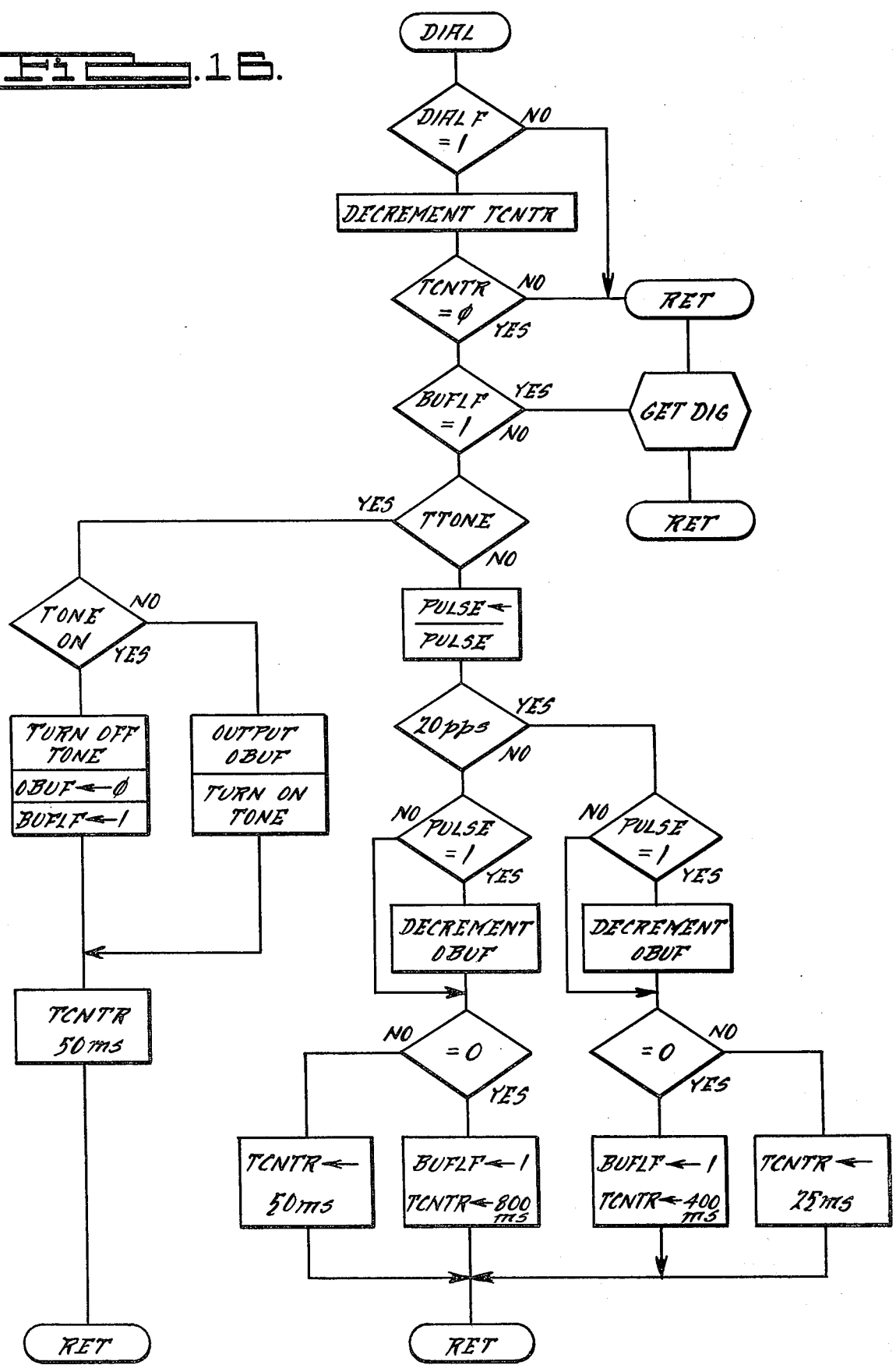
Figure 17:
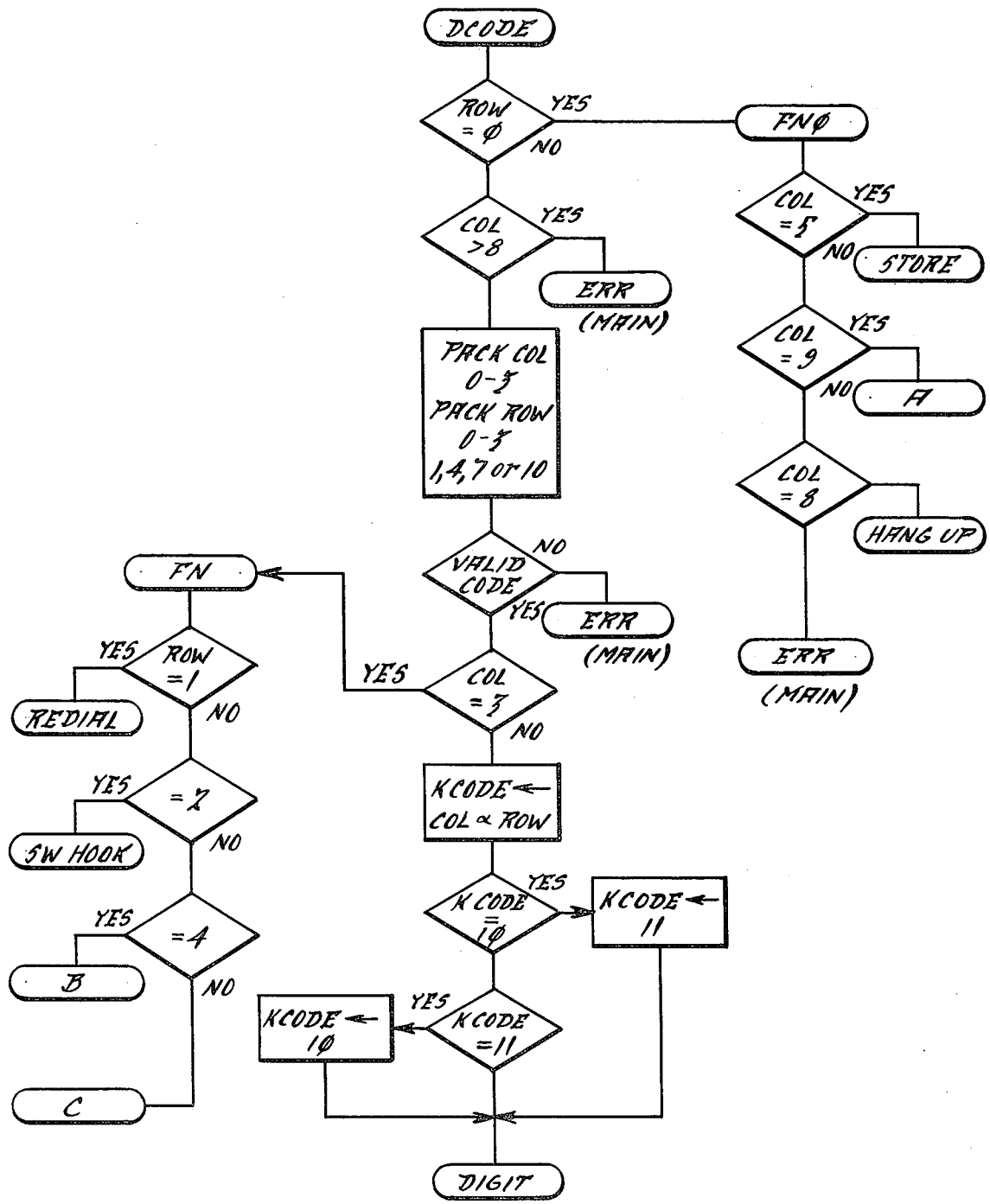
Figure 18:
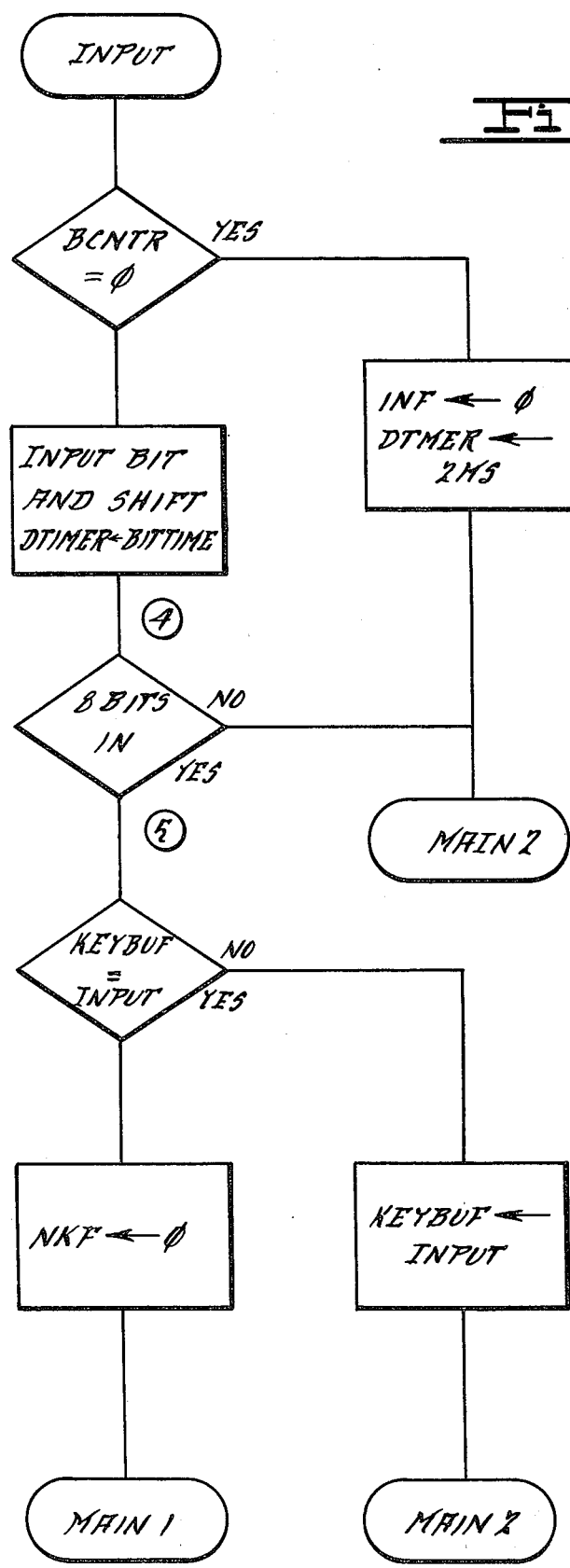
Figure 20:
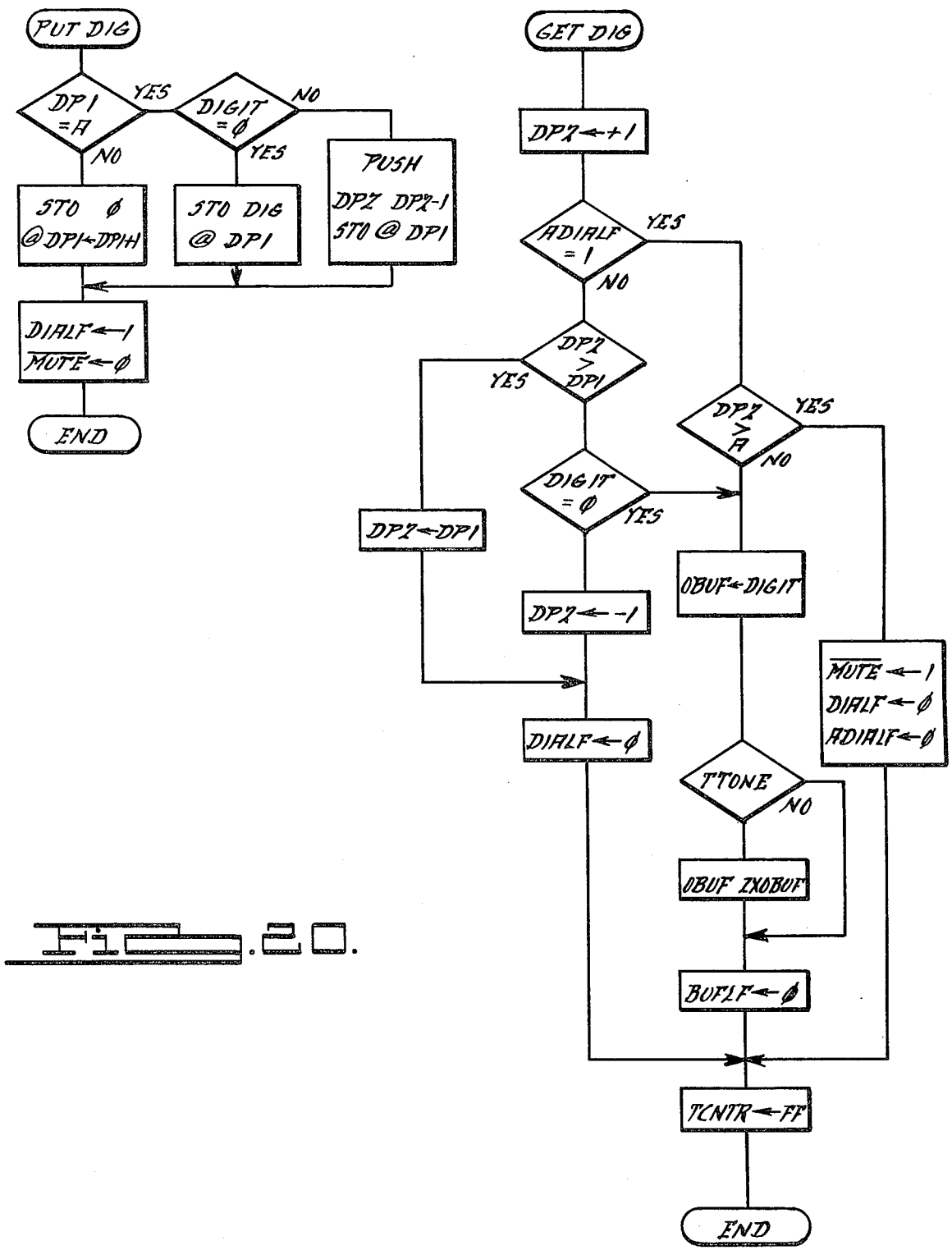

The remote cordless handset of FIG. 1 is broadly illustrated by the block diagram of FIG. 2. The cordless handset of FIG. 2 includes a radio transceiver 37 designed to operate in a non-CB frequency range. In the preferred embodiment of the present invention, the transceiver 37 operates in the frequency range 49.82 MHz to 49.90 MHz.

The cordless handset transceiver 37 includes a transmitter 38 whose output is coupled to a single antenna 40 through an antenna coupling network 39. The antenna coupling network 39 also couples the signals received by the antenna 40 to a receiver 41. The single antenna 40 is used for both transmitting and receiving and although the frequency of the transmitted signal and the frequency of operation of the receiver 41 may be relatively close together, the antenna coupling network 39 substantially eliminates undesirable cross-talk between transmitted and received signals. In the preferred embodiment of the present invention, the cordless handset transmitter 38 operates on a transmitter frequency of 49.845 MHz and the receiver 41 is designed to operate on a frequency of 49.89 MHz.

The demodulated audio output of the receiver 41 is coupled to an audio amplifier 42 which is used to drive a speaker 43 for audibilizing both the local ringing signal and speech information. The receiver 41 is also coupled to logic circuitry represented by block 44. The logic circuitry of block 44 is also connected to the transmitter 38 and to a "hook" switch or T/R-R/O switch 45. A conventional key pad or push-button keyboard 46 supplies keyboard information to the logic network of block 44. Security identification switches represented by block 47 are used to enter security code information which is processed by the logic network of block 44 for transmission of the base unit 31.

The cordless handset of FIG. 2 also includes a microphone 48 for converting the user's speech into audio signals which are used to frequency modulate the transmitter frequency of the transmitter 38 via the amplifier circuitry of block 49, as hereinafter described. Furthermore, a transmit-enable switch 29 is used to control the energy to the transmitter 38 for Transmit/Receive Operations and for disabling the signal injector circuitry of block 50, as hereinafter described.

Therefore, the cordless handset 33 includes a microphone 48 for enabling an authorized user to send speech information to the base unit 31; a speaker 43 for allowing the authorized user to hear an in-coming local ringing signal and audible speech information transmitted from the base unit 31; and a "hook" switch 45 is used for establishing a "active" or "off-the-hook" condition corresponding to that which exists when a conventional telephone handset is picked up or answered and an "inactive" or "on-the-hook" state such as exists when a conventional telephone handset is hung up. The cordless handset 33 further includes security identification switches 47 to enable an authorized user to enter a discrete security information identification code for transmission back to the base unit 31 for identification purposes and a keyboard 46 to allow the user to enter dialing information, addressing instructions or the like.

FIG. 3 is a broad block diagram of the base unit 31 of FIG. 1 and, in the preferred embodiment of the present invention, substantially all of the command and control operations are performed by a microprocessor 51. The base unit 31 further includes ring detection circuitry 52 and line seizure circuitry 53 operatively coupled to the subscriber's telephone lines 32. An operational amplifier circuit 54 couples the seized telephone lines to the FM radio transceiver 55 of the base unit 31 as hereinafter described in greater detail. The base unit transceiver 55 includes a single antenna 56, a transmitter 57, an antenna coupling network 58, and a receiver 59.

Frequency shift-keyed (FSK) encoded data received by the base unit transceiver 55 from the handset transceiver 37 is supplied to an FSK detector/decoder 60 whose input is supplied to the microprocessor 51. A transmit-enable circuit 61 operates, under microprocessor command, to control the supply of power to the transceiver 55 and injection circuit 65 such that when a relatively small quantity of energy is supplied to the transmitter 57, the transceiver 55 is in a "stand-by" or "receive-only" (R/O) mode of operation, and when a relatively large amount of energy is supplied to the transmitter 57 via the switching means 61, the transceiver 55 switches to a "active" or "transmit-receive" (T/R) mode of operation.

A call switch 62 supplies information to the microprocessor 51 which enables the system to be used for paging purposes. The dialing select switch 63 provides dialing mode instructions to the microprocessor 51 thereby enabling the microprocessor 51 to control the output of conventional telephone dialing signals on the telephone lines 32 and any one of three different dialing modes of operation. Security identification switches 64 supply security identification code information to the microprocessor 51 to enable the microprocessor 51 to identify authorized users. A tone encoder circuit 66 is also controlled by the microprocessor 51 and may be used to output dual tone multifrequency (DTMF) dialing signals over the seized telephone lines 32 via the operational amplifier circuitry of block 54, as hereinafter described.

In the preferred embodiment of the present invention, the base unit transceiver 55 is a FM radio transceiver operating in a non-CB frequency band. In the preferred embodiment of the present invention, the transceiver 55 operates in the frequency band 49.82 MHz to 49.90 MHz. Preferably, the transmitter 57 of the base unit transceiver 55 and the receiver 41 of the cordless handset transceiver 37 operate at a first channel frequency of 49.89 MHz while the transmitter 38 of the cordless handset transceiver 37 and the receiver 59 of the base unit transceiver 55 operate at a second different and distinct channel frequency of 49.845 MHz. The difference between the first and second frequencies is relatively small, but as hereinafter described, undesirable crosstalk is substantially eliminated and some is actually used for beneficial purposes.

FIG. 4 is an electrical schematic diagram of the microphone circuitry of block 48, the operational amplifier circuitry of block 49, the transmitter circuitry of block 38, the antenna coupling network of block 39, the antenna 40, and the input of the receiver 31 of the circuit of FIG. 2. The transmitter 38 of the cordless handset transceiver 37 of FIG. 2 includes a transmitter input represented by lead 67 which is connected directly to an input node 68. The input node 68 is connected to ground through the parallel combination of capacitor 69 and resistor 70; is connected to a frequency modulation node 71 via resistor 72; and is connected to a node 73 through a resistor 74. The node 73 is connected to ground through a capacitor 75 and is connected to a +5-volt source of potential through a resistor 76.

Node 71 is connected to one terminal of a varactor diode 77 whose opposite terminal is grounded, and the varactor diode 77 performs the actual frequency modulation for the transmitter 38. Node 71 is also connected to one terminal of a crystal 78 whose frequency is selected so as to produce a preferred transmitter frequency of 49.845 MHz. The resistors 70,74 are used for biasing the varactor 77.

The other terminal of the crystal 78 is connected to the base of a transistor 79; is connected back to the node 71 through the series combination of inductor 80 and capacitor 81; and is connected to one plate of a feedback capacitor 82 whose opposite plate is connected to a node 83. Node 83 is connected through a capacitor 84 to ground and is connected directly to the emitter electrode of transistor 79

The collector of transistor 79 is connected to a tap on an inductor 85. One terminal of the inductor 85 is connected to the +5-volt source of potential through resistor 76 while the opposite terminal is connected to node 87. A capacitor 86 is connected in parallel with inductor 85 and the output of the transmitter 38 is taken from node 87.

The combination of crystal 78, transistor 79, and the circuitry associated therewith is configured as a conventional Colpitts oscillator. This circuit is a regenerative oscillator with a feedback path being established from the emitter of transistor 79 back to the base through a capacitor 82. The varactor diode 77 is responsive to the audio signal supplied via input 67 for modulating the frequency of the transmitter signal in response to the audio signal present at node 71. The transmitter oscillator comprising crystal 78 and transistor 79 is operated in two different and distinct modes. The transmitter oscillator is biased so as to generate a relatively weak transmitter frequency signal during the stand-by or receive-only mode of operation but the transmitter oscillator may be driven harder to generate a relatively strong transmitter frequency signal during the transmit-receive mode of operation, as described hereinafter.

The transmitter output at node 87 is connected to one terminal of a crystal filter 88 whose opposite terminal is connected to a tap on an inductor coil 89. One terminal of the inductive coil 89 is connected to ground while the other terminal is connected to drive the antenna 40. A second crystal filter has one terminal connected to a similar tap on the inductive coil 89 and the opposite terminal connected to ground through the parallel combination of an inductive coil 91 and a capacitor 92. A tap on inductor 91 is connected directly to the receiver input node 93 as hereinafter described.

Each of the first and second crystal filters 88 and 90 is a band pass filter. The first crystal filter 88 is selective so that its center frequency or pass frequency is equal to that of the transmitter frequency or, in the preferred embodiment of the present invention, 49.845 MHz. The second crystal filter 90 is selected so that its center frequency is equal to the operational frequency of the receiver 41 which is 49.89 MHz in the preferred embodiment of the present invention. The band pass characteristics of each of the filters 88, 90 are such that substantially all undesirable cross-talk and noise are filtered out during the receive-only mode of operation and only a small portion of the transmitter frequency is passed by the second crystal filter 90 during the transmit-receive mode of operation. The receiver crystal filter 90 is selected so that its band width slightly overlaps the band width of the transmitter crystal filter 88 since it is desired, in the transmit-receive mode of operation, that at least a small portion of the transmitter frequency signal is passed to the receiver input node 93 for providing the local oscillator function of the receiver 41 as hereinafter described.

The receiver input 93 is directly connected to the gate electrode of an FET transistor 94. One current-carrying electrode of FET transistor 94 is connected to ground through the parallel combination of a capacitor 95 and resistor 96. The opposite current-carrying electrode of the FET 94 is connected through a Ferrite bead to a node 97. Node 97 is connected back to the input node 93 through the series combination of an inductor 99 and a capacitor 100. Node 97 is also connected to one terminal of an inductor 101 whose opposite terminal is connected to ground through the parallel combination of capacitors 102 and 103. A capacitor 104 is connected in parallel with the inductor 101 and a receiver output is taken from a tap on inductor 101 and lead 105 to the circuitry of FIG. 5 as hereinafter described.

The switching circuit of block 49 and injector circuit of block 50 of FIG. 2 will now be briefly described. The switch of block 49 includes transistor 106. Transistor 106 has its emitter directly connected to ground and its collector connected to the emitter of transistor 79 through a resistor 107. The emitter of transistor 79 is also connected to ground through a resistor 108. The base of transistor 106 is connected to an input node 109 through a resistor 110. Node 109 is connected to ground through a capacitor 111 and is connected to an input lead 112. Node 109 is also connected to a node 113 through a resistor 114 and node 113 is connected to the transmitter output node 87 through a capacitor 115. Node 113 is also connected via the direct signal injection path 66 to the anode of a diode 116 whose cathode is grounded and to the receiver input node 93 through a capacitor 117.

The signal injection path of block 50 includes capacitor 115, diode 116, lead 66 and capacitor 117 which forms a direct path between the transmitter output node 87 and the receiver input node 93. During the receive-only mode of operation, a signal present at node 109 is relatively low and the transistor 106 is non-conductive. With the transistor 106 non-conductive, transistor 79 is biased to produce a relatively weak transmitter frequency signal and this signal is supplied to node 87. The relatively weak signal at node 87, during the receive-only mode of operation is passed via the direct signal injection path 66 directly to the input node 93 of the receiver 41. Therefore, during the receive-only mode of operation, the direct signal injection path 66 between node 87 and node 93 provides the local oscillator function for the receiver 41.

However, whenever the transmit-receive mode of operation is used, a signal on lead 112 will be supplied to node 109 and this signal will cause transistor 106 to conduct. When transistor 106 conducts, transistor 79 will be driven harder to produce a relatively strong transmitter frequency signal. The signal at node 109 will disable the signal injection path 66 since the diode 116 will conduct to ground and a small portion of the signal will be passed by filter 90 into the receiver input 93 to provide the local oscillator frequency of the receiver 41 during the transmit-receive mode of operation.

Input lead 112 is connected directly to the node 109 but lead 112 is also connected to ground through a decoupling capacitor 118 and to a node 119 through a resistor 120. Node 119 is connected to ground through a capacitor 121 and to a microphone output node 123 via a resistor 122. The microphone 48 of the present invention is a conventional condensor microphone with a built-in FET amplifier. One terminal of the condensor microphone 48 is connected directly to ground and the other terminal is connected to node 123. Node 123 is connected to the inverting input of an operational amplifier 124 through a capacitor 125. The operational amplifier 124 is, in the preferred embodiment, a conventional, commercially-available operational amplifier.

Input lead 126 is connected directly to the non-inverting input of amplifier 124. Lead 126 is also connected to ground through the parallel combination of capacitors 127, 128 and is connected to the base of transistor 79 through a resistor 129. The base of transistor 79 is further connected to ground through resistor 130. The output of the operational amplifier 124 is connected through a resistor 131 to an output lead 132. The output of the amplifier 124 is further coupled back to the inverting input through a feedback resistor 133. The inverting input of the amplifier 124 is connected to one input of a conventional volume control switch 134. The output of the operational amplifier 124 is also connected to another input of the volume control switch 134. One output of the volume control 134 is connected through a resistor 135 to a node 136. Node 136 is connected to one terminal of the resistor 137 whose opposite terminal is connected to a lead 138. Node 136 is also connected through a resistor 139 to a node 140 which also connects to the volume control switch 134. Node 140 is connected to one terminal of a resistor 141 whose opposite terminal is connected to the lead 142. Node 136 is connected to a lead 143 through a capacitor 144.

A second operational amplifier 145 has its output connected to lead 138 through a resistor 146 and the output is further connected to lead 147 through a capacitor 148. The non-inverting input of the amplifier 145 is connected directly to the lead 126 while the inverting input is connected to the output through a feedback resistor 149. The inverting input of amplifier 145 is further connected to a node 28 through a capacitor 150. Node 28 is connected back to the output of the operational amplifier 145 through a capacitor 151. Node 28 is further connected to ground through a resistor 152 and to a lead 153 through a resistor 154. The output lead 153 is connected to the circuit of FIG. 5 and is further connected directly to node 140 as previously described.

The signal present at the non-inverting input of operational amplifier 145 is connected directly to the non-inverting input of operational amplifier 124 and is used to establish the bias points thereof. The microphone 48 converts actual speech into an audio signal which is capacitively coupled to the inverting input of amplifier 124 so as to produce a signal at the amplifier output, taken at the junction of resistors 131 and 133 whose amplitude varies in accordance with the speech input to the microphone 48, as conventionally known. Resistor 133 is a feedback resistor used to establish the gain of the operational amplifier 124. Both the AC and DC signals are supplied via resistor 131 and lead 132 to the logic circuit of block 44 as hereinafter described.

FIG. 5 is an electrical schematic diagram of the remaining receiver circuitry of block 41 of FIG. 2. In FIG. 5, the receiver lead 105 of FIG. 4 is connected to the base of the transistor 155 through a capacitor 156. The emitter of transistor 155 is connected directly to ground and the collector is connected through coupling capacitor 504 to the P5 input of a conventional FM limiter-demodulator circuit 157. In the preferred embodiment of the present invention, the FM limiter-demodulator circuit of block 157 is a conventional low power FM IF such as Motorola MC3357 integrated circuit. The base of transistor 155 is connected to one terminal of a resistor 158 whose opposite terminal is connected to a node 159. The parallel combination of an inductor 160, a capacitor 161, and a resistor 162 are connected in parallel between node 159 and the collector of transistor 155. Node 159 is also connected to a source of potential through a resistor 163 and to ground through the parallel combination of capacitors 164, 165. Pin P5 of the FM limiter demodulator 157 is connected to a node 166 through the parallel combination of an inductor 167, a capacitor 168 and a resistor 169. Node 166 is connected to a node 172 through a resistor 173. Node 172 is connected directly to the limiter output P7 of the FM demodulator 157 and to a node 174 through a capacitor 175.

Node 174 is connected directly to the quatrature input P8 of the FM demodulator 157 and the parallel combination of resistor 176, inductor 177 and capacitor 178 are connected in parallel between node 174 and the Vcc input P4 of the FM demodulator 157. The P1, P2, P3 and P4 inputs of the FM demodulator 157 are commonly connected to a +5-volt source of potential through a resistor 179 and to ground through a capacitor 180. The input P10 of the FM demodulator 157 is connected to ground through a resistor 181 and to a +5-volt source of potential through a resistor 182. The scan control input P13 is connected to a lead 183 and the output P11 is connected through a resistor 184 to the anode of a light-emitting diode 185 whose cathode is connected to ground. Decoupling pin P6 is connected to ground through a capacitor 186 and P15 is connected directly to ground. The audio mute port P14 is connected via lead 138 to the circuitry of FIG. 4; P16 is connected via lead 126 to the circuitry of FIG. 4; and the demodulator output P9 is connected to ground through a capacitor 187 and to lead 153 of the circuit of FIG. 4 through inductor 198. The squelch input P12 is connected to a node 189 and node 189 is connected to ground through a capacitor 190 and to one terminal of a resistor 191 whose opposite terminal is connected via lead 147 to the circuitry of FIG. 4 as previously described. The lead 147 is also connected to ground through a resistor 192 and to the cathode of a diode 183 whose anode is connected to ground.

The output from the resonant circuit comprising capacitor 104 and inductor 101 of FIG. 4 which acts as a band-pass filter is supplied via lead 105 through capacitor 156 to the base of transistor 155. The tank circuitry comprising inductor 160, capacitor 161 and resistor 162 and comprising inductor 167, capacitor 168 and resistor 169 act as an IF transformer to obtain the difference frequency. The quadrature tank circuit comprising resistor 176, inductor 177 and capacitor 168 supply the required phase reference signals to the FM demodulator 157 which contains the IF amplifier limiter stages, FM detection stages and demodulation circuitry.

The FM demodulator 157 is a conventional circuit designed primarily for use in voice communication receivers and several of the specific features of that circuit will be described hereinafter. The demodulated audio out signal from the FM demodulator 157 is taken from P9. P10 serves as an input to an amplifier whose output is taken from P11. Pin 12 responds to the DC level from the detector diode 193 and controls the output on P13. The output on P13 is normally high but drops low in response to the receipt of a local ringing signal by the circuitry of the FM demodulator 157. P14 is the connection to a switch between P14 and ground via P15. P14 remains normally conductive to provide a direct path to ground but is responsive to the detection of a local ringing signal for switching to a non-conductive or open circuit state. The circuit of FIG. 5 will be further described in dealing with specific functions.

FIG. 6 is a more detailed block diagram and electrical schematic diagram of the audio amplifier circuitry of block 42, the logic circuitry of block 44, the keyboard circuitry of block 46, the hook switch circuitry of block 45 of FIG. 2. In FIG. 6, the output of an operational amplifier 195 is connected to one terminal of an inductor 196 whose opposite terminal is connected through the parallel LC combination of capacitor 197 and inductor 198 to a node 199. Node 199 is coupled to ground through capacitor 200 and is coupled to the input of speaker 43 through a capacitor 201. The parallel combination of capacitor 197 and inductor 198 is used as a pilot tone filter to filter out the subcarrier pilot tone generated by the logic circuitry of block 44 as hereinafter described. Since the pilot tone is filtered out, it does not drive the speaker 43 and therefore is not heard by the user of the cordless handset 33.

The non-inverting input of the operational amplifier 195 is connected to ground through the parallel combination of a resistor 202 and a capacitor 203. The non-inverting input is also connected to a node 204 through resistor 205. The inverting input of the audio amplifier 195 is connected to ground through the parallel combination of resistor 206 and capacitor 207 and it is also connected to lead 143 via node 208. The operation of the audio amplifier 195 and the circuitry associated therewith will be more fully described hereinafter.

In FIG. 6, the mode switch 45 is shown as including an "off" position, a stand-by position and a talk position. When the switch is moved from the off position to the stand-by position, the cordless handset 33 is placed in the Receive-Only mode or the "on-the-hook" condition which corresponds to a conventional telephone being "hung up". When the switch is moved to the talk position, the cordless handset 33 is placed in the Transmit- Receive mode of operation or "off-the-hook" condition which corresponds to a conventional telephone handset having been picked up.

Disabling circuitry including a transistor 209 is associated with the mode switch 45. Transistor 209 is a conventional PNP transistor having its collector connected to a node 210 and node 210 is connected to lead 112 and to node 211. The emitter of transistor 209 is connected to one of the switching terminals on the mode switch 45. The base of transistor 209 is connected through a resistor 212 to ground and to one terminal of a resistor 213. The opposite terminal of resistor 213 is connected to the anode of a diode 214 through the parallel combination of resistors 215, 216. The cathode of diode 214 is connected to a +6-volt battery and to another switch terminal of mode switch 45. Transistor 209 switches in response to battery changing for disables the transmitter during the battery charging operation.

The keyboard of block 46 may include, for example, a four-by-four matrix of alphanumeric keys or push-buttons for entering numerical dialing information, special commands for addressing, etc. Similarly, any other keyboard arrangement such as a six-by-three matrix or the like could be used. Lastly, a conventional rotary dialing mechanism could also be used but, in the preferred embodiment of the present invention, a key pad or push-button keyboard is utilized.

The set of security identification switches of block 47 are used to enable the user or subscriber to enter his discrete security identification code so that the microprocessor 51 of the base unit of FIG. 3 is able to perform a security check and identify a user as authorized or unauthorized. In the preferred embodiment of the present invention, a set of six switches are shown with each having one contact connected to a strobe output of the logic circuit of block 44 as hereinafter described and the opposite contact connected to the anode of a corresponding diode. The cathodes of each of the six diodes are connected to six multiplexer inputs of the logic circuit of block 44 as hereinafter described and the keyboard outputs are similarly connected to the cathodes of the diodes for multiplexing same into the logic circuit of block 44. By selectively positioning the switch members on or off the contacts of each of the switches of block 47, each of the six switches can be placed in either an opened or a closed position thereby defining a unique one-of-64 binary identification code for security purposes.

The logic circuitry of block 44 of FIG. 2 will now be described in greater detail. The output of the operational amplifier 124 of FIG. 4 is connected to the audio in input P10 via capacitor 231. The audio/FSK output of the logic circuit of block 44 is taken from P11 which is connected directly to a summing node 253. Node 253 is connected to the transmitter input 67 of FIG. 4. The tone output P12 is used to output an audible key closure tone.

The summing node 253 combines the FSK signal with the audio output signal since node 253 is connected through a resistor 217 and a capacitor 218 to node 219. Node 219 is connected through a capacitor 220 to the OSC SW output at P8 of the logic circuit of block 44 and through a capacitor 221 to the OSC1 input P7 of the logic circuit 44. Node 219 is also connected to ground through the parallel LC combination of capacitor 222 and inductor 223. A tap on inductor 223 is connected to the OSC2 output P6 of the logic circuit of block 44 through a resistor 224.

The keyboard 46 preferably includes a key pad comprising a matrix of rows and columns. For the sake of simplicity, a four-by-four matrix will be described. The fourth row from the keyboard and the first security identification switch are both connected to the IN2 input P5 of the logic circuit 44. The third row of keyboard 46 and the second identification code switch are both connected to the IN3 input at P4. The second row of the keyboard and the third security identification code switch are both connected to the IN4 input at P3 while the fourth column of the keyboard 46 and the fourth identification code switch are both connected to the IN5 input of the logic circuitry of block 44. The fourth column of the keyboard 46 and the fifth security identification code switch and one terminal of mode switch 45 are connected to the IN6 input at P1 while the third column of the keyboard 46 and the sixth and last security identification code switch are both connected to the IN7 input at P16 of the logic circuit 44. The first and second columns of the keyboard 46 are connected directly to the IN8 and IN9 inputs at P16 and P15, respectively. Therefore, either the row and matrix key pad of the keyboard 46 or the security identification code switches 47 may be used to input data to the logic circuit of block 44 as hereinafter described with respect to FIG. 7.

The six manually positionable security identification code switches of block 47 may be used to enter a one-of-64 discrete security identification code into the logic circuit of block 44. The four-by-four matrix comprising the keyboard 46 has four rows and four columns which provide eight inputs into the twelve channel multiplexer included with a logic circuitry of block 44. The keyboard enters a two-of-eight input for each key depression with one input from the activated row and one input from the activated column, as known in the art. In this manner, keyboard information for dialing signals, address locations, and the like, may be entered into the logic circuit of block 44 via the key pad 46. It will, of course, be understood that any type of conventional keyboard may be used.

The P13 input of the logic of block 44 is connected to a node 225. Node 225 is connected to node 204 through a resistor 226 and is further connected to the anode of a diode 227 whose cathode is connected to node 211. Node 211 is connected to node 208 through a resistor 228. The output taken from pin 14 provides a strobe to one contact of each of the security identification code switches of block 47 and the P14 output is connected to the anode of a diode 229 whose cathode is connected to the P16 input and to the anode of a diode 230 whose cathode is connected directly to the P15 input. The P10 output is connected through a capacitor 231 to lead 132. Lastly, the P18 terminal of the logic circuitry of block 44 is connected directly to a +5-volt source of potential and is coupled to ground through a capacitor 232.

The logic circuit of block 44 of FIGS. 2 and 6 will now be described in detail with reference to FIG. 7. In FIG. 7, the keyboard 46 is shown as including a four-by-four matrix having four rows of keys and four columns of keys so as to provide eight inputs to a twelve stage multiplexer 232. The four rows of the keyboard matrix 46 are connected to the IN2 through IN5 inputs of the multiplexer 232 while the four columns of the keyboard matrix 46 are directly connected to the IN6 through IN9 inputs of the multiplexer 232. The six security code identification diode switches of block 47 are connected to the row 1 through row 4 keyboard outputs and hence to the IN2 through IN5 inputs of the multiplexer 232 and to the column 3 and column 4 outputs from the keyboard matrix and therefore to the IN6 and IN7 input of the multiplexer 232.

The six diode switches of block 47, as described in FIG. 6, include six manually-positionable switching elements which can be selectively opened or closed so as to encode a one-of-64 binary code input through respective switch diodes and these are used to represent the user's security identification code. In the case of the keyboard 46, we would always have one column and one row position active on the eight lines since the row and column matrix is such that the depression of any key causes a high signal or a logical one to appear at the intersection of exactly one row and one column of the matrix. In other words, a two-of-eight input is provided for each key depression.

A five input logical OR gate 233 has its output connected to the IN0 input of the multiplexer 241. The first four inputs of the five input OR gate 233 are connected to the four column outputs of the keyboard 46 and therefore to the inputs IN6 through IN9 of the multiplexer 232. Since we always have one row and one column position active for any key depression, one of these lines will always provide a logical one to the OR gae 233 when any key on the keyboard matrix 46 is depressed. The fifth input of the logical OR gate 233 is taken from the output of an inverter 234 which is used to provide a ID strobe to be hereinafter described. The output of the OR gate 233 provides a logical one to the IN0 input of the multiplexer 232 in response to the depression of any key on the keyboard 46 or the ID strobe and this is used as a start bit for the 12 bit data words outputted from the circuit of FIG. 7. The data words are created by a modulo 12 binary counter 235 which clocks through its 12 states to interrogate each of the 12 inputs IN0 through IN11 of the multiplexer 241. Since the first key depression will always input a logical 1 into the IN0 input of the multiplexer 232, the start bit or first bit out of the binary counter multiplexer 232 will be used to set the Direct Set input DS of a first flip-flop 236 and supplied to the data input D of a second flip-flop 237, as hereinafter described.

The IN1 input of the multiplexer 232 is not connected to any input thereby causing a low or logical 0 to be present in the second bit position of the 12-bit data word at all times. Similarly, the IN10 and IN11 outputs are always low and therefore logical zeroes as well.

A switch represented by reference numeral 238 will be used to represent the "on-the-hook" and "off-the-hook" positions. An "off-the-hook" signal is a logical one from the switch 238 or, more realistically, from the switch circuitry of FIG. 6. The output of inverter 239 is connected directly to the input of a second inverter 240. The output of the inverter 239 defines the reset signal R1 which is supplied via lead 241 to the various components of the circuit of FIG. 7 and the output of inverter 240 supplies the reset signal $\overline{R1}$ to various logical elements in the circuit of FIG. 7 via lead 242. The output of the inverter 239 is shown as being directly connected to the reset input of a divide-by-sixteen counter 243.

The divide-by-sixteen counter 243 is a conventional divide-by-sixteen counter which includes a clock input C, an enable not input $\overline{EN}$, a reset input R, a carry output Co, and an output $\overline{Q4}$. The reset input R is connected directly to the output of the inverter 239 and the carry output Co is connected to the input of an inverter 234 and directly back to the $\overline{EN}$ input of the counter 243. The clock input of the counter 243 is connected directly to the carry output of the binary counter 235 and the output $\overline{Q4}$ is connected directly to the reset input R of the flip-flop 237.

The flip-flop 237 has its data input D connected to the output of the multiplexer 232, its clock input connected to the output of the divide-by-twelve counter 244 and its inverting output $\overline{Q}$ connected to the input of the inverter 245 whose output is connected to one plate of a capacitor 220 whose opposite plate is connected to the node 219. A reset input of the flip-flop 237 is connected to the $\overline{Q4}$ output of the divide-by-sixteen counter 243.

The flip-flop 236 has its reset input R connected to the output of the inverter 239 via lead 241, its clock input connected to the output of the divide-by-twelve counter 244, its direct set input DS connected to the output of the multiplexer 232, and its data input D connected to the output of a logical OR gate 246. The logical OR gate 246 has four inputs. The first input of OR gate 246 is connected to the $Q_A$ output of the binary counter 235 and to the A input of the multiplexer 232. The second input of OR gate 246 is coupled to the $Q_B$ output of the binary counter 235 and the B input of the multiplexer 232. Similarly, the third and fourth inputs of the logical OR gate 246 are connected to the $Q_C$ and $Q_D$ outputs of the binary counter 235 and to the C and D outputs of the multiplexer 232, respectively.

The Q output of the flip-flop 236 is connected to a control electrode of a transmission gate 247 which has its clock input connected to the output of the divide-by-twelve counter 244. The transmission gate 247 is used to provide a frequency tone output to the speaker 43 to indicate to the user that a key is depressed or that an identification code is being transmitted. The carry output of the counter 244 is also connected to the clock input of flip-flop 237 and to the clock input of the binary counter 235. The input of the divide-by-twelve counter 244 is connected through a resistor 224 to a tap of an inductor 223 which is connected in parallel with the capacitor 222 between node 219 and ground to form a conventional tank circuit. Node 219 is connected to one plate of a capacitor 221 whose opposite plate is connected to a P7 input at node 248. Node 248 is connected to the input of an amplifier 249 whose output is connected directly to one input of a logical NAND gate 250. The output of the amplifier 249 is also fed back to the input 248 by a resistor 251 and the second input of the logical NAND gate 250 is connected via lead 242 to the $\overline{R1}$ output of inverter 240.

The $\overline{Q}$ output from the flip-flop 236 is connected to the control electrode of the transmission gate 252 and to the reset input of the binary counter 235. The input of the transmission gate 252 receives the AUDIO IN signal from lead 132 and outputs the signal to the summing node 253. Node 253 combines the audio signals from the transmission gate 252 and the FSK signal from node 219 and outputs the combined audio/FSK signal for output via lead 67 to the transmitter input as previously described. The FSK encoder node 219 is connected to the summing node 253 through the series combination of a capacitor 218 and the resistor 217 for outputting the FSK signal generated at node 219. The combination of the tank circuit comprising the parallel LC combination of inductor 223 and capacitor 222, the parallel FSK-encoding capacitor 220, the gain amplifier 245 and the NAND gate 250 form the basic oscillator circuit for FSK-encoding.

The oscillator circuit normally includes the tank circuit comprising inductor 223 and the parallel combination of capacitors 220 and 222.

Capacitor 220 is normally in parallel with capacitor 222 since the inverter buffer 245 is a conventional open drain switch to ground which is normally closed. Therefore, the capacitor 220 is normally in the tank circuit so long as the output of the inverter 245 is low thereby enabling the FSK circuit to generate a low subcarrier frequency tone or pilot tone, for example, 4.7 KHz. Whenever the input of inverter 245 is low, indicating that a high or logical one data bit has been applied to the flip-flop 237, the open drain switch of inverter 245 will be opened thereby removing capacitor 220 from the tank circuit to shift the frequency to a higher value, for example 5.0 KHz to provide conventional frequency shift-keyed (FSK) encoding. The FSK signal at node 219 is outputted via resistor 217 and capacitor 218 to the summing node 253 where it is combined with the output of the transmission gate 252 and supplied to the input 67 of the transmitter 38 as previously described.

Assume that the cordless handset 33 was initially in the receive-only mode of operation, i.e., the hook switch signal at the input of buffer 239 is low. With the low at the input of inverter 239, a high is supplied to the reset input of the divide-by-sixteen counter 243 to hold the counter 243 in a reset condition. When the counter 243 is reset, its $\overline{Q4}$ output goes high to keep the flip-flop 237 reset as well. Similarly, the high from the output of inverter 239 is supplied to the reset input of flip-flop 236 to maintain it in a reset condition. With flip-flop 236 reset, the transmission gate 247 is turned off and the high from the $\overline{Q}$ output of flip-flop 236 holds the modulo 12 binary counter 235 reset as well. The $\overline{R1}$ signal applied to the input of NAND gate 250 is a logical low for maintaining a logical high at the output of NAND gate 250 while preventing the oscillator circuit from functioning.

An "off-the-hook" or T/R condition is indicated by a high signal at the input of inverter 239. The high at the input of inverter 239 results in a low that is outputted. A low at the output of inverter 239 means that the reset is removed from the divide-by-sixteen counter 243 and the flip-flop 236. With $\overline{R1}$ high, the oscillator is allowed to function. Normally, the output at divide-by-twelve counter 244 is supplied to clock flip-flops 236 and 237 and the binary counter 235. However, when the binary counter 235 is maintained in a reset state, all of the outputs $Q_A$ through $Q_D$ remain low so that only the IN0 input of the multiplexer 232 is interrogated.

As long as the carry output of the counter 243 is low, the high signal from the output of inverter 234 is supplied to the logical OR gate 233 causing a high signal to be supplied to the IN0 input of the multiplexer 232. Since the binary counter 235 is normally interrogating the IN0 channel, the high is outputted from the multiplexer 232 to the direct set input of the flip-flop 236 causing it to set and to the data input of flip-flop 237. With flip-flop 236 set, a high signal on the Q output will allow the transmission gate 247 to conduct to supply an audible tone to the speaker 43. The low signal at the $\overline{Q}$ output will be transferred back to the reset input of the binary counter 235 thereby removing the reset and allowing the counter 235 to begin incrementing its count with the occurrence of each clock pulse from the output of the divide-by-twelve counter 244.

Therefore, the first bit of the 12-bit data word is a logical one indicating the start of data. This serves as a start bit to enable the binary counter 235 to begin counting and the high is also fed to the D input of the flip-flop 237 causing the data to appear at the $\overline{Q}$ output. With the high at the D input, the $\overline{Q}$ output of flip-flop 237 goes low causing the inverter buffer 245 to open so that its output is high to remove capacitor 220 from the tank circuit thereby causing the frequency of the signal at node 219 to shift high to approximately 5.0 KHz.

The next clock pulse to arrive at the binary counter 235 causes it to increment its count to a binary one and this signal and every subsequent signal will cause at least one of the outputs $Q_A$ through $Q_D$ to be high until a total of 12 clocks have been counted so that once the binary counter 235 has started counting, the output of the logical OR gate 246 is always high for 12 clock times. This is supplied to the D input of the flip-flop 236 so as to maintain the flip-flop in a set state.

On the first count, the binary one count interrogates the IN1 channel of the multiplexer 232 but since the channel is not connected, a logical zero is outputted from the multiplexer 232 to the data input of the flip-flop 237. The second bit of a twelve-bit data word is always a logical zero in order to separate the start bit from subsequent bits. With a low supplied to the D input of the flip-flop 237, the $\overline{Q}$ output goes high causing the inverter 245 to close the switch to ground thereby inserting the capacitor 220 in parallel with the capacitor 222 to cause the frequency of the signal of node 219 to shift back to the low subcarrier tone of approximately 4.7 KHz.

The second through nine counts of the binary counter 235 will interrogate the inputs IN2 through IN9 of the multiplexer 232 and the code entered from the security identification switches 47 will be read out of the $\overline{Q}$ output of the data flip-flop 237. Flip-flop 237 will invert the data and operate the inverter buffer 245 so as to place the frequency shift capacitor 220 into or out of the parallel combination with the capacitor 222 thereby causing the frequency of the signal at node 219 to shift low or high, respectively. In this manner, any data entered on the logic of FIG. 7 is frequency shift-keyed or FSK-encoded before being outputted to summing node 253.

The remaining tenth and eleventh count of the binary counter 235 interrogate the tenth and eleventh input of the multiplexer 232 which are not connected thereby causing a low to be outputted to the data transfer flip-flop 237 on the end of a data word. As soon as the binary counter 235 reaches the eleventh count, on the next count a high carry-out signal will be transferred from the binary counter 235 to the clock input of the divide-by-sixteen counter 243 causing it to increment its count by one. Since the binary counter 235 remains enabled by the low present at its reset input from the $\overline{Q}$ output of flip-flop 236, it will continue its count in each cycle of the binary counter 235 transfers out the data word present at the inputs of the multiplexer 241 as known in the art.

The divide-by-sixteen counter 243 will increment its count each time the binary counter 235 completes a 12 state cycle. When the divide-by-sixteen counter 243 completes its eighth count, the $\overline{Q_4}$ output will go low to permit the flip-flop 237 to pass the individual bits of all subsequently received data words from the multiplexer output. This will continue through seven cycles of the binary counter 235 thereby enabling the flip-flop 237 to pass exactly seven data words of twelve bits each to the buffer inverter 245 and therefore allow seven twelve-bit data words to be FSK-encoded at node 219 and transmitted to the summing node 253 for transmission to the transmitter input 67.

When the divide-by-sixteen counter 243 completes the fifteenth count, the carry output goes high stopping the counter 243 via its $\overline{EN}$ input and causing the I.D. strobe signal at the output of inverter 234 to go low after the I.D. code has been transmitted seven times or through seven cycles of the binary counter 235. Therefore, the sixteen stage counter 243 which is clocked by the carry outputs from the twelve stage binary counter 244 is used to control the number of times that the I.D. word is transmitted.

When the carry output of the counter 243 goes high, indicating that seven ID data words have been transmitted, the output of inverter 234 goes low causing a low input to the logical OR gate 233 and a low input to the IN0 input of the multiplexer 232. Therefore, when the counter 235 reaches a zero state, the output of multiplexer 232 will be low. This low level is applied to the D input of the flip-flop 236, causing it to clock to a low state. The $\overline{Q}$ output of flip-flop 236 will then be a logical high and since this output is applied to the reset input of the binary counter 235, the counter 235 will remain in a zero state unless a keyboard entry is made.

When a key is depressed on the keyboard 46, a logic high is applied to one of the IN2–IN5 and one of the IN6–IN9 inputs of the multiplexer 232. Since IN6–IN9 are each connected to one input of the logical OR gate 233 causing the output of the gate to go high, the high will also be supplied to the IN0 input of the multiplexer 232. The multiplexer output will become a logical high, setting flip-flop 236 via its direct set input DS causing the reset input of the binary counter 235 to become a logical low and allowing the binary counter 235 to cycle through its twelve states, interrogating the keyboard via multiplexer 232 exactly as the I.D. switches were interrogated in the previous discussion. When the binary counter 235 reaches its zero state, if the key of keyboard 46 is still depressed, IN0 will still be a logical high and the twelve bit data word will continue to be transmitted until the key is no longer depressed.

The divide-by-twelve counter 244 is also used to output a 1250 Hz tone to the audio amplifier 42 to give an audible feedback of key closure. This 1250 Hz signal is outputted by the transmission gate 247 so long as the flip-flop 236 remains set. Also, as long as the flip-flop 236 remains set, its $\overline{Q}$ output is low turning off the transmission gate 252. As in previous cordless telephone designs, the base unit 31 will release the telephone line 32 if the RF carrier from the handset 33 disappears for a predetermined length of time. This length of time should be as long as practical to avoid releasing the telephone lines during a fading signal condition. However, this same length of time should be as short as possible to avoid unnecessary delay in releasing and reacquiring the telephone line, for example when a number is misdialed.

One solution involves the provision of a special code which is automatically sent from the handset 33 to the base 31 when the mode switch 45 is placed in the on-the-hook position. The base unit 31 then releases the telephone line 32 immediately and the telephone line 32 is therefore available for immediate re-use. This feature allows a very long time to be allowed for fading signal conditions without inconveniencing the user. This feature is implemented as follows. When mode switch 45 is returned to its "standby" position, a logical 1 is connected to the IN6 input of multiplexer 232 and one input of OR GATE 233 via P1 of logic block 44. This causes a data word to be transmitted as if a key were depressed on keyboard 46. However, the transmitted data word is distinct from all possible keyboard codes because it is a one-of-eight code and all key closures from keyboard 46 are two of eight codes. This unique code is transmitted to the base unit as a signal that the handset has been returned to the "on-the-hook" state and causes the microprocessor 51 to immediately release the telephone line 32.

FIG. 8 is a more detailed block diagram of the microprocessor 51, tone encoder 65, security identification switches 64 and the dialing mode select switch 63. Only a brief discussion of the microprocessor 51 will be given since it is a commercially available conventional microprocessor such as a COPS 420 and a greater understanding may be had by reference to a COPS CHIP USER'S MANUAL printed by National Semiconductor, January, 1979, which is incorporated by reference herein.

The input/output capabilities of the microprocessor 51 are highly flexible, a number of different configurations are possible so as to allow the tailoring of the microprocessor 51 to a given task. Other than the power supply and dedicated pins, all of the pins of the microprocessor 51 can be used for input, output or both depending upon the configuration. All ports are quasibidirectional to facilitate stand-alone use. The microprocessor 51 has arithmetic and logic capabilites as well as ROM and RAM memory. A wide variety of arithmetic and logical instructions may be exercised which affect the contents of the accumulator. The particular programs implemented by the microprocessor 51 to effect the operation described below will be hereinafter described with respect to the flow diagrams of FIGS. 15 through 22 and the computer listing which is submitted herewith as an appendix and incorporated by reference herein, as may be required.

Before the individual inputs and outputs of the microprocessor 51 are described in more detail, the tone dialer or tone encoder of block 66 will be described. The tone encoder 66 is, in the preferred embodiment of the present invention, a conventional, commercially available unit such as a National Semiconductor MM53130 DTMF generator. The tone dialer 66 is a monolithic integrated circuit fabricated using conventional CMOS technology. The tone dialer 66 uses the same inexpensive crystal reference as the microprocessor 51 to provide eight different audio sinusoidal frequencies which are mixed to provide tones suitable for Dual-Tone Multi-Frequency (DTMF) telephone dialing. Data entries to the tone dialer 66 causes selection of the proper divide ratio to obtain the required two audio frequencies from the 3.759545 MHz reference oscillator. A D-to-A conversion is accomplished on-chip by a conventional resistor ladder network. The tone output is a stair-step approximation to a sign wave and requires little filtering for low distortion applications. The same operational amplifier that accomplishes the current-to-voltage transformation necessary for the D-to-A conversion also mixes the low and high group signals. Frequency stability of this type of tone generator is such that no frequency adjustment is necessary to meet standard DTMF specifications.

The inputs and outputs of the microprocessor 51 will now be briefly described. The P25 output of the microprocessor 51 outputs a transmit-enable command. The transmit-enable command is connected to both inputs of a two-input logical NOR gate 260 through a resistor 261. The output of the NOR gate 260 is supplied via lead 262 to a transmit-enable switch as hereinafter described. When the transmit-enable signal goes high, the transmit-enable switch will conduct to allow a relatively large amount of energy to drive the transmitter 57 for full transmit-receive operation.

The input P10 of the microprocessor 51 receives the RING IN signal via lead 263 from the circuit of FIG. 9 as hereinafter described. P3 is connected through a resistor 264 to both inputs of a two-input logical NOR gate 265. P2 is connected to the inputs of NOR gate 265 through a crystal 266 and a resistor 267. The inputs of NOR gate 265 are also connected to ground through a capacitor 268. The combination of the crystal 266 and the clock terminals P2 and P3 and circuitry associated therewith provides a clock signal at the output of the logical NOR gate 265 which is connected directly to the oscillator input P8 of the tone encoder 66. The P1 input of the tone encoder is connected directly to a source of potential and to ground through a capacitor 269. The P6, P9 and P17 terminals are connected to ground. The P24 output of the microprocessor 51 is connected directly to the TONE DISABLE terminal P2 of the encoder 65. The P12, P13, P14, and P15 outputs of the microprocessor 51 are connected to the P13, P14, P15 and P16 inputs of the tone encoder 66 which are the data inputs which determine how the frequencies are divided down for touch-tone operation. The output P18 outputs the DTMF tone via lead 270 which is then applied to the telephone lines for performing the dialing function, as hereinafter described.

The P23 output supplies the ringing tone on lead 271 for transmission to the remote unit 33. The dialing mode selecter switch of block 63 has one terminal connected to the P19 input of the microprocessor 51, a second terminal connected to ground, a third terminal connected to the P20 input of the microprocessor and a fourth terminal which floats. By manually positioning the switch element 272, one of three different and distinct switch conditions can be produced and these switch conditions can be used to determine whether the dialing pulses are outputted at a rate of 10 pulses per second, 20 pulses per second, or via DTMF. The P26 output of the microprocessor 51 controls the auxiliary lines. The P26 output is connected through a resistor 273 to the base of a PNP transistor 274. The emitter of transistor 274 is connected directly to a source of potential and the collector is connected to a node 510. Node 510 is connected to one terminal of an inductor 275 whose opposite terminal is grounded and to the cathode of a diode 276 whose anode is connected to ground. The coil 275 represents a relay which operates the relay controlled switch 277 and the switch may be opened or closed for controlling the auxiliary line connections, as conventionally known.

The P11 input of the microprocessor 51 is connected directly to a source of potential and the P4 input is connected through a capacitor 278 to ground. The source of potential is also connected to the cathode of a diode 279 whose anode is connected to P4; to one terminal of a resistor 280 whose opposite terminal is connected to P4; and to one plate of a capacitor 281 whose opposite plate is grounded.

The security identification switches of block 64 are diode isolated switches as indicated by the switches S1-S6 of FIG. 8. The P6 input of the microprocessor 51 is connected to the anode of a diode 281 whose cathode is connected to one terminal of the switch S5. The P6 input is also connected to the anode of a diode 285 whose cathode is connected to one terminal of switch S3. The P5 input is connected to the anode of a diode 282 whose cathode is connected to one terminal of a switch S1 and to the anode of a diode 284 whose cathode is connected to one terminal of S4. Similarly, P7 is connected to the anode of diode 286 whose cathode is connected to one terminal of S6 and to the anode of a diode 288 whose cathode is connected to the output P28. The P8 input is connected to the anode of a diode 283 whose cathode is connected to one terminal of S2 and to the anode of a diode 287 whose cathode is connected back to the P28 output. The second terminal of the switches S1 and S5 are also connected back to the P28 output while the second terminal of switches S2, S3, S4 and S6 are connected directly back to the P27 output. P27 output is also supplied to circuitry as hereinafter described via lead 289.

The P9 input of the microprocessor 51 receives the FSK IN signals via lead 290 from the FSK detector/decoder of block 60. The P22 input of the microprocessor 51 receives the FSK detect signals via lead 291 from the FSK detector/decoder of block 60 as hereinafter described. Lastly, the output P21 of the microprocessor 51 supplies the line seizure command via lead 292 for use as hereinafter described. The diode switches comprising diodes 281-288 and switches S1-S6 may be used to selectively enter a one-of-64 binary code which can be used to identify an authorized user.

FIG. 9 is an electrical schematic diagram of the ring detection circuitry of block 52, the line seizure circuitry of block 53, and the operational amplifier circuitry of block 54 of the block diagram of FIG. 3. The tip T and ring R inputs from the telephone lines 32 are connected to the ring detect circuitry of block 52 and the line seizure circuitry of block 53. The ring line is connected directly to a node 300, and node 300 is connected through a capacitor 301 to the anode of the Zener diode 302. The cathode of the Zener diode 302 is connected directly to the cathode of a second Zener diode 303. The anode of the second Zener diode 303 is connected directly to the anode of a light emitting diode LED 304. The cathode of LED 304 is connected to the anode of a diode 305 whose cathode is connected back to the junction of the anodes of Zener diode 303 and LED 304. The cathode of the LED 304 is also connected to the telephone lines 32 through resistor 26.

The LED 304 is part of an optical isolator represented generally by the block 306 and the light from the LED 304 impinges upon the base of a photo-transistor 307 whose collector is connected to a positive source of potential and whose emitter is connected to ground through the parallel combination of resistor 308 and capacitor 309. The emitter of the photo-transistor 307 is also connected to both inputs of the two input logical NOR gate 310 which drives the output of the photo-transistor 307 and supplies the ring detection signal to the P10 input of the microprocessor 51 of FIG. 8 via lead 293.

In operation, when the relatively large ring signal is transferred from the telephone lines 32 to node 300, the LED 304 will conduct and the light from the LED 304 will cause transistor 307 to conduct and supply a signal to the inputs of the NOR gate 310. This signal is then supplied via lead 263 to the ring detect input P10 of the microprocessor 51 so as to enable the microprocessor 51 to generate further commands, as required.

The call switch of block 62 of FIG. 3 includes a switch having one terminal connected to a source of potential and its opposite terminal connected through a resistor 311 to the common inputs of the logical NOR gate 310. Therefore, whenever an operator closes the switch contact of the switch 62 the source of potential will be applied through resistor 311 to the inputs of the logical NOR gate 310 and the output on lead 293 supplies a call signal which is identical to the ring detect signal to the P10 input of the microprocessor 51. This enables the cordless telephone of the present invention to be used for paging purposes, if desired.

Node 300 is also connected to one terminal of a normally-open relay-operated switch 312 whose opposite terminal is connected to one terminal of a transformer coil 313 whose opposite terminal is connected back to the tip line to complete the circuit between tip and ring lines when the normally open, relay-operated switch 312 is closed.

The line seizure circuitry of block 53 will now be briefly discussed. When the microprocessor 51 recognizes that an authorized user desires to make or receive a telephone call, a line seizure command is outputted from P21 on lead 292. Lead 292 connects the line seizure command to the base of an NPN transistor 314 through a resistor 315. The emitter of the NPN transistor 314 is connected to ground and the collector is connected through a resistor 316 to a source of potential. The collector of transistor 314 is also connected through a resistor 317 to the base of a PNP transistor 318. The emitter of PNP transistor 318 is connected to the source of potential while the collector is connected to ground through a relay coil 319. A diode 320 is also connected in parallel across the relay coil 319 with its anode being connected to ground and its cathode being connected to the collector of the transistor 318.

When a line seizure command is outputted from P21 of the microprocessor 51, and applied to the base of transistor 314, transistor 314 will be switched to a conductive state. When transistor 314 turns on, a current path will be established from the source of potential and resistor 316 to ground through transistor 314. Transistor 318 will then be turned on, since its base is pulled low to energize the relay coil 319 and close the relay-operated switch 312 so as to complete a circuit path between the tip and ring lines 32.

The operational amplifier circuitry represented by block 54 of FIG. 3 will now be described. A second transformer coil 325 is inductively coupled to a transformer coil 313, as known in the art, and one terminal of transformer coil 325 is connected to ground through a capacitor 326 and to a positive source of potential through a resistor 25. The opposite terminal of the transformer coil 325 is connected to node 327 and node 327 is connected through a resistor 328 to an output lead 357 from the IF of the receiver 59 as hereinafter described.

Node 327 is also connected to the collector of a line driver transistor 329. The collector of transistor 329 is connected back to its base through the series combination of a resistor 330 and the capacitor 331 and the emitter of transistor 329 is connected to ground through a resistor 332. The base of transistor 329 is also connected through a resistor 333 to the output of an operational amplifier 334. The inverting input of the operational amplifier 334 is connected directly to its output and the non-inverting input is taken from a node 335. Node 335 is connected to a node 337 through a resistor 336 and node 337 is connected to node 339 through a resistor 338. Node 339 is connected to the input of the FSK detector/decoder 60 via lead 340.

Node 339 is connected to a volume control switch through the parallel combination of a capacitor 341 and a resistor 342. Node 339 is also connected to a second volume control terminal to the parallel combination of a resistor 343 and capacitor 344. The node 339 is further connected to the output of an operational amplifier 345 and to one plate of a capacitor 346 whose opposite plate is connected to a node 347. Node 347 is connected to the non-inverting input node 335 of amplifier 334 through a capacitor 348. Node 347 is also connected through a resistor 349 to node 350. Node 350 is connected to node 337 through a capacitor 351 and is connected to the output and inverting input of operational amplifier 352. The non-inverting input of amplifier 352 is connected through a resistor 353 to the output of amplifier 334 and the base of transistor 329 through a resistor 333 which is connected to one terminal of a resistor 354 whose opposite terminal is connected to node 355. Node 355 is connected back to node 327 through resistor 328 and is also connected to one plate of a capacitor 356 whose opposite plate is connected to a volume control switch. The node 355 is also connected via lead 357 back to the IF demodulator of the receiver circuit of block 59 of FIG. 3 as hereinafter described.

The operational amplifier 345 has its inverting input connected to an intermediate volume control switch via lead 358. The inverting input of amplifier 345 is also connected through a capacitor 359 to a node 360. Node 360 is connected through a resistor 361 to a lead 362 which is also connected to the FM IF of FIG. 11 as hereinafter described. Node 360 is further connected through a resistor 363 to a lead 270 which is connected to the P18 output of the tone encoder 66 of FIG. 8. Node 360 is connected to one terminal of a variable resistor or potentiometer 364 whose opposite terminal is connected to a node 365. Node 365 is connected to ground through a capacitor 366 and is connected to one terminal of a second variable resistor potentiometer 367 whose opposite terminal is connected to the output of operational amplifier 368. The output of the amplifier 368 is also connected through a resistor 369 to lead 399 which represents the input to the transmitter of block 57 as hereinafter described.

The output of the operational amplifier 368 is also connected back to the inverting input through the parallel combination of a resistor 370 and capacitor 371. The inverting input is also connected through the serial combination of resistor 372 and capacitor 373 to lead 271. The inverting input is further coupled directly to one volume control switch and through a resistor 374 is connected to a second volume control switch. The non-inverting input of the operational amplifier 368 is connected to ground through a resistor 375 and to a node 377 through a resistor 376. Node 377 is coupled to ground through a capacitor 378 and to a +5-volt source of potential through a resistor 379. The node 377 is also connected directly to the non-inverting input of operational amplifier 345.

The operation of the circuit of FIG. 9 will now be briefly described. The tip signal from the telephone lines 32 is normally a 50 volt DC signal while the ring signal is typically a 90 volt peak-to-peak signal having a frequency of 20 hertz. The ring detector circuit of block 52 has a Zener diode 302 with a Zener voltage of 60 volts so that no signal is supplied to the base of the photo-transistor 307 until the 90 volt ring signal is detected. The occurrence of the ring signal causes Zener diode 302 to conduct to activate the LED 304. The activation of the LED 304 will cause the photo-transistor 307 to switch to a conductive state so that the source of potential is connected to lead 293 through the logical NOR gate 310. When the high signal is passed from the source of potential through conducting photo-transistor 307 to the inputs of the logical NOR gate 310, the output of NOR gate 310 will go low and the low signal supplied via lead 293 to the P10 input of the microprocessor 51. The microprocessor 51 detects the low signal at its P10 input and interprets this signal as being indicative of the occurrence of an in-coming ringing signal on the telephone lines 32.

The microprocessor 51 of FIG. 8 is also responsive to the occurrence of the ring detection signal on lead 263 for generating and outputting a local ringing signal from P23 via lead 271 and for outputting a transmit enable signal from the P25 output. As previously mentioned, the presence of a low ring detection signal on lead 293 which is supplied to the P10 input of the microprocessor 51 may also be generated by the "call" switch 62. The call switch 62 may be operated by depressing the switch element to complete a current path in the source of potential to the inputs of NOR gate 310 via resistor 311. This causes a low signal to appear at the output of NOR gate 310 and this low is transmitted via lead 293 to the P10 input so that the microprocessor 51 treats it as it does a ring detection signal. By the switch 62 simulating a low ring detection signal, the call switch may be employed to enable the system to be used for paging purposes and the like.

The line seizure command outputted from P21 of the microprocessor 51 via lead 292 is applied to the base of a switching transistor 314 which is normally biased in the non-conductive state. When the high line seizure command is applied to the base of transistor 314, it is rendered conductive. The PNP transistor 318 normally maintains the relay coil 319 in a de-energized state so that the relay switch 312 is open to prevent use of the telephone system. However, the conduction of transistor 314 activates transistor 318 to energize the relay coil 319 and close switch 312 to complete the path between the telephone lines 32. As long as a high signal is present on lead 292, the relay coil 319 will remain energized to keep the relay-operated switch 312 closed to maintain acquisition of the telephone lines 32.

The microprocessor 51 is further responsive to the FSK detect input at P22 to continue generating the line seizure command and thereby maintain a line acquisition so long as the pilot tone continues to be received by the base unit 31. As soon as the authorized user of the cordless handset 33 hangs up or goes "on-the-hook", the generation of the pilot tone by the logic circuitry 44 terminates. After a predetermined time delay (to prevent premature termination) the signal on lead 292 goes low causing the switching transistor 314 to switch to a non-conductive state so as to de-activate the relay coil 319 and open switch 312 thereby opening the path and releasing the telephone lines 32.

The audio to and from the telephone line 32 appears at node 337. Since the bottom of coil 325 is by-passed to ground by capacitor 326. The in-coming signals from the receiver 59 are transmitted via lead 362 to the inverting input of the amplifier 345 and is passed via lead 340 to the FSK detector 60 as hereinafter described. The output of amplifier 345 is also supplied to the non-inverting input of amplifier 334 and amplifier 334 passes this signal to the line driver amplifier 329 which feeds it directly to the audio output side of transformer coil 325 and then via transformer coil 313 to the telephone line 32.

FSK tone filtering is provided by the operational amplifier 352 and its non-inverting input is connected through resistive means to the output of amplifier 334. The signals going out over the telephone line and appearing at node 337 are balanced out at node 355 since the currents into node 355 through resistor 354 are opposite in phase to current through resistor 328 due to the inversion of transistor 329. The size of resistors 354 and 328 are chosen to correspond to the gain of amplifier 329 to achieve balance. Signals coming in over the telephone line 32 also appear at node 337 and at node 355 attenuated only by resistor 328.

The in-coming signals are applied to the transmitter modulator amplifier 368 whose output is connected back to the input of the operational amplifier 345. The transmitter signal or transmitter input is connected via lead 399 and resistor 369 to the output of the amplifier 368. The variable resistors 364 and 367 may be altered to control the gain of the in-coming signal and capacitor 366 is used to provide a phase adjustment for removing transmitter modulation. Since the base unit transmitter frequency is greater than the operating frequency of its receiver, the signals from the demodulator are already out of phase with one another and only the amplitude of the transmitter modulated signal needs to be reduced and combined with the demodulator signals to cancel each other out. The similar cancellation is performed in the cordless handset but a phase reversal must be made to insure cancellation.

FIG. 10 is an electrical schematic diagram of the transmit circuit of block 57, antenna coupling circuit of block 58, and the input portion of the receiver circuit of block 59 of FIG. 3. More specifically, the transmitter input is taken on lead 399 from the circuit of FIG. 10 as previously described. Lead 399 is connected through a resistor 400 to a frequency modulation node 401. Node 401 is connected to the cathode of a varactor diode 402 whose anode is grounded. Node 401 is also connected to one terminal of a crystal 403 whose opposite terminal is connected to a node 404. Node 401 is connected to node 404 through the series combination of capacitor 405 and inductor 406. Node 404 is then connected directly to the base of the transmitter oscillator transistor 407. The emitter of transistor 407 is connected to ground through the parallel combination of resistor 408 and capacitor 409. Capacitor 411 provides feedback connecting the emitter of transistor 407 back to its base. The base of transistor 409 is connected through a resistor 412 to a node 413. Node 413 is connected to a source of potential through a resistor 414 and to ground through capacitor 415. The node 413 is also connected to a node 418 through the parallel combination of an inductor 416 and a capacitor 417. The collector of transistor 417 is connected to a tap on the inductor 416.

Node 418 represents the output of the transmitter or transmitter oscillator comprising transistor 407, crystal 403, and the circuitry associated therewith. Node 418 is then connected to the antenna coupling circuitry of block 58, and more specifically, node 418 is connected directly to one terminal of a first crystal filter 419 whose opposite terminal is connected to a node 420. Node 420 is connected to one terminal of an impedance matching transformer coil 421 whose opposite terminal is grounded. Inductor 421 is inductively coupled to a corresponding loading coil 422 for driving the antenna 56, as known in the art. The antenna coupling circuit also comprises a lead 423 which directly connects node 420 to one terminal of a second crystal filter 424. The opposite terminal of the crystal filter 424 is connected to ground through the parallel combination of a capacitor 425 and inductor 426.

A tap on the inductor 426 is connected directly to node 427 which represents the input of the receiver stage 59 of the transceiver 55. The receiver input node 427 is connected directly to the gate of an FET transistor 428 and one current-carrying electrode of FET 428 is connected to ground through the parallel combination of a resistor 429 and capacitor 430. Node 427 is also connected to a node 431 through the series combination of capacitor 432 and inductor 433. The other current-carrying electrode of FET transistor 428 is also connected to node 431 through a Ferrite bead 434. Node 431 is connected a node 435 via capacitor 436 and node 435 is connected to a source of positive potential through a resistor 437 and to ground through the parallel combination of capacitors 438 and 439. Node 435 is also connected back to node 431 through inductor 440. A tap on inductor 440 is connected to a lead 441 through the parallel combination of capacitors 442 and 443 and lead 441 connects to the remaining portion of the receiver circuitry of FIG. 11 as hereinafter described.

The transmit-enable circuitry of FIG. 10 includes a lead 262 which connects a node 444 back to the output of the logical NOR gate 260 of FIG. 8. Node 444 is connected to the base of a switching transistor 445 through a resistor 446. The emitter of transistor 446 is grounded while the collector is connected through a resistor 447 to the emitter of the oscillator transistor 407. Node 444 is also connected to a node 448 through a resistor 449. Node 448 is connected to the anode of a diode 450 whose cathode is grounded and to one plate of a capacitor 451 whose opposite plate is connected to the node 418. Node 448 is also connected to the direct signal injection path comprising lead 452 which is connected back to the receiver input node 427 through a capacitor 453.

The operation of the circuitry of FIG. 10 is substantially similar to the circuitry described in FIG. 4 so only a very brief description is given herewith. Crystal 403 and the circuit elements associated with the transistor 407 are arranged to form a conventional Colpitts oscillator. The regenerative feedback is taken from the emitter of transistor 407 back to node 404 through capacitor 411. The value of the crystal is chosen depending upon the desired frequency for the transmitter signal. The Colpitts oscillator is biased so that transistor 407 is driven with a fairly weak signal causing the output of the oscillator at node 418 to be relatively weak during the receive-only mode of operation. This signal is not strong enough to pass through the crystal filters 419 and 424 so a direct signal injection path is taken from node 418 to the receiver input 427 through capacitor 451, node 448, lead 452 and capacitor 453. This direct signal injection path feeds the relatively weak transmitter frequency signal back into the input of the receiver to perform the local oscillator function thereof.

When the microprocessor 51 outputs a transmit-enable signal indicative of the selection of a transmit-receive mode of operation, it is applied to the base of transistor 446 causing it to conduct. When transistor 446 conducts, the emitter of transistor 407 is pulled toward ground and the oscillator is driven much harder. Simultaneously, the diode 450 is biased so that it shorts the lead 452 to ground disabling the direct signal injection network during the transmit-receive mode of operation.

However, when transistor 445 conducts causing the oscillator to be driven harder, a relatively strong transmitter frequency signal appears at node 418 and this signal is sufficiently strong to be passed by the transmitter crystal filter 419 and at least a small portion thereof passed by lead 423 and the second crystal filter 424 to the input 427 of FET 428. Hence, even in the transmit-receive mode of operation, at least a portion of the transmitter frequency signal is fed to the receiver input to provide the local oscillator frequency thereof. Therefore, the direct signal injection path which includes lead 452 and the indirect signal injection path comprising the crystal filters 419 and 424 and lead 423 enable the transmitter frequency signal to be used as the local oscillator of the receiver while simultaneously allowing a single antenna 56 to be used for both transmitting and receiving and while substantially eliminating all undesirable cross-talk therebetween.

The transmitter crystal filter 419 serves to substantially reduce noise in the channel while the receiver crystal filter 424 serves two functions. It serves to reduce the transmitter power applied to the receiver input while simultaneously improving receiver selectivity. The FET 428 acts as an RF amplifier and the circuitry associated with the collector thereof performs a tuning function while the output on lead 441 is supplied directly to the mixer 461 as hereinafter described.

FIG. 11 is a more detailed description of the receiver circuitry of block 59. Lead 441 of FIG. 10 is connected directly to the base of transistor 461. The emitter of transistor 461 is grounded while the collector is connected to a node 462 through an inductor 463. Node 462 is also connected back to the base of transistor 461 through a resistor 464 and to a source of potential through a resistor 465. Node 462 is connected to ground through the parallel combination of capacitors 466 and 467. Node 462 is also connected back to the collector of transistor 461 through the parallel combination of capacitor 468 and resistor 469. The collector of transistor 461 is also connected to a node 471 through capacitor 470. Node 471 is connected to a node 472 through the parallel combination of inductor 473, capacitor 474, and resistor 475. Node 472 is connected to ground through capacitor 476 and is connected to P7 of the IF demodulator 478 through resistor 477. Further, node 471 is connected directly to the P5 input of the IF demodulator 478.

The IF demodulator 478, is a conventional IF demodulator such as that described with reference to the IF demodulator 157 of FIG. 5. The P1, P2, P3 and P4 outputs are connected to ground through a capacitor 479 and to a source of potential via resistor 480. P1, P2, P3 and P4 are also connected to P7 and P8 through the parallel combination of resistor 481, capacitor 482, and inductor 483. P14 is connected via lead 357 to the circuit of FIG. 9. P9 is connected to ground through a capacitor 384 and via lead 362 to the circuit of FIG. 9.

P12 is connected via lead 289 to the identification switches 64 of FIG. 8.

The circuitry associated with the P8 input is a quadrature circuit comprising resistor 481, capacitor 482 and an inductor 483 and is used to perform FM detection, as known in the art. The IF stages include the resistors, capacitors and inductors coupled to the P5 and P7 inputs while transistor 461 serves as the mixer. P14 is the audio mute port, P9 is the demodulator output, and P12 is the squelch input.

FIG. 12 is a block diagram with associated circuitry which comprises the FSK detector/decoder of block 60 of FIG. 3. Input lead 340 is connected to the filtered output of operational amplifier 345 of FIG. 9. The FSK signal and subcarrier tone are transmitted via lead 340 of FIG. 9 to one terminal of resistor 490. The opposite terminal of resistor 490 is connected to a node 491. Node 491 is connected to ground through the parallel combination of inductor 492 and capacitor 493 which serve as a narrow band pass filter centered on the FSK frequency. Node 491 is connected through a capacitor 494 to the P2 input of the detector/decoder.

In the preferred embodiment of the present invention is a FSK demodulator/tone decoder such as a XR-2211 manufactured by the Raytheon Company of Mountain View, Calif. P2 is the input while P1 is connected to a source of potential. A timing capacitor 495 is connected between the timing inputs P13 and P14. P10 is connected to ground through a capacitor 496. The P6 output represents the Q lock detect output which is supplied via lead 291 to microprocessor 51 of FIG. 8. P7 output which is the data output from the chip is connected via lead 290 to the microprocessor 51 of FIG. 8. The RC network designated broadly by reference numeral 497 serves to bias the various comparators of the FSK detector/decoder of block 60. Since the FSK detector/decoder of block 60 is conventional, a more detailed description of its operation will not be provided.

FIG. 13 is an electrical schematic diagram of a portion of the circuitry of FIGS. 4, 5 and 6 which is used to explain the dual function operation of the audio amplifier 195 of FIG. 6. A portion of this circuitry used to provide the dual function operation is contained within the FM demodulator 157 of FIG. 5. The P9 output of the FM demodulator 157 is taken from the output of an internal amplifier 500 which outputs the demodulated audio output signal through resistor 139. The P13 output of the FM demodulator 157 produces a normally high signal which goes low whenever the FM demodulator 157 detects a local ringing signal transmitted from the base unit 31 as previously described.

A transistor switch 501 is also internal to the FM demodulator 157. The transistor 501 is connected between the P14 output and the P15 output. The transistor switch 501 has its collector electrode connected via P15 to ground and its emitter electrode connected via P14 to one terminal of resistor 137. The base of transistor 501 is connected to circuitry internal to the FM demodulator 157 and it is sufficient for understanding the circuit of FIG. 13 to state that transistor 501 is normally closed so as to render the transistor 501 conductive to enable it to complete a conductive path between resistor 137 and ground. The switch 501 is responsive to the detection of a local ringing signal transmitted from the base unit 31 to switch to a non-conductive state so as to open the path between P14 and P15. Lastly, the transmit-receive signal T/R which is taken from node 211 of FIG. 6 is normally low whenever the cordless handset 33 is in the stand-by of the receive-only mode of operation but it goes high whenever the cordless handset 33 is switched to the transmit-receive T/R mode of operation. This causes the audio amplifier 195 to be turned off.

However, after the cordless handset 33 has been answered or whenever the user actuates the T/R mode of operation to place an out-going call, a high signal will be presented to the inverting input of amplifier 195. When no local ringing signal is being received, a high will be presented to the P13 output of the FM demodulator 157 and supplied to the non-inverting input of amplifier 195. With a high signal at the non-inverting input of operational amplifier 195, and a similar high at the inverting input, the amplifier will be operational. However, as the audio output from P9 of the FM demodulator 157 is transmitted through resistor 139, it is divided down by the voltage divider action of resistors 139 and 137 since the transistor switch 501 is back in its normally conducting position to complete a current path between resistor 137 and ground. Therefore, the level of the signal amplified by the operational amplifier 195 from the audio output of the FM demodulator 157 is substantially smaller than it would be if it were not divided, but the output of operational amplifier 195 drives the speaker 43 with a signal sufficiently strong to clearly hear audible speech but not nearly as strong as the signals producing the ringing indication.

The operational amplifier 195 in conjunction with circuitry associated therewith is able to amplify a divided down version of the audio output signal from the FM demodulator 157 to produce speech signals at the speaker 43 but is responsive to the receipt of a local ringing signal for effectively removing the voltage divider comprising resistors 137, 139 so as to supply the full strength of the in-coming local ringing signal to the input of amplifier 43 to audiblize the ringing signal so that it can be heard at much greater distances than audible speech. The amplifier 195 is balanced so that it does not amplify a signal present at its inputs under any other set of circumstances.

Since the preferred embodiment of the present invention utilizes the microprocessor 51 to perform a multitude of operational functions, a program has been designated for controlling the operations of the microprocessor 51. While the programs are believed to be obvious to one of ordinary skill in the art faced with the problems sought to be solved by the invention, flow diagrams are provided in the remaining drawings to represent the programs. With these flow diagrams, any qualified programmer can design one or more specific programs to operate the microprocessor 51 to perform the operations described herein. However, in the event more information is desired, an Appendix I is attached hereto which sets forth the specific computer listing of the programs utilized in the preferred embodiment of the present invention. It is understood that the computer listing will not be printed but will remain part of the file wrapper unless the Patent Office dictates otherwise.

The operation of the microprocessor-based cordless telephone system of the present invention will now be briefly reviewed. If a party places a telephone call over conventional telephone lines 32 to the user of the present invention, the call is received by the base unit 31 connected to the telephone lines 32. The ring detector circuitry 52 detects the ringing signal transmitted over the telephone lines 32 and sends a ring detection signal to the microprocessor 51. The microprocessor 51 is responsive to the receipt of the ring detection signal for generating a local ringing signal for transmission to the cordless handset 33 and for operating a transmit enable switch to supply full power to the transceiver 55 for transmit-receive operations. The transceiver 55 transmits the local ringing signal to the transceiver 37 of the cordless handset 33 and the full power of the local ringing signal is amplified by the audio amplifier 42 to drive the speaker 43. The speaker 43 sounds a loud local ringing signal which can be heard at considerable distances by the authorized user who answers the telephone by actuating a hook switch either on the keyboard 46 or external thereto.

When the hook switch is activated to indicate a "off-the-hook" condition, the logic circuit 44 will read the previously entered personal security code entered on the switches 47, generate an FSK-encoded data work indicative thereof and transmit the security identification code data word to the base unit 31 via the transceiver 37. The FSK decoder 60 receives the FSK-encoded data word and decodes it into a security identification code data word which is supplied to the microprocessor 51. The microprocessor 51 compares the security code identification word transmitted from the cordless handset 33 with the previously entered security identification code indicative of an authorized user and, if the comparison indicates that an authorized user has been identified, the microprocessor 51 generates a line seizure command. Line seizure circuitry 53 is responsive to the receipt of a line seizure command for seizing and maintaining the acquisition of the telephone lines 32 to enable two-way communication between the calling party and the authorized user.

If the authorized user desires to place a telephone call, he picks up the cordless handset 33 and activates the hook switch. The activation of the hook switch causes the logic circuitry 44 to transmit the FSK-encoded security identification code to the microprocessor 51 where it is compared with a previously stored identification code. If an authorized user is identified, the microprocessor will cause the line seizure circuit 53 to seize and maintain acquisition of the telephone lines 32. The user 34 then enters the telephone number to be dialed on the keyboard 46 and the logic circuitry 44 is responsive to the keyboard-entered number for generating a data word indicaitive of the telephone number to be dialed.

A data word is FSK-encoded and transmitted from the cordless handset 33 to the base unit where it is decoded by the decoder 60 and transmitted to the microprocessor 51. Depending upon the position of the dialing mode switch 63, the microprocessor 51 outputs a first sequence of digital dialing pulses at a rate of 10 pulses per second, a second sequence of digital dialing pulses at a rate of 20 pulses per second or a signal to the tone encoder circuitry 66 for generating a DTMF dialing signal for transmission over the telephone lines 32 to perform the conventional dialing function. The ability to choose any of the three dialing modes enables the present system to be used in any type of commercial telephone system in use today.

Furthermore, the authorized user 34 may utilize the keyboard 46 to actuate addressing data words or commands which are transmitted from the cordless handset 33 to the base unit 31 for decoding and interpretation by the microprocessor 51. The microprocessor 51 is responsive to these address commands for recalling the last telephone number dialed and automatically dialing that number, or for selecting other additional telephone numbers stored within the microprocessor 51 or in an auxiliary memory for automatic dialing.

The two-way radio link between the base unit 31 and the cordless handset 33 operates on the 49 MHz band in both directions making use of the lower channel of 49.845 MHz for the remote transmitter 38 and the upper channel of 49.89 MHz for the base unit transmitter 57. The transmitted frequency acts as the local oscillator for the receiver portion of the corresponding unit which results in the 45 KHz IF system.

While the transmitter and receiver frequencies of a particular unit are close together, there is substantially no unwanted interference or cross-talk between the transmitted and received signals. However, during the transmit-receive mode of operation, a crystal filter at the input of the mixer stage passes a small portion of the transmitted signal into the mixer stage for performing the local oscillator function. Similarly, during the receive-only mode of operation, a direct signal injection path supplies a relatively weak transmitter signal from the output of the transmitter oscillator directly into the input of the mixer stage for providing the local oscillator function. During the transmit-receive mode of operation, the direct signal injection path is disabled. Means are provided for cancelling out the component of the demodulated signal attributable to this transmitter signal.

With this detailed description of the specific apparatus used to illustrate the preferred embodiment of the present invention and the operation thereof, it will be obvious to those skilled in the art that various modifications can be made in the present invention and in the specific circuitry associated therewith without departing from the spirit and scope of the present invention which is limited only by the appended claims.

We claim:

1. A cordless two-way telephone system comprising:
   a base unit operatively connected to a subscriber's telephone lines;
   a portable cordless handset for communicating with said base unit;
   said base unit including a full duplex FM radio transceiver operating in a predetermined non-CB frequency band, said transceiver including a single antenna, a receiver and a transmitter, said receiver operating on a first channel frequency and said transmitter operating on a second channel frequency;
   said base unit transceiver further including means for normally establishing a receive-only mode of operation;
   means responsive to said receive-only mode of operation for supplying reduced power to said base unit transmitter for generating only that portion of transmitter signal required for providing the local oscillator function of said receiver;
   means responsive to a transmit enable command for supplying full power to said base unit transmitter for establishing a transmit-receive mode of operation and for generating a relatively strong transmitter signal;
   first coupling means for feeding said strong transmitter signal from the output of said transmitter to said single antenna for transmission to said cordless telephone handset and for feeding incoming signals transmitted by said cordless telephone handset from said single antenna to the input of said receiver, said first coupling means also passing at least that portion of said strong transmitter signal required for providing the local oscillator function of said receiver during the transmit-receive mode of operation;

first by-pass means normally by-passing said first coupling means to connect the transmitter output directly to the receiver input during the receive-only mode of operation for supplying that portion of the transmitter signal required for providing the local oscillator function of the receiver while eliminating substantially all undesirable coupling between transmitted and received signals;

means operatively coupled to said subscriber's telephone lines for detecting in-coming ringing signals and generating a ring detection signal indicative thereof;

microprocessor means including means responsive to said ring detection signal for generating said transmit enable command and a local ringing signal;

means for coupling said local ringing signal to the base unit transmitter for transmission to said cordless telephone handset;

said cordless telephone handset including a full duplex FM radio transceiver operating in said predetermined non-CB frequency band, said transceiver including a single antenna, a receiver and a transmitter, said handset receiver operating on said second channel frequency for receiving signals broadcast by said base unit transmitter and said handset transmitter operating on said second channel frequency for transmitting signals to said base unit receiver;

said handset transceiver further including means for normally establishing the receive-only mode of operation;

means responsive to said receive-only mode of operation for supplying reduced power to said handset transmitter for generating only that portion of transmitter signal required to provide the local oscillator function of said handset receiver;

means responsive to said transmit enable command to establish said transmit-receive mode of operation for supplying full power to said handset transmitter for generating a relatively strong transmitter signal;

second coupling means for feeding said strong transmitter signal from the output of said handset transmitter to said single antenna for transmission to said base unit and for feeding incoming signals transmitted by said base unit from said single antenna to the input of the handset receiver, said first coupling means also passing at least that portion of said strong transmitter signal required for providing the local oscillator function of the handset receiver during the transmit-receive mode of operation;

second by-pass means normally by-passing said second coupling means for directly connecting the transmitter output to the receiver input during the receive-only mode of operation for supplying that portion of the transmitter signal required for providing the local oscillator function of the cordless handset receiver while eliminating substantially all undesirable coupling between transmitted and received signals;

means responsive to said transmit-receive mode of operation for disabling said second by-pass means;

said cordless telephone handset further including a microphone for generating audio signals from a user's speech and means for frequency modulating said first frequency channel with said audio signals prior to transmission to said base unit;

a speaker for receiving signals from said handset receiver and audiblizing both a local ringing tone and speech information;

a first switching means for manually selecting a discrete security identification code;

a second switching means having a first switch position corresponding to an "on-the-hook" telephone condition and the second position corresponding to the cordless telephone handset being "off-the-hook" indicating that a user intends to use the cordless telephone handset;

a key pad for manually entering keyboard information including dialing codes and keyboard commands;

logic means responsive to said second switching means having been positioned to said off-the-hook position and to the security identification code selected by said first switching means for generating a discrete security identification code data word, said logic means further including means for generating a subcarrier frequency tone and means responsive to said keyboard information entered on said key pad for generating dialing code data words;

means responsive to said generated data words and to said subcarrier frequency tone for encoding frequency shift-keyed (FSK) equivalents of said data words;

said cordless handset including means for coupling said FSK-encoded data words, said subcarrier frequency tone, and said frequency modulated audio signals to said handset transmitter for transmission to said base unit;

said base unit also including means for detecting and decoding said FSK-encoded data words and generating digital data words indicative thereof;

means for storing a discrete security identification code for use by said microprocessor means in identifying an authorized user;

said microprocessor means including means for monitoring said digital data words, means for identifying a security identification code data word, and means for comparing an identified security identification code data word with said stored discrete security identification code to make a positive identification of an authorized cordless handset user and for generating a line seizure command in response to said identification;

means responsive to said line seizure command for seizing said subscriber's telephone lines and maintaining control thereof so long as said subcarrier frequency tone is transmitted by said handset;

means responsive to said dialing code data words for generating conventional dialing signals indicative thereof; and means for sending said conventional dialing signals and received audio signals over said seized telephone lines and for transmitting incoming signals from said seized telephone lines to the transmitter of said base unit for transmission to said cordless handset thereby enabling two-way communication between an authorized user of the cordless telephone handset and the party calling or being called on the telephone lines.

2. The cordless two-way telephone of claim 1 wherein said first and second coupling means of said base unit and said cordless handset, respectively, each includes a first crystal filter operatively coupled between the transmitter output and said single antenna for passing substantially only the transmitted one of said first and second channel frequency signals to its corresponding antenna and a second crystal filter operatively coupled between said single antenna and the receiver input for passing substantially only the received one of said first and second channel frequencies, the band path characteristics of said second crystal filter being such that at least said portion of the transmitter signal required for performing the local oscillator function of its corresponding receiver is passed by said second filter when said transceiver is in said transmit-receive mode of operation.

3. The cordless two-way telephone of claim 2 wherein said first and second by-pass means of said base unit and said cordless handset, respectively, each includes a direct electrical connection between the transmitter output and the receiver input in parallel with said first and second coupling means for directly injecting the normally weak transmitter signal into the receiver to provide the local oscillator function thereof during the transmit-receive mode of operation.

4. The cordless two-way telephone of claim 3 wherein said disabling including a switching element operatively coupled to said direct electrical connections and responsive to said transmit-receive mode of operation for switching to disable said connection.

5. The cordless two-way telephone of claim 1 further including a normally-open manually-positionable call switch whose output is operatively coupled to said microprocessor means, said call switch being normally closed to transmit a false ring detection signal to said microprocessor means for causing said microprocessor means to generate the transmit-receive command to power said transceiver means and generate said local ringing signal thereby enabling said call switch to be used for paging purposes.

6. The cordless two-way telephone of claim 1 wherein said first switching means includes a plurality of manually-operable switches for selecting a discrete security code identifying an authorized user.

7. The cordless two-way telephone of claim 1 wherein said key pad for manually entering keyboard information further includes key-operated means for indicating "on-the-hook" and "off-the-hook" conditions.

8. The cordless two-way telephone of claim 1 wherein said logic means further includes means responsive to particular key closures for generating memory address data words, said microprocessor means including memory means for storing at least one predetermined telephone number, and means responsive to said memory address data words for generating memory address commands in response thereto, and means responsive to said memory address commands for recalling said stored telephone number and automatically generating dialing signals in response thereto.

9. The cordless two-way telephone of claim 7 wherein said microprocessor means further includes additional memory means for automatically storing a dialing code data word representing the last telephone number called and for recalling same and automatically generating dialing signals corresponding thereto in response to a unique keyboard command entered on said key pad.

10. The cordless two-way telephone of claim 1 wherein said FSK-encoding means includes means for generating a second frequency tone different and distinct from said subcarrier frequency tone such that the logical zeroes and ones comprising said data words are transformed into corresponding FSK signals at said second frequency tone and at said subcarrier frequency tone, respectively.

11. The cordless two-way telephone of claim 1 wherein both of said transceiver means includes means for balancing out the locally-generated demodulation component.

12. The cordless two-way telephone of claim 1 wherein the handset transceiver means includes filtering means for filtering out the subcarrier frequency tone used to maintain acquisition of the seized telephone lines.

13. A cordless telephone comprising a portable cordless handset and a base unit;
said portable cordless handset including a microphone into which the user speaks for generating a microphone-produced signal, a speaker for outputting a ringing tone signal and audible speech, transceiver means for transmitting microphone-produced signals, subcarrier frequency tones, and data words to said base unit and for receiving a local ringing tone generated by said base unit and speech signals transmitted to said base unit via said telephone lines, said transceiver means supplying said local ringing tone signals and said speech signals to said speaker for audiblizing same, means for generating a discrete security code data word indicative of the user's identification, switching means having a first position indicating a normally "off" condition such as normally exists when a telephone is hung up and an "on" condition which corresponds to that condition normally existing when a telephone is "off-the-hook", and means responsive to said switching means being in said "on" position for transmitting said security code data word to said base unit via said transceiver means;
said base unit operatively connected to a subscriber's telephone lines, said base unit including transceiver means for transmitting a local ringing tone and speech signals to said cordless handset, said speech signals originally being transmitted over said telephone lines to said base unit, and for receiving microphone-produced signals, subcarrier frequency tones and data words from said cordless handset, means for storing a discrete security code identifying an authorized user, microprocessor means for receiving said security code data word from said handset and comparing same with said discrete stored security code and generating a line seizure command whenever an authorized user is identified, and means responsive to a line seizure command for seizing the telephone lines and maintaining acquisition thereof as long as the identified authorized user maintains said switching means in the "on" position; and
said transceiver means of both said cordless handset and said base unit each including a transmitter, an antenna, and a receiver, said transceiver means enabling full duplex two-way radio transmission between said base unit and said cordless handset, the transmitter of said cordless handset and receiver of said base unit operating on a first non-CB frequency and the transmitter of said base unit and receiver of said cordless handset operating on a second non-CB frequency, the transmitted frequencies of each of said transmitters acting as the local oscillator for the corresponding receiver of its respective transceiver means thereby enabling transmission and reception on a single antenna on each of said transceiver means while eliminating substantially all interference between transmitted and received signals.

14. The cordless telephone of claim 13 wherein said base unit includes means for detecting an in-coming ringing signal on said telephone lines and generating a ring detection signal in response thereto, said microprocessor means including means responsive to said ring detection signal for generating a local ringing signal and a transmit enable signal, said base unit further including a transmit enable switching means having a first normally non-conductive state for supplying a reduced amount of power to said transceiver means of said base unit, said reduced amount of power being sufficient to provide only that amount of transmitted signal necessary to provide adequate mixing operation for reception operation only, and a second conductive state for supplying full power to said transceiver means of said base unit for enabling full transmitter and receiver operations, said transmit enable switching means being responsive to said transmit enable signal from said microprocessor means for switching to said second state in response to the detection of a ringing signal and powering the base unit transceiver for transmitting the microprocessor means-produced local ringing signal to said cordless handset.

15. The cordless telephone of claim 13 wherein said microprocessor means includes means for generating a muting command during identification and dialing operations and means responsive to said muting command for aiding the transmitter modulation.

16. The cordless telephone of claim 13 wherein said cordless handset further includes a keyboard means and logic means for generating a keyboard-defined dialing code data word, said data word being transmitted by the transceiver means of said cordless handset to said base unit, said microprocessor means further including means responsive to said dialing code data word for generating dialing signals, said base unit further including means responsive to said dialing signals for enabling an authorized user to dial a selected telephone number via the subscriber's telephone lines connected to said base unit.

17. A cordless telephone of claim 16 wherein said means responsive to said microprocessor-generated dialing signals includes touch tone encoder means responsive to said dialing signals for generating sequences of digital pulses for transmission to said telephone lines to perform the normal dialing functions.

18. The cordless telephone of claim 13 wherein said cordless handset further includes a keyboard for entering dialing codes and the like and a second switching means on said keyboard to enable the user of said cordless handset to more easily indicate an "off-the-hook" condition by activating said second switching means to indicate that he has answered the telephone.

19. The cordless telephone of claim 13 wherein said cordless handset further includes a keyboard and logic means for generating keyboard-defined command data words which are transmitted to said base unit via the transceiver means of said cordless handset, said microprocessor including memory means for storing at least one dialing code data word indicative of a predetermined telephone number, means responsive to the receipt of said keyboard-defined command data word for addressing said memory means and recalling said dialing code data word for generating telephone dialing signals corresponding thereto.

20. The cordless telephone of claim 13 wherein said means for generating a discrete security code data word in said cordless handset includes logic means for generating a subcarrier frequency pilot tone and means responsive to said pilot tone and said data word for generating an FSK-encoded equivalent of said data word for transmission to said base unit, said base unit further including means for decoding said FSK-encoded data word in said microprocessor including means responsive to said decoded data word for comparing same with said stored discrete security code and generating said line seizure command when an authorized user is identified.

21. The cordless telephone of claim 20 wherein said cordless handset further includes a keyboard, logic means for generating keyboard-defined dialing code data words, said FSK-encoding means being responsive to the said dialing code data words for encoding same for transmission to said base unit and the FSK decoder means of said base unit being responsive to said FSK-encoded dialing code data words for decoding same for transmission to said microprocessor, said microprocessor including means responsive to said decoded dialing code data words for generating dialing signals for normal transmission on said subscriber's telephone lines.

22. The cordless telephone of claim 13 wherein said means for storing a discrete security code identifying an authorized user includes a plurality of manually-operable switches, means responsive to said plurality of manually-operable switches for generating said discrete security code, and memory means for storing said generated discrete security code for comparison purposes.

23. The cordless telephone of claim 20 wherein the continued generation of the subcarrier frequency pilot tone is controlled by the position of said switching means, said microprocessor being responsive to the continued receipt of said pilot tone after the initial seizure to maintain the telephone line acquisition after the initial line seizure until the on-off switch is turned off.

24. The cordless telephone of claim 13 wherein each of said transceiver means includes a first crystal filter for passing only the transmitted frequency signals from said transmitter output to the antenna, a second crystal filter for passing only the received frequency signals from said antenna to input of said receiver means, and means coupling said first and second crystal filters for supplying at least a portion of the transmitted signal to the receiver input for performing the local oscillator function.

25. The cordless telephone of claim 24 wherein each of said transceiver means also includes a direct signal injection path connected between the transmitter output and receiver input in parallel with said filters for injecting the relatively weak transmitter signal generated during the receive-only mode of operation into the receiver for providing the local oscillator function thereof.

26. The cordless telephone of claim 13 wherein at least one of said transceiver means includes means for balancing out the locally generated transmitter modulation from the demodulation of the received signal.

27. The cordless telephone of claim 13 further including memory means for storing at least one predetermined telephone number, said microprocessor means being responsive to a predetermined command for addressing said memory means and recalling said predetermined stored telephone number to generate a dialing signal indicative thereof, said base unit including automatic dialing means responsive to said dialing signal for automatically outputting conventional dialing pulses on the subscribers telephone lines for performing the dialing function.

28. A cordless telephone comprising a full duplex two-way radio link including a base unit coupled to a subscriber's telephone lines and a cordless remote unit, said base unit including an antenna, a transmitter and a receiver and said remote unit including an antenna, a transmitter and a receiver, the transmitter of said base unit operating at a first non-CB frequency to be received by the receiver of said remote unit and the transmitter of said remote unit operating at a second different and distinct non-CB frequency to be received by the receiver of said base unit, both said base unit and said remote unit including means for coupling a portion of the transmitted signal into the receiver of the corresponding unit for providing the local oscillator function for said corresponding receiver while simultaneously enabling the use of a single antenna in each of said base unit and said remote unit without undue interference between the transmitted and received signals, said remote unit including a cordless handset, means for indicating an "off-the-hook" condition for said handset, means for entering a security identification code, and means responsive to an indication of said "off-the-hook" condition for transmitting a security identification code to said base unit, said base unit including means responsive to the receipt of said security identification code for identifying an authorized user and seizing said telephone lines in response thereto to enable two-way communications between the authorized user of the cordless handset of the remote unit and the party calling or being called on the telephone lines.

29. The cordless telephone of claim 28 wherein said coupling means of each of said base unit and said remote unit includes a first crystal filter operatively connected between said transmitter and said antenna, a second crystal filter operatively connected between said antenna and said receiver, and means connected between said first and second crystal filters for passing a portion of said transmitted signal into said receiver to provide the required local oscillator function of the corresponding receiver.

30. The cordless telephone of claim 28 wherein said means for entering a security identification code includes a plurality of manually-operable switches, said means for transmitting includes means responsive to the position of said plurality of manually-operable switches for defining a security identification code data word, means responsive to an "off-the-hook" indication for generating a subcarrier frequency tone, and means responsive to said generated subcarrier frequency tone for FSK-encoding said security identification code data word for transmission to said base unit, wherein said means responsive to the receipt of said security identification code includes means responsive to said transmitted FSK-encoded security identification code data word for decoding same and generating a digital security code indicative thereof, means for storing an authorized security identification code data word, means responsive to a comparison of said digital security code and said stored authorized security code data word for generating a command signal whenever an authorized user is detected, and means responsive to said command signal for seizing said telephone lines and maintaining the acquisition thereof so long as said base unit continues to receive the subcarrier frequency tone transmitted from said cordless remote unit.

31. A cordless telephone comprising a full duplex two-way radio link including a base unit coupled to a subscriber's telephone lines and a cordless remote unit, said base unit including an antenna, a transmitter and a receiver, and said remote unit including an antenna, a transmitter and the receiver, the transmitter of said base unit operating on a first non-CB frequency to be received by the receiver of the remote unit and the transmitter of said remote unit operating at a second different and distinct non-CB frequency to be received by the receiver of the base unit, each of said base unit and said remote unit including means for coupling a portion of the transmitter signal into the receiver of a corresponding unit for providing the local oscillator function thereof while simultaneously enabling the use of a single antenna in each of said base unit and said remote unit without undue interference between the transmitted and received signals, said remote unit further including a cordless handset, means for entering a security identification code, means for indicating an "off-the-hook" condition for said handset and means responsive to an indication of said "off-the-hook" condition for transmitting a security identification code to said base unit, said base unit further including means responsive to the receipt of said security identification code for identifying an authorized user and seizing said telephone lines in response thereto to enable two-way communications between the authorized user at the cordless handset of the remote unit and the party calling or being called on the telephone lines.

32. The cordless telephone of claim 31 wherein each of said base unit and said remote unit includes means for establishing a receive-only mode of operation and means for establishing a transmit-receive mode of operation, said coupling means includes first and second signal paths operatively connected between the transmitter output and a corresponding receiver input, said first signal path including a first crystal filter operatively connected between the output of the transmitter and the single antenna, a second crystal filter operatively coupled between said single antenna and the input of a corresponding receiver, the band pass characteristics of said first and second crystal filters being such that only a relatively small portion of the transmitter signal is passed by said second filter to the receiver input for providing the local oscillator function thereof during said transmit-receive mode of operation, said coupling means further including a second path connected directly across said first and second crystal filters from the transmitter output to the receiver input for injecting a relatively small transmitter signal into the receiver for providing the local oscillator function thereof during said receive-only mode of operation.

33. The cordless telephone of claim 32 wherein the transmitter of each of said base unit and said remote unit further includes means for normally driving the transmitter with a relatively weak current during said receive-only mode of operation for generating a relatively weak transmitter signal of insufficient strength to pass over said first signal path but sufficient to pass said second path to provide the local oscillator function of the receiver, and further including means responsive to said transmit-receive mode of operation for disabling said second path and driving said transmitter hard to generate a relatively strong transmitter signal of sufficient strength that a relatively small portion is passed by said second filter to provide the local oscillator function of the receiver during transmit-receive operations.

34. The cordless telephone of claim 33 wherein the transmitter of said base unit and said remote unit each include a transmitter oscillator and means for normally biasing said transmitter oscillator to generate a relatively weak transmitter signal at the output thereof during the receive-only mode of operation, each of said transmitters further including means responsive to the transmit-receive mode of operation for applying a greater current to the transmitter oscillator to produce a relatively strong transmitter signal, said second path further including a switching element coupled between said second path and ground and responsive to said transmit-receive mode of operation for enabling the switching element to establish a conductive path to ground to disabling said second path while said first path passes a relatively small portin of the transmitter signal to the receiver input for providing the local oscillator function thereof.

35. The cordless telephone of claim 31 wherein said means for transmitting a security identification code includes a plurality of manually-operable switches, means responsive to the position of said plurality of manually-operable switches for defining a security identification code data word, means responsive to an "off-the-hook" indication for generating a subcarrier frequency tone for FSK-encoding said security identification data word for transmission to said base unit, wherein said means responsive to the receipt of said security identification code includes means responsive to said transmitted FSK-encoded security identification code data word for decoding same and generating a digital security code data word indicative thereof, means for storing an authorized security identification code word, means responsive to a comparison of said decoded digital security code data word and said stored authorized security identification code word for generating a command signal when an authorized user is detected, and means responsive to said command signal for seizing said telephone lines and maintaining the acquisition thereof so long as said base unit continues to receive the subcarrier frequency tone transmitted from said cordless remote unit.

36. A cordless telephone comprising a base unit operatively coupled to a subscriber's telephone lines and a portable cordless handset, said portable cordless handset including a microphone into which the user speaks for generating a microphone-produced audio signal, a speaker for outputting a ringing tone signal and audible speech, a first transceiver for transmitting an RF carrier frequency-modulated with audio signals and data words to said base unit for and for receiving a local ringing signal generated by said base unit and audio speech signals from said telephone lines, said first transceiver feeding said local ringing signal and said speech signals to said speaker for audiblizing same, means for generating a discrete security identification code data word indicative of the user's identification, hook switch means having a first position representing a condition such as normally exists when a telephone is "hung-up" and a second position representing that condition normally existing when a telephone is "off-the-hook" and means responsive to said hook switch means being in said second position for coupling said generated security code data word to said first transceiver for transmission to said base unit, said base unit including a second transceiver means for transmitting a local ringing signal and audio speech signals to said cordless handset, said audio speech signals originally being transmitted over said telephone lines to said base unit and for receiving said microphone-produced audio signals and data words transmitted by said cordless handset, means for storing a discrete security code identifying an authorized user, microprocessor means for receiving said security code data word from said cordless handset and comparing same with said stored discrete security code to generate a line seizure command whenever an authorized user is identified, and means responsive to a line seizure command for seizing the telephone lines and maintaining the acquisition thereof as long as the previously identified user maintains said hook switch means in said second position, said base unit further including means for detecting an in-coming ringing signal on said telephone lines and generating a ring detection signal in response thereto, said microprocessor means including means responsive to said ring detection signal for generating a local ringing signal and a transmit enable signal, said base unit further including a transmitter, a receiver, and a transmit enable switching means having a first switch state which allows a substantially reduced amount of power to be supplied to said base unit transmitter during the receive-only mode of operation since substantially reduced amount of power being sufficient to provide only that amount of transmitter signals necessary to provide adequate mixing operation in the base unit receiver by providing the local oscillator function thereof, and a second switch state for enabling full power to be applied to said base unit transmitter for enabling full transmitter and receiver operations during the transmit-receive mode of operation, said transmit enable switching means being responsive to said transmit enable signal from said microprocessor means for switching to said second state in response to the detection of a ringing signal and powering the base unit transmitter to enable the base unit to transmit the microprocessor-produced local ringing signal to said cordless handset.

37. The cordless telephone of claim 36 wherein said microprocessor means further includes means for detectng the receipt of a data word from said cordless handset and means for generating a muting command during identification and dialing operations and wherein said base unit further includes means responsive to said muting command from said microprocessor means for temporarily disabling transmitter operations.

38. The cordless telephone of claim 36 wherein said cordless handset further includes a keyboard means for manually entering keyboard information and logic means for generating a keyboard-defined dialing code data word, said data word being transmitted by said first transceiver means of said cordless handset to said base unit, said microprocessor means further including means responsive to said dialing code data words for generating dialing commands, said base unit including means responsive to said dialing commands for outputting dialing signals representing a selected telephone number over the subscriber's telephone lines for conventional dialing purposes.

39. The cordless telephone of claim 38 wherein said outputting means responsive to said microprocessor-generated dialing commands includes touch tone encoder means responsive to said dialing commands for generating dual tone multiple frequency dialing signals for transmission over said telephone lines.

40. The cordless telephone of claim 38 wherein said base unit includes dialing rate switching means for selecting one of a first and second state, means responsive to said first state for generating a sequence of dialing pulses at a rate of 10 pulses per second for outputting said dialing signals and means responsive to said second state for generating a sequence of digital dialing pulses at a rate of 20 pulses per second for outputting said dialing signals.

41. The cordless telephone of claim 38 wherein said base unit further includes a dial selection switching means for selecting one of a first, second and third state, said outputting means including means responsive to said first state for generating a sequence of digital dialing pulses indicative of a dialing command at a first rate for output over the telephone lines, means responsive to said second state for generating a sequence of digital dialing pulses indicative of a dialing command at a second rate for output over said telephone lines where said second rate is greater than said first rate, and tone-encoder means responsive to said third state for generating dual tone multiple frequency dialing signals indicative of a dialing command for output over said telephone lines.

42. The cordless telephone of claim 38 wherein said cordless handset further includes a keyboard for entering dialing codes and the like and wherein hook switch means is disposed on said keyboard to enable the user of said cordless handset to more easily establish an "off-the-hook" condition for activating said hook switch means to indicate that he has picked up the telephone to answer an in-coming call or to place an out-going call.

43. The cordless telephone of claim 36 wherein said cordless handset further includes the keyboard for manually entering numeric and command information and logic means for generating keyboard-defined data words which are transmitted to said base unit via said first transceiver means of said cordless handset, said microprocessor means including memory means for storing at least one dialing code data word indicative of a predetermined telephone number, means responsive to the receive of a keyboard-defined data word for addressing said memory means and recalling said dialing code data word and means responsive to said recalled dialing code data word for generating telephone dialing signals corresponding thereto.

44. The cordless telephone of claim 36 wherein said means for generating a discrete security code data word in said cordless handset includes logic means for generating a subcarrier frequency pilot tone and means responsive to said pilot tone and said data word for generating an FSK-encoded equivalent of said data word for transmission to said base unit via said first transceiver means, said base unit further including means for decoding said FSK-encoded data word, said microprocessor means including means responsive to said data word for comparing same with said stored discrete security code and generating said line seizure command when an authorized user is identified.

45. The cordless telephone of claim 44 wherein said cordless handset further includes a keyboard, logic means for generating keyboard-defined dialing code data words, said FSK-encoding means being responsive to said dialing code data words for encoding same for transmission to said base unit and the FSK-decoder means of said base unit being responsive to said FSK-encoded dialing code data words for decoding same for transmission to said microprocessor means, said microprocessor means including means responsive to said decoded dialing code data words for enabling conventional dialing signals to be outputted on said subscriber's telephone lines.

46. The cordless telephone of claim 36 wherein said means for storing a discrete security code identifying an authorized user includes a plurality of manually operable switches, means responsive to said plurality of manually operable switches for generating said discrete security code and means for temporarily storing said generated discrete security code for comparison purposes.

47. The cordless telephone of claim 44 wherein the continued generation of the subcarrier frequency pilot tone is maintained as long as said hook switch means is in said "off-the-hook" position, said microprocessor means being responsive to the continued receipt of said pilot tone after the initial seizure of said subscriber's telephone lines for maintaining the acquisition thereof after the initial seizure until a predetermined time after the hook switch is activated to prevent an inadvertent call termination due to the presence of noise or the like.

48. A cordless telephone comprising a base unit operatively coupled to a subscriber's telephone lines and a portable cordless handset, said portable cordless handset including a microphone into which the user speaks for generating a microphone-produced audio signal, a speaker for outputting a ringing tone signal and audible speech, a first transceiver for transmitting an RF carrier frequency-modulated with audio signals and data words to said base unit for and for receiving a local ringing signal generated by said base unit and audio speech signals from said telephone lines, said first transceiver feeding said local ringing signal and said speech signals to said speaker for audiblizing same, means for generating a discrete security identification code data word indicative of the user's identification, hook switch means having a first position representing a condition such as normally exists when a telephone is "hung up" and a second position representing that condition normally existing when a telephone is "off-the-hook" and means responsive to said hook switch means being in said second position for coupling said generated security code data word to said first transceiver for transmission to said base unit, said base unit including a second transceiver means for transmitting a local ringing signal and audio speech signals to said cordless handset, said audio speech signals originally being transmitted over said telephone lines to said base unit and for receiving said microphone-produced audio signals and data words transmitted by said cordless handset, means for storing a discrete security code identifying an authorized user, microprocessor means for receiving said security code data word from said cordless handset and comparing same with said stored discrete security code to generate a line seizure command whenever an authorized user is identified, and means responsive to a line seizure command for seizing the telephone lines and maintaining the acquisition thereof as long as the previously identified user maintains said hook switch means in said second position, said transceiver means of both the cordless handset and the base unit each including a transmitter means, an antenna, and a receiver means, said transceiver means enabling a full duplex two-way FM radio transmission between said base unit and said cordless handset, the transmitter means of said cordless handset and receiver means of said base unit operating on a first non-CB frequency and the transmitter means of said base unit and the receiver means of said cordless handset operating on a second different and distinct non-CB frequency and circuit means whereby at least a portion of the transmitter frequency of each of said transmitter means is injected into the receiver input for serving as the local oscillator frequency of the corresponding receiver means thereby enabling transmission and reception upon the same antenna on each of said first and second transceiver means while substantially eliminating undesirable interference between transmitted and received signals.

49. The cordless telephone of claim 48 wherein said first and second non-CB frequencies are in the range $49.82 \text{ Mhz} \leq f \leq 49.90 \text{ Mhz}$.

50. The cordless telephone of claim 49 wherein said first and second non-CB frequencies are separated by a frequency of 15 nKHz where "n" is a whole number and $1 \leq n \leq 4$.

51. The cordless telephone of claim 48 wherein each of said first and second transceiver circuit means includes a first crystal filter for passing only the transmitter frequency signals from its transmitter means to the corresponding antenna, a second crystal filter for passing substantially only the receiver frequency signals from said antenna to the input of the corresponding receiver means, said means coupling said first and second crystal filters for supplying a portion of the transmitter signal to the input of a corresponding receiver means for performing the local oscillator function during the transmit-receive mode of operation, said first and second crystal filters having band pass characteristics which insure that only a small portion of the transmitter signal is supplied to the input of the receiver for performing the local oscillator function, said filter also serving to reduce the transmitted power level available to the receiver input while simultaneously providing high receiver selectability.

52. The cordless telephone handset of claim 51 wherein each of said transmitter means includes a transmitter oscillator, means for normally biasing said transmitter oscillator so that only a relatively weak transmitter frequency signal is generated during the receive-only mode of operation, said first and second crystal filters operatively coupling the output of the transmitter oscillator with the corresponding receiver input such that none of the relatively weak transmitter oscillator signal is coupled to the receiver input during the receive-only mode of operation, said circuit means including signal injection means directly coupling the output of the transmitter oscillator to the receiver input for supplying said relatively weak transmitter frequency signal to the input of a corresponding receiver to provide to the local oscillator function thereof during receive-only operations, means responsive to the transmit receive-only mode of operation for disabling the signal injection path and supplying greater power to said transmitter oscillator to provide a relatively strong transmitter output required for driving the antenna and insuring that at least a small portion of the transmitter signal is passed by the second crystal filter to the receiver input to provide the local oscillator function thereof during transmit receive operations.

53. A cordless telephone comprising a base unit operatively coupled to a user's telephone lines and a portable cordless handset, each of said base unit and said cordless handset including a transceiver having a transmitter, a receiver and a single antenna for forming a full duplex radio link for two-way communication between said base unit and said cordless handset, the transmitter of said base unit and the receiver of said cordless handset operating on a first non-CB frequency and the transmitter of said cordless handset and the receiver of said base unit operating on a second different and distinct non-CB frequency, each of said transceivers further including means for selecting one of a receive-only mode of operation and a transmit-receive mode of operation, said cordless telephone further comprising:

means responsive to the selection of said receive-only mode of operation for supplying a relatively small quantity of energy to said transmitter for generating only a relatively weak transmitter frequency signal;

signal injection means for directly injecting said relatively weak transmitter frequency signal into the input of a corresponding receiver to serve as the local oscillator frequency thereof;

means responsive to the selection of said transmit-receive mode of operation for supplying a relatively large quantity of energy to said transmitter for generating a relatively strong transmitter frequency signal for driving said antenna while simultaneously disabling said direct signal injection means; and means for operatively coupling the single antenna of each of said transceivers to a corresponding transmitter output and to a corresponding receiver input such that when said transceiver is in said transmit-receive mode of operation, at least a portion of said relatively strong transmitter frequency signal is supplied from the transmitter output to a corresponding receiver input for providing the local oscillator function thereof, thereby enabling at least some portion of said transmitter signal to be supplied to the input of a corresponding receiver for providing the local oscillator frequency thereof regardless of whether said transceiver is operating in said receive-only mode of operation or in said transmit-receive mode of operation.

54. The cordless telephone of claim 53 wherein said transceivers are frequency modulated and wherein said first and second non-CB frequencies are in the range $49.82 \text{ MHz} \leq f \leq 49.90 \text{ MHz}$.

55. The cordless telephone of claim 53 wherein said first non-CB frequency is greater than said second non-CB frequency.

56. The cordless telephone of claim 53 wherein said first and second non-frequencies are separated by a small fractional percentage of said first frequency.

57. The cordless telephone of claim 56 wherein said small fractional percentage difference between said first and second non-CB frequencies is preferably 5n Khz where "n" is a whole number and $1 \leq f \leq 4$.

58. The cordless telephone of claim 53 wherein each of said transmitters includes a transmitter output and where in each of said receivers includes an input, and wherein each of said antenna coupling means includes a first crystal filter operatively coupled between the transmitter output and said antenna for passing the relatively strong transmitter frequency signal from the transmitter output to the antenna, a second crystal filter operatively coupled between the antenna and the receiver input for passing receiver frequency signals from the antenna to the input of said receiver, the band-pass characteristics of said first and second crystal filters being such that said second crystal filter normally rejects most of the relatively strong transmitter frequency signal but passes a small portion thereof to the input of said receiver for performing said local oscillator function whenever said transceiver is operating in said transmit-receive mode of operation.

59. The cordless telephone of claim 58 wherein each of said transmitters includes a transmitter oscillator and wherein said direct signal injection means includes a direct circuit path for normally coupling the output of the transmitter oscillator to the input of a corresponding receiver for directly injecting said normally-generated relatively weak transmitter frequency signal into said receiver to serve as the local oscillator frequency thereof whenever said transmitter is operated in said receive-only mode of operation, and wherein said disabling means includes the normally non-conductive switching means between said circuit path and ground and responsive to the selection of said transmit-receive mode of operation for switching to a conductive state to ground said circuit path and decouple said direct signal injection means to prevent direct local oscillator injection while the transmitter is in said transmit-receive mode of operation.

60. The cordless telephone of claim 53 wherein said cordless handset further includes keyboard means for entering dialing information, logic means responsive to keyboard-entered dialing information for generating a dialing data word indicative thereof and means for coupling said dialing data word to said transmitter for transmitting same to said base unit, and wherein said base unit further includes means responsive to the receipt of said dialing data word for generating a sequence of dialing pulses for transmission over said telephone lines to perform the dialing function and a second switching means for selecting one of a first and second output rate at which said sequence of dialing pulses are to be transmitted over said telephone lines.

61. The cordless telephone of claim 60 wherein said second switching means includes means for selectively outputting a digital dialing pulse at a first output rate of 10 pulses per second and for selectively outputting digital dialing pulses at a second output rate of 10 pulses per second.

62. The cordless telephone of claim 53 wherein said cordless handset further includes keyboard means for entering dialing information, logic means responsive to keyboard-entered dialing information for generating dialing data words indicative thereof and means for coupling said dialing data words to said transmitter for transmission to said base unit, and wherein said base unit further includes means responsive to the receipt of said dialing data words for generating dialing commands corresponding thereto, dial selection switching means for selecting one of a first switch position for generating a first switch signal, a second switch position for generating a second switch signal, and the third switch position for generating a third switch signal, means responsive to said first switch signal for generating a sequence of digital dialing pulses corresponding to said dialing commands at a rate of 10 pulses per second, means responsive to said second switching signal for generating a sequence of digital dialing pulses corresponding to said dialing commands at a rate of 20 pulses per second, means responsive to said third switching signal for generating a dual tone multiple frequency dialing signal corresponding to said dialing commands and means for coupling said digital dialing pulses and said dual tone multiple frequency dialing signals to said telephone lines for transmission thereover.

63. The cordless telephone of claim 53 wherein said cordless handset includes keyboard means for entering dialing information, second switching means for entering security code information, logic means responsive to said dialing information and said security code information for generating data words indicative thereof for transmission to said base unit, means responsive to the receipt of a local ringing signal transmitted from said base unit for indicating an in-coming call, hook switch means responsive to a user going "off-the-hook" for generating a transmit-receive signal indicative thereof, means responsive to said transmit-receive signal for transmitting said data words to said base unit, and wherein said base unit further includes means responsive to the receipt of a transmitted data word indicative of dialing information for generating a dialing command corresponding thereto, means responsive to a transmitted data word indicative of security code information for generating a security code identification command corresponding thereto, means for storing a predetermined security code identifying an authorized user, means responsive to an in-coming ringing signal on said telephone lines for generating a local ringing signal for transmission to said cordless handset, means responsive to a security code identification data command for comparing same with the stored security code and generating a transmit-enable command in response to the identification of an authorized user, means responsive to said transmit-enable command for selecting said transmit-receive mode of operation, means responsive to predetermined signals received from said cordless handset for seizing and maintaining said user's telephone lines to establish two-way communications between the party on the telephone and the authorized user of the cordless handset, means responsive to said dialing command for generating dialing signals for transmission over said seized telephone lines to perform the dialing function.

64. The cordless telephone of claim 63 wherein said logic means includes FSK-encoding means responsive to said data words for generating an FSK-encoded equivalent thereof and means for supplying said FSK-encoded data words to the transmitter of said cordless handset for transmission to said base unit, and wherein said base unit further includes FSK-decoder means responsive to the receipt of an FSK-encoded data word transmitted by said cordless handset for decoding same to reconstruct said data word for generating said dialing commands and security code commands.

65. The remote cordless telephone of claim 64 wherein said base unit further includes a dialing mode switching means having a first switch position for selectively outputting a sequence of dialing impulses indicative of said dialing command at the rate of 10 pulses per second over said telephone lines, a second switch position for selectively outputting a sequence of digital dialing pulses indicative of said dialing command at a rate of 20 pulses per second over said telephone lines, and a third switch position for selectively outputting a sequence of dual tone multiple frequency dialing signals over said telephone lines, thereby enabling said remote cordless telephone system to be used with any type of telephone system in commercial use today.

66. The cordless telephone of claim 53 wherein said cordless handset includes keyboard means for entering dialing information, second switching means for entering security code information, logic means responsive to said dialing information and said security code information for generating data words indicative thereof, FSK-encoding means responsive to said data words for generating an FSK-encoded equivalent thereof for transmission to said base unit, and wherein said base unit includes FSK-decoder means for decoding said transmitted FSK-encoded data words and regenerating the dialing information and security code information, said base unit further including a microprocessor means including means responsive to a data word indicative of dialing information for generating a dialing command, means responsive to a data word indicative of security code information for generating a security code identification command, means for storing a predetermined security code identifying an authorized user, means responsive to an in-coming ringing signal on said telephone lines for generating a local ringing signal for transmission to said cordless handset, means responsive to a security code identification command for comparing same with said stored security code and generating a transmit-enable command in response to the identification of an authorized user, means responsive to said transmit-enable command for seizing and maintaining said telephone lines to enable two-way communications between the party on the telephone and the authorized user, and means responsive to said dialing commands for generating dialing signals for transmission on said seized telephone lines to perform the conventional dialing function.

67. The cordless telephone of claim 66 wherein said base unit further includes dialing mode switching means having a first position for selectively outputting the sequence of dialing signals at a rate of 10 pulses per second over said seized telephone lines, a second switch position for selectively outputting a sequence of digital dialing signals at the rate of 20 pulses per second over said seized telephone lines, and a third switch position for selectively outputting a sequence of dual tone multiple frequency dialing signals over said seized telephone lines thereby enabling said cordless telephone system to be used with any type of telephone system in commercial use today.

68. The cordless telephone of claim 53 wherein said base unit further includes transformer means for coupling the base unit transceiver to the user's telephone lines, said user's telephone lines including a tip line and a ring line, said base unit also including means for generating a line seizure command, said transformer coupling means including a line seizure relay means having a normally de-energized relay coil and a normally open receive-only switch, said transformer having a primary coil and a secondary coil, said primary coil and said normally open relay-operated switch being connected in series to join said tip and ring lines, said line seizure relay means being responsive to the generation of said line seizure command for energizing said relay coil to close said relay operated switch for seizing the telephone lines, said base unit also including input amplifier means coupled to the secondary coil for inductively coupling signals from the seized telephone lines to the input of the transmitter and output amplifier means inductively coupled to the secondary coil for outputting audio signals and dialing signals from the receive to the seized telephone lines.

69. The cordless telephone of claim 68 wherein said portable cordless handset includes keyboard means for generating dialing data words, means for entering security identification code data words, means for generating a pilot tone, means for FSK-encoding said data words utilizing said pilot tone for transmission to said base unit, said base unit including means responsive to the receipt of said FSK-encoded data words for decoding same, means for storing a security code indicative of an authorized user, means for comparing a decoded security identification data word with said stored security word for identifying an authorized user, means responsive to the identification of an authorized user for generating a transmit-enable command and said line seizure command, said means for generating said line seizure command being responsive to the continued receipt of said pilot tone from said cordless handset for maintaining line acquisition so long as said cordless handset is off the hook.

70. The cordless telephone of claim 53 wherein said base unit includes means responsive to the receipt of an in-coming ringing signal on said telephone lines for generating a local ringing signal for transmission to said cordless handset, wherein said cordless handset includes a speaker, an audio amplifier for driving said speaker, said audio amplifier including positive and negative inputs at an output operatively coupled to drive said speaker, a summing node at said negative input, first resistive means normally coupling a relatively low receive-only signal to said negative input when said switching means has selected said receive-only mode of operation for said transceiver and for coupling a relatively high transmit-receive signal to said negative input whenever said switching means has selected said transmit-receive mode of operation, said receiver having a demodulation output for outputting an audio signal whenever an audio input signal is transmitted to said receiver, second resistive means for coupling the audio signal from the demodulation output of said receiver to said summing node, means associated with said receiver for normally supplying a relatively high input signal to the positive input but responsive to the receipt of said local ringing signal for supplying a relatively low input signal to said positive input, a normally-closed switching means disposed in a portion of said receiver, third resistive means coupling said normally closed switching means to said summing node for forming a resistive voltage divider network to normally reduce the voltage level at said summing node unless said normally-closed switching means is open, said normally-closed switching means being responsive to the receipt of said local ringing signal for opening to disable said resistive voltage divider network to allow the full undivided strength of the local ringing signal to be applied to said summing node, said audio amplifier being (1) responsive to a relatively low voltage at said positive input indicative of the receipt of a local ringing signal and the relatively low voltage at the negative input indicative of a receive-only mode of operation for applying the full undivided strength of the local ringing signal to drive said speaker so as to produce a relatively loud audible ringing sound, (2) responsive to a relatively high voltage at the positive input indicative of the absence of said local ringing signal and the relatively high voltage at said negative input indicative of a transmit-receive mode of operation for applying the voltage-divided audio signal indicative of in-coming speech to drive said speaker to produce normally audible speech signals, (3) responsive to a relatively low signal at the positive input indicative of the receipt of a local ringing signal and a relatively high signal at the negative input indicative of a transmit-receive mode of operation for off-setting said audio amplifier out of its operating range low so as to prevent the operation thereof whenever a local ringing signal is received after the telephone is off the hook for initiating or answering a call or the like, and (4) responsive to a relatively high signal at the positive input indicating the absence of a local ringing signal and a relatively low signal at the negative input indicating a receive-only mode of operation for off-setting the audio amplifier out of its operating range high to prevent speaker operation before the telephone has rung and been answered.

71. The cordless telephone of claim 70 wherein said input amplifier means and said output amplifier means include feedback means between the output of said input amplifier in the input of said output amplifier for cancelling out the transmitter modulated signal via circuit means for enabling sufficient phase adjustment and amplitude cancellation.

72. In a two-way cordless telephone system including a base unit coupled to a subscriber's telephone lines and a remote cordless handset, said base unit having an FM radio transceiver for transmitting and receiving radio signals to and from said cordless handset, means coupled to said telephone lines for detecting an in-coming ringing signal and generating a ring detection signal in response thereto, means for normally supplying a relatively small amount of energy to said radio transceiver sufficient to maintain receiver operation, first switching means responsive to a transmit-receive command for supplying a relatively large amount of energy to the transceiver for operating both the transmitter and receiver portions thereof, means for storing the predetermined authorized user's identification code, means responsive to a line seizure command for completing a circuit to said telephone lines to enable two-way communications thereover, means responsive to dialing commands for outputting dialing signals to said telephone lines for performing the conventional dialing functions, and said remote cordless handset having an FM radio transceiver for transmitting and receiving radio signals to and from said base unit, a second switching means for defining an "in use" condition, third switching means for manually entering a user's security identification code, means responsive to said second switching means defining said "in use" condition and to said security identification code entered by said third switching means for transmitting the security identification data word to said base unit, a key pad for entering dialing information, means responsive to said key pad-entered information for transmitting dialing information data words indicative of a desired telephone number to be dialed to said base unit, the improvement comprising:

microprocessor means disposed in said base unit (1) responsive to said ring detection signal for generating said transmit-receive command and a local ringing signal for transmission to said remote cordless handset; (2) responsive to the receipt of a security identification code data word for comparing same with said stored predetermined authorized user's identification code for generating said line seizure command whenever an authorized user is detected; (3) responsive to the receipt of a dialing information data word for generating dialing commands corresponding thereto; and (4) for storing at least one dialed telephone number for subsequent recall to automatically generate said dialing commands to initiate the automatic redialing of said stored telephone number without the necessity of entering a complete telephone number on said key pad, and both the FM radio transceiver of said base unit and the FM radio transceiver of said cordless handset including a transmitter, a receiver, and an antenna, the base unit transmitter and the handset receiver operating on a first non-CB frequency and the handset transmitter and base unit receiver operating on a second different and distinct non-CB frequency, each of said transmitters including a transmitter oscillator stage, means for normally supplying a relatively small amount of energy, indicative of a receive-only mode of operation, to said transmitter oscillator for generating a relatively weak transmitter signal but responsive to said transmit-receive mode of operation for supplying a relatively large amount of energy to said transmitter oscillator stage to generate a relatively strong transmitter signal for driving said antenna, the transceiver of each of said base unit and said remote cordless handset including first and second signal injection paths operatively coupled between the transmitter output and a corresponding receiver input, said first signal injection path including a first crystal filter operatively connected between the transmitter output and said antenna, a second crystal filter operatively coupled between said antenna and the receiver input, the band pass characteristics of said first and second crystal filters being such that only a relatively small portion of the transmitter signal is passed to the receiver during the transmit-receive mode of operation for providing the local oscillator function of the receiver and said second signal injection path includes a direct electrical path operatively connected between the transmitter output and the receiver input and a switching element operatively coupled in the path for disabling same during the transmit-receive mode of operation, said second signal injection path being conductive during the receive-only mode of operation for supplying the relatively weak transmitter oscillator signal directly into the receiver for providing the local oscillator function thereof.

73. The improved cordless telephone system of claim 72 wherein said remote cordless handset incudes means responsive to said "in use" condition for generating a pilot tone, means responsive to said pilot tone signal for FSK-encoding said data words prior to transmission to said base unit, and said base unit further includes FSK-decoder means responsive to the receipt of said FSK-encoded data words for decoding same and supplying digital equivalents thereof to said microprocessor means for subsequent processing.

74. The improved cordless telephone system of claim 72 wherein said means for outputting dialing signals comprises dialing output switching means for selecting first, second and third dialing output states, means responsive to said first state and said dialing commands for generating a sequence of digital dialing pulses indicative of the number to be dialed for output on said telephone lines at a rate of 10 pulses per second, means responsive to said second state and said dialing commands for generating a sequence of digital dialing pulses indicative of the number to be dialed for output on said telephone lines at a rate of 20 pulses per second, and dual tone multiple frequency tone generator means responsive to said third state and said dialing commands for generating a dual tone multiple frequency dialing signal indicative of the number to be dialed for output on said telephone lines.

* * * * *